(12) United States Patent
Ishii

(10) Patent No.: US 12,719,766 B2
(45) Date of Patent: Aug. 25, 2026

(54) COVERAGE AREA ATTRIBUTE FOR NETWORK SLICING

(71) Applicant: SHARP KABUSHIKI KAISHA, Sakai City (JP)

(72) Inventor: Atsushi Ishii, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 523 days.

(21) Appl. No.: 18/018,873

(22) PCT Filed: Aug. 4, 2021

(86) PCT No.: PCT/JP2021/028886

§ 371 (c)(1),
(2) Date: Jan. 31, 2023

(87) PCT Pub. No.: WO2022/030524

PCT Pub. Date: Feb. 10, 2022

(65) Prior Publication Data

US 2023/0308363 A1 Sep. 28, 2023

Related U.S. Application Data

(60) Provisional application No. 63/061,740, filed on Aug. 5, 2020.

(51) Int. Cl.
*H04L 41/40* (2022.01)
*H04W 84/04* (2009.01)

(52) U.S. Cl.
CPC ........... *H04L 41/40* (2022.05); *H04W 84/042* (2013.01)

(58) Field of Classification Search
CPC ...... H04L 41/40; H04W 84/042; H04W 48/18
See application file for complete search history.

(56) References Cited

U.S. PATENT DOCUMENTS

2018/0324602 A1* 11/2018 Griot ..................... H04W 48/20
2019/0014515 A1* 1/2019 Zee ................... H04W 36/0027
(Continued)

FOREIGN PATENT DOCUMENTS

JP 2020-507255 A 3/2020

OTHER PUBLICATIONS

3GPP TS 38.304 V16.1.0 (Jul. 2020) 3rd Generation Partnership Project; Technical Specification Group Radio Access Network; NR; User Equipment (UE) procedures in Idle mode and RRC Inactive state (Release 16).

(Continued)

*Primary Examiner* — Michael A Keller
*Assistant Examiner* — Thao D Duong
(74) *Attorney, Agent, or Firm* — ScienBiziP, P.C.

(57) ABSTRACT

A wireless terminal communicates with a management entity of a core network through an access node of a radio access network (RAN). The core network supports one or more network slices, each of the network slices providing a designated service within a public land mobile network (PLMN). The wireless terminal 30(23) comprises receiver circuitry and processor circuitry. The receiver circuitry is configured to receive a message comprising one or more network slice coverage area configurations. Each of the one or more network slice coverage configurations indicates a coverage area of a corresponding network slice. The processor circuitry is configured to: select at least one network slice of a serving PLMN; camp on a serving cell of the RAN, and; determine, based the one or more network slice coverage area configurations, whether or not the at least one network slice is available in the serving cell.

4 Claims, 36 Drawing Sheets

(56) References Cited

U.S. PATENT DOCUMENTS

| | | | | |
|---|---|---|---|---|
| 2019/0187999 | A1* | 6/2019 | Lu | G06F 9/442 |
| 2019/0289475 | A1* | 9/2019 | Hedman | H04W 24/02 |
| 2019/0289528 | A1* | 9/2019 | Lou | H04W 36/06 |
| 2020/0120580 | A1* | 4/2020 | Jin | H04W 74/00 |
| 2022/0330117 | A1* | 10/2022 | Li | H04W 28/16 |
| 2023/0092324 | A1* | 3/2023 | Seidel | H04W 48/18 370/329 |

OTHER PUBLICATIONS

3GPP TS 24.526 V16.4.0 (Jun. 2020) 3rd Generation Partnership Project; Technical Specification Group Core Network and Terminals; User Equipment (UE) policies for 5G System (5GS); Stage 3 (Release 16).
3GPP TS 24.301 V16.5.1 (Jul. 2020) 3rd Generation Partnership Project; Technical Specification Group Core Network and Terminals; Non-Access-Stratum (NAS) protocol for Evolved Packet System (EPS); Stage 3 (Release 16).
SA1, "LS on 5GC assisted cell selection for accessing network slice", S1-202264, (revision of S1-202097, S1-202193, S1-202222), 3GPP TSG-SA WG1 Meeting #90e, May 18-22, 2020, e-meeting.
Samsung et al., "Key Issue on 5GC assisted cell selection to access network slice", S2-2001467, (was S2-2000691), SA WG2 Meeting #136 Ad-hoc, Jan. 13-17, 2020, Incheon, Korea.
SA2, "LS on 5GC assisted cell selection for accessing network slice", S1-202026, 3GPP TSG-SA WG1 Meeting #90, Electronic Meeting, May 18-22, 2020.
SA2, "LS on GSMA NG.116 Attribute Area of service and impact on PLMN selection", S2-2001726, (e-mail revision 3 of S2-2000874), 3GPP TSG-SA WG2 Meeting #136-AH, Incheon, Korea, Jan. 13-17, 2020.
LG Electronics Inc. et al., "Feasibility Study on Enhanced Access to and Support of Network Slice", S1-202209, 3GPP TSG-SA WG1 #90-e, Electronic Meeting, May 18-22, 2020.
CMCC, et al., "Study on enhancement of RAN Slicing", RP-193254, 3GPP TSG-RAN meeting #86, Sitges, Barcelona, Dec. 9-12, 2019.
GSM Association, Official Document NG.116—Generic Network Slice Template, Version 2.0, Oct. 16, 2019.
3GPP TS 24.501 V16.4.1 (Mar. 2020) 3rd Generation Partnership Project; Technical Specification Group Core Network and Terminals; Non-Access-Stratum (NAS) protocol for 5G System (5GS); Stage 3; (Release 16).
3GPP TS 23.501 V16.4.0 (Mar. 2020) 3rd Generation Partnership Project; Technical Specification Group Services and System Aspects; System architecture for the 5G System (5GS); Stage 2 (Release 16).
3GPP TS 38.331 V16.0.0 (Mar. 2020) 3rd Generation Partnership Project; Technical Specification Group Radio Access Network; NR; Radio Resource Control (RRC) protocol specification (Release 16).
3GPP TS 38.300 V16.1.0 (Mar. 2020) 3rd Generation Partnership Project; Technical Specification Group Radio Access Network; NR; NR and NG-RAN Overall Description; Stage 2 (Release 16).

* cited by examiner

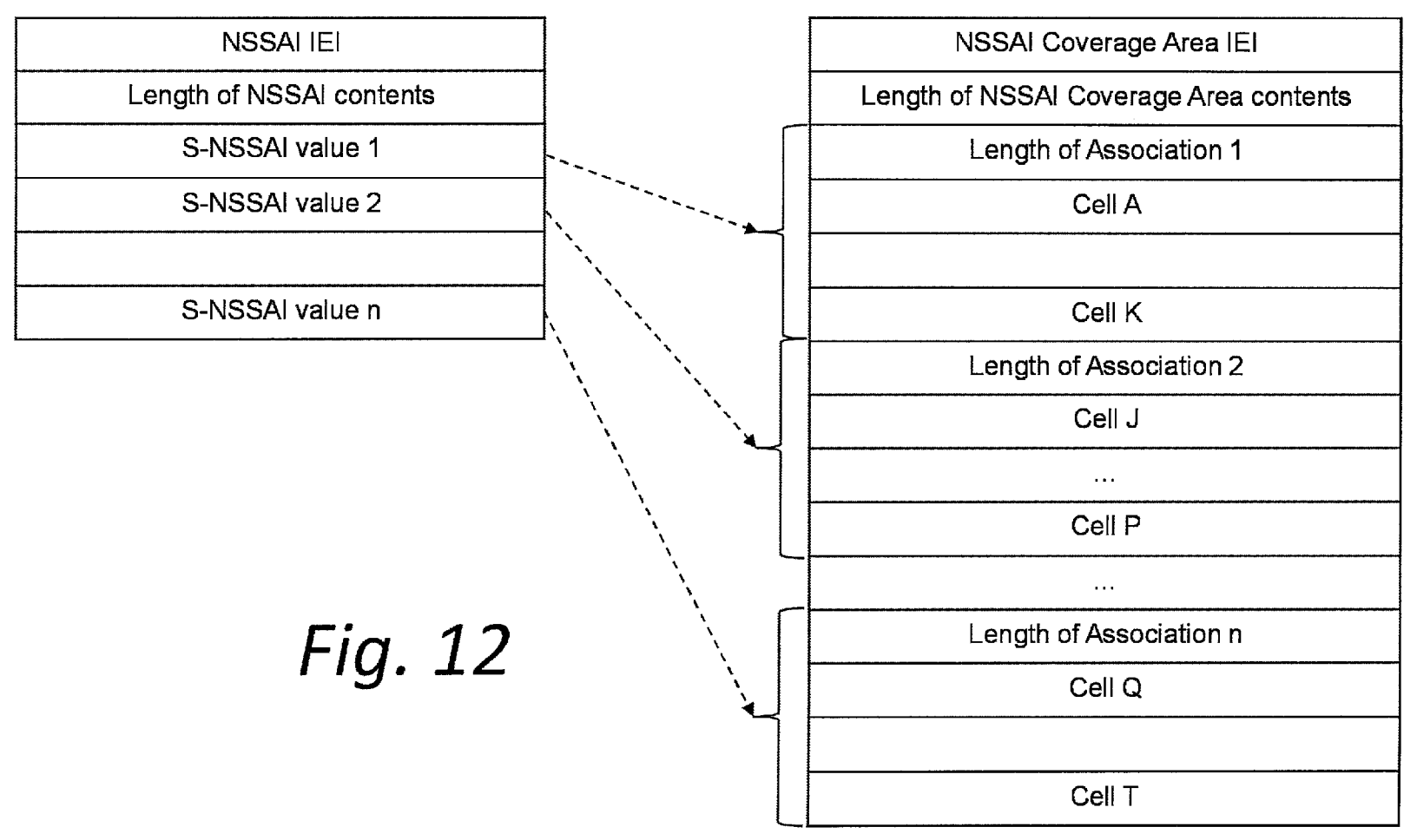

NSSAI IEI
Length of NSSAI contents
S-NSSAI value 1
S-NSSAI value 2
S-NSSAI value n NSSAI Coverage Area IEI
Length of NSSAI Coverage Area contents
Length of Association 1
Cell A
Cell K
Length of Association 2
Cell J
...
Cell P
...
Length of Association n
Cell Q
Cell T

*Fig. 12*

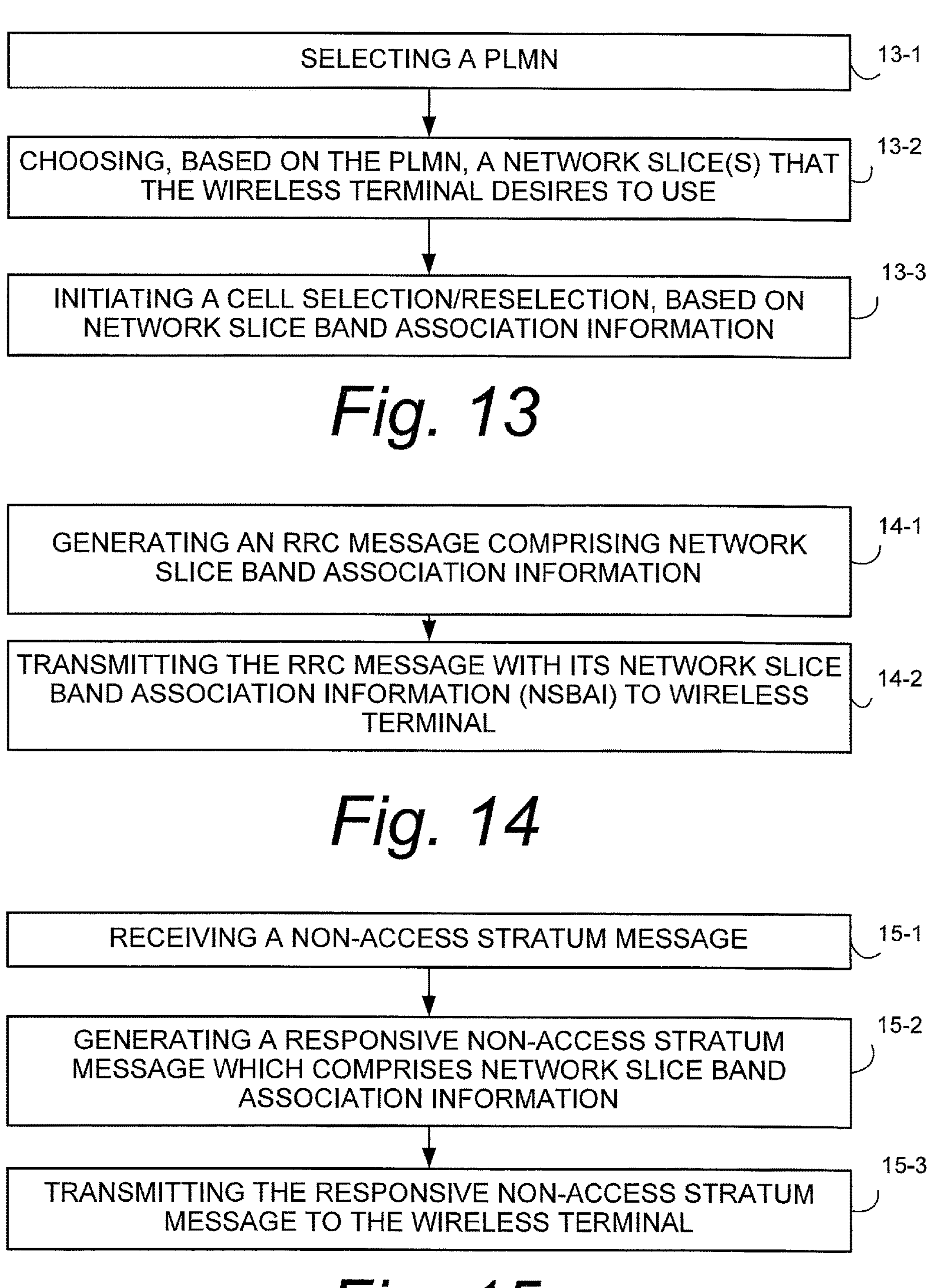
SELECTING A PLMN
13-1
CHOOSING, BASED ON THE PLMN, A NETWORK SLICE(S) THAT THE WIRELESS TERMINAL DESIRES TO USE
13-2
INITIATING A CELL SELECTION/RESELECTION, BASED ON NETWORK SLICE BAND ASSOCIATION INFORMATION
13-3
Fig. 13
GENERATING AN RRC MESSAGE COMPRISING NETWORK SLICE BAND ASSOCIATION INFORMATION
14-1
TRANSMITTING THE RRC MESSAGE WITH ITS NETWORK SLICE BAND ASSOCIATION INFORMATION (NSBAI) TO WIRELESS TERMINAL
14-2
Fig. 14
RECEIVING A NON-ACCESS STRATUM MESSAGE
15-1
GENERATING A RESPONSIVE NON-ACCESS STRATUM MESSAGE WHICH COMPRISES NETWORK SLICE BAND ASSOCIATION INFORMATION
15-2
TRANSMITTING THE RESPONSIVE NON-ACCESS STRATUM MESSAGE TO THE WIRELESS TERMINAL
15-3
Fig. 15

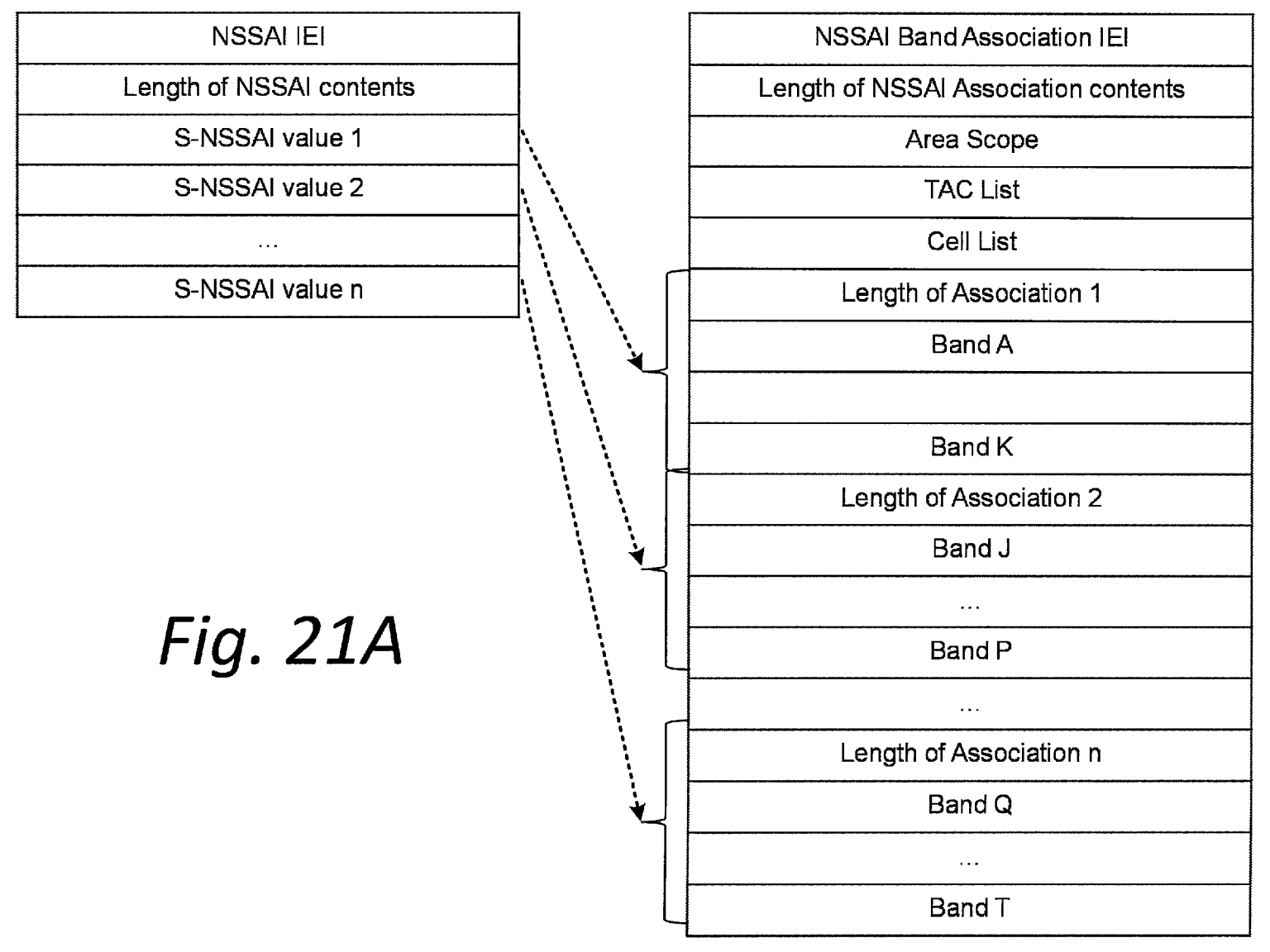

NSSAI Band Association IEI
Length of NSSAI Association contents
Area Scope
TAC List
Cell List
Length of Association 1
Band A
Band K
Length of Association 2
Band J
...
Band P
...
Length of Association n
Band Q
...
Band T NSSAI IEI
Length of NSSAI contents
S-NSSAI value 1
S-NSSAI value 2
...
S-NSSAI value n

Fig. 21A

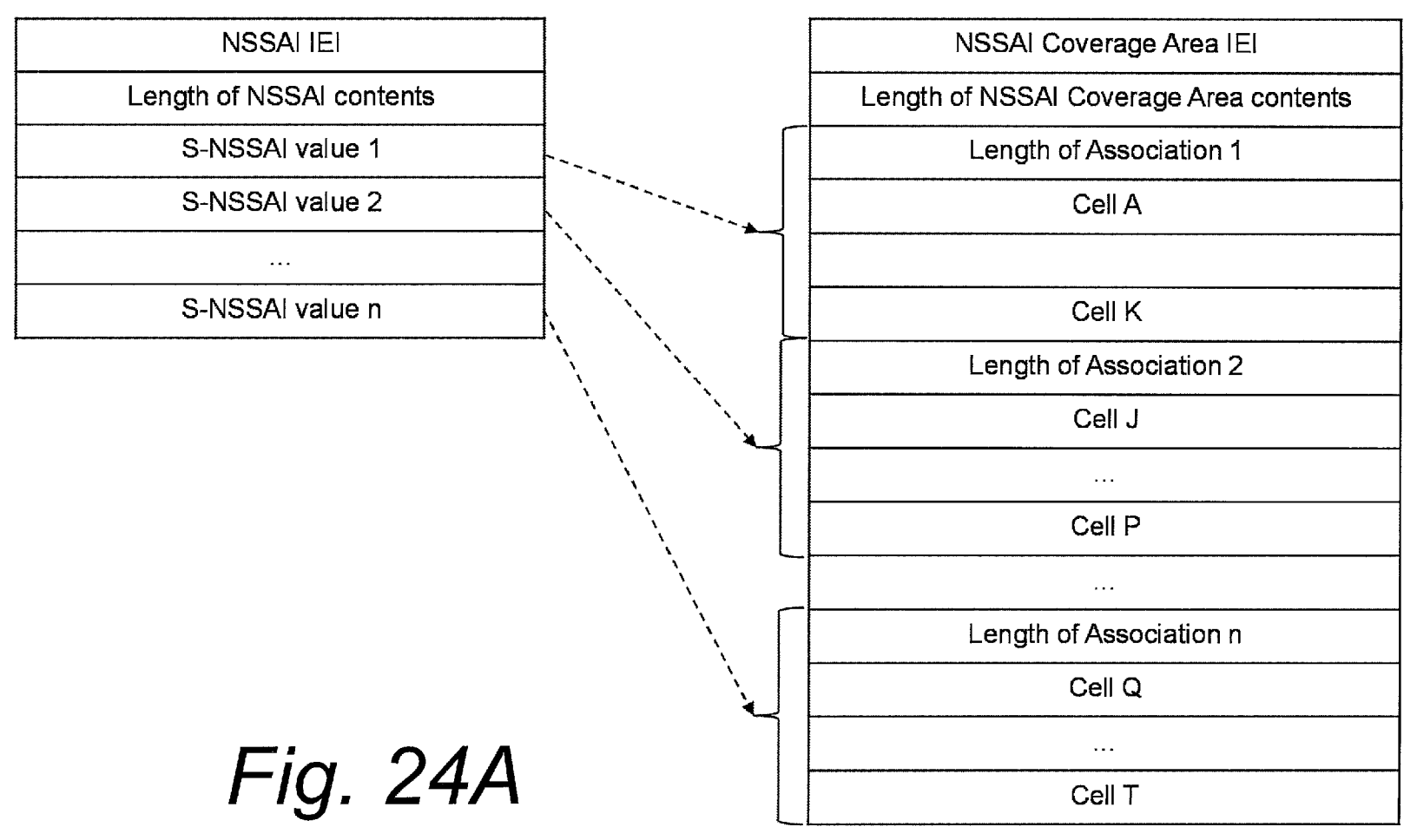

NSSAI IEI
Length of NSSAI contents
S-NSSAI value 1
S-NSSAI value 2
...
S-NSSAI value n NSSAI Coverage Area IEI
Length of NSSAI Coverage Area contents
Length of Association 1
Cell A Cell K
Length of Association 2
Cell J
...
Cell P
...
Length of Association n
Cell Q
...
Cell T

Fig. 24A

| NSSAI IEI |
| --- |
| Length of NSSAI contents |
| S-NSSAI value 1 |
| S-NSSAI value 2 |
| ... |
| S-NSSAI value n |

| NSSAI Band Association IEI |
| --- |
| Length of NSSAI Association contents |
| Length of Association 1 |
| Length of sub-association 1-a |
| Band A |
| ... |
| Band K |
| Area Scope |
| TAC List |
| Cell List |
| Length of sub-association 1-b |
| Band J |
| ... |
| Band P |
| Area Scope |
| TAC LIst |
| Cell LIst |
| ... |
| Length of Association 2 |
| ... |
| ... |
| Length of Association n |
| ... |

Fig. 24B

COVERAGE AREA ATTRIBUTE FOR NETWORK SLICING

CROSS REFERENCE

This Nonprovisional application claims priority under 35 U.S.C. § 119 on provisional Application No. 63/061,740 on Aug. 5, 2020, the entire contents of which are hereby incorporated by reference.

TECHNICAL FIELD

The technology relates to wireless communications, and particularly to resource utilization in sliced networks.

BACKGROUND ART

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes LongTerm Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 27, and is also described in 3GPP TS 38.300. The 5G NR network is comprised of NG RAN (Next Generation Radio Access Network) and 5GC (5G Core Network). As shown, NGRAN is comprised of gNBs (e.g., 5G Base stations) and ng-eNBs (i.e. LTE base stations). An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations (i.e. gNB & ng-eNB). A gNB node provides NR user plane and control plane protocol terminations towards the UE, and is connected via the NG interface to the 5GC. The 5G NR (New Radio) gNB is connected to AMF (Access and Mobility Management Function) and UPF (User Plane Function) in 5GC (5G Core Network).

Network slicing is a network architecture adopted in the fifth generation (5G) cellular system that enables multiplexing of virtualized and independent logical networks on a same physical network infrastructure. Each network slice is an isolated end-to-end network tailored to fulfill diverse requirements requested by a particular application. Network operators will be able to deploy functions/services necessary to support particular customers/market segments.

A network slice could span across multiple parts of the network, such as terminals, radio access network (RAN), core network (CN), and transport network. A network slice may comprise dedicated and/or shared resources, in terms of processing power, storage, and bandwidth.

The 3rd Generation Partnership Project (3GPP) has been working on specifying architectural and functional elements that are essential for realization of basic network slicing functionality in Release 15 and 16. In Release 17, it is planned to enhance the functionality of the network slicing, based on a standardized list of attributes that can characterize a type of network slice. Some of the attributes, such as radio spectrum supported by a network slice to restrict terminals in terms of frequencies to be used, may impact the RAN functions and procedures.

What is needed are methods, apparatus, and/or techniques to enhance resource selection in a sliced network.

SUMMARY OF INVENTION

In one example, a wireless terminal of a radio access network (RAN), the RAN supporting one or more network slices, each of the network slices providing a designated service within a public land mobile network (PLMN), the wireless terminal comprising: receiver circuitry configured to receive at least one message comprising one or more network slice identities, each of the one or more network slice identities being associated with a network slice coverage area configuration, the network slice coverage area configuration indicating a coverage area; processor circuitry configured to: select at least one network slice; camp on a serving cell, and; determine, based on a network slice coverage area configuration associating a network slice identity of the at least one network slice, whether or not the at least one network slice is available in the serving cell.

In one example, an access node of a radio access network (RAN), the RAN supporting one or more network slices, each of the network slices providing a designated service within a public land mobile network (PLMN), the access node comprising: processor circuitry to generate at least one message comprising one or more network slice identities, each of the one or more network slice identities being associated with a network slice coverage area configuration, the network slice coverage configuration indicating a coverage area of a network slice identified by the each of the one or more network slice identities, and; transmitter circuitry configured to transmit, to a wireless terminal, the at least one message in a cell served by the access node; wherein a network slice coverage area configuration associating a network slice identity is used by the wireless terminal to determine whether or not a network slice, identified by the network slice identity, is available in a serving cell that the wireless terminal camps on.

In one example, a method for a wireless terminal of a radio access network (RAN), the RAN supporting one or more network slices, each of the network slices providing a designated service within a public land mobile network (PLMN), the method comprising: receiving at least one message comprising one or more network slice identities, each of the one or more network slice identities being associated with a network slice coverage area configuration, the network slice coverage area configuration indicating a coverage area; selecting at least one network slice; camping on a serving cell, and; determining, based on a network slice coverage area configuration associating a network slice identity of the at least one network slice, whether or not the at least one network slice is available in the serving cell.

In one example, a method for an access node of a radio access network (RAN), the RAN supporting one or more network slices, each of the network slices providing a designated service within a public land mobile network (PLMN), the method comprising: generating at least one message comprising one or more network slice identities, each of the one or more network slice identities being associated with a network slice coverage area configuration, the network slice coverage configuration indicating a coverage area of a network slice identified by the each of the one or more network slice identities, and; transmitting, to a wireless terminal, the at least one message in a cell served by the access node; wherein a network slice coverage area configuration associating a network slice identity is used by the wireless terminal to determine whether or not a network slice, identified by the network slice identity, is available in a serving cell that the wireless terminal camps on.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 12 is a diagrammatic view showing an example format of optional information elements which shares a same structure shown as "NSSAI Band Association".

FIG. 13 is a flowchart showing example, representative acts or steps that may be performed by a wireless terminal according to generic embodiments and modes described herein including embodiments and modes of FIG. 4, FIG. 8A-FIG. 8B, FIG. 9A-FIG. 9B, FIG. 10A-FIG. 10B, and FIG. 11A-FIG. 11B.

FIG. 14 is a flowchart showing example, representative acts or steps that may be performed by an access node according to the example embodiment and mode of FIG. 11A-FIG. 11B.

FIG. 15 is a flowchart showing example, representative acts or steps that may be performed by a management entity of a core network according to the example embodiment and mode of FIG. 10A-FIG. 10B.

FIG. 21A is a diagrammatic view showing a second implementation of how area scope indication may be indicated in system information including SIB1 and SIBx.

FIG. 24A is a diagrammatic view showing an example format of the optional information elements that may be included in a message in a case that a list of cell identities is used for the coverage area attribute.

FIG. 24B is a diagrammatic view showing an example format of the network slice coverage area configuration combined in the network slice band association information.

DESCRIPTION OF EMBODIMENTS

Figure 1:
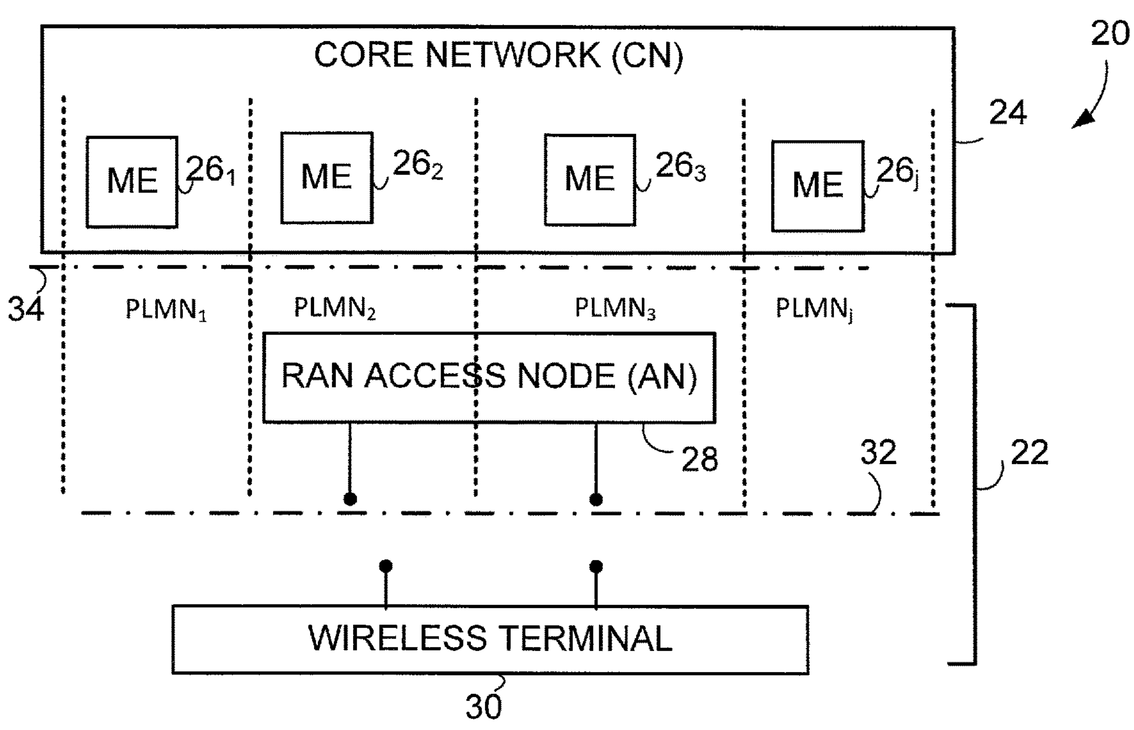
FIG. 1 is a schematic view of a communications system showing both a core network and radio access network

In one of its example aspects, the technology disclosed herein concerns a wireless terminal which communicates with a management entity of a core network through an access node of a radio access network (RAN). The core network supports one or more network slices, each of the network slices providing a designated service within a public land mobile network (PLMN). In an example embodiment and mode the wireless terminal comprises receiver circuitry and processor circuitry. The receiver circuitry is configured to receive, from a first cell of the RAN, a message comprising network slice band association information. The network slice band association information further comprises one or more network slice identifiers. Each of the one or more network slice identifiers identifies a network slice. Each of the one or more network slice identifiers is associated with a radio band(s) and an area scope indication. The radio band(s) indicates a frequency domain interval(s) on which a network slice identified by the each of the one or more network slice identifiers is supported. The area scope indication indicates an area in which the network slices is supported on the radio band(s). The processor circuitry is configured to select from the network slice band association information at least one network slice identifier of a serving PLMN; store the network slice band association information; and, upon the wireless terminal camping on a second cell of the RAN, initiate a reacquisition procedure to reacquire, from the second cell, the network slice band association information based on an area scope indication corresponding to the selected at least one network slice identifier, comprised in the stored network slice band association information. Methods of operation of such wireless terminal are also provided.

In another of its aspects the technology disclosed herein concerns an access node of a radio access network (RAN). In an example embodiment and mode the access node comprises processor circuitry and transmitter circuitry. The processor circuitry is configured to generate a message comprising network slice band association information. The transmitter circuitry configured to transmit, to the wireless terminal, the message in a cell. The network slice band association information further comprises one or more network slice identifiers. Each of the one or more network slice identifiers identifies a network slice. Each of the one or more network slice identifiers is associated with a radio band(s) and an area scope indication. The radio band(s) indicates a frequency domain interval(s) on which a network slice identified by the each of the one or more network slice identifiers is supported. The area scope indication indicates an area in which the network slices is supported on the radio band(s). Methods of operation of such access node are also provided.

In yet another of its aspects the technology disclosed herein concerns a management entity of a core network. The management entity communicates with a wireless terminal via a cell of a radio access network (RAN). The core network supports one or more network slices, each of the network slices providing a designated service within a public land mobile network (PLMN). In an example embodiment and mode the management entity comprises receiver circuitry, processor circuitry, and transmitter circuitry. The receiver circuitry is configured to receive, from the wireless terminal, a non-access stratum (NAS) request message. The processor circuitry is configured to generate a NAS response message comprising network slice band association information. The transmitter circuitry configured to transmit, to the wireless terminal, the NAS response message. The network slice band association information further comprises one or more network slice identifiers. Each of the one or more network slice identifiers identifies a network slice. Each of the one or more network slice identifiers is associated with a radio band(s) and an area scope indication. The radio band(s) indicates a frequency domain interval(s) on which a network slice identified by the each of the one or more network slice identifiers is supported. The area scope indication indicates an area in which the network slices is supported on the radio band(s). Methods of operation of such a management entity are also provided.

In yet another of its example aspects, the technology disclosed herein concerns a wireless terminal which communicates with a management entity of a core network through an access node of a radio access network (RAN). The core network supports one or more network slices, each of the network slices providing a designated service within a public land mobile network (PLMN). In a basic example embodiment and mode the wireless terminal 30(23) comprises receiver circuitry and processor circuitry. The receiver circuitry is configured to receive a message comprising one or more network slice coverage area configurations. Each of the one or more network slice coverage configurations indicates a coverage area of a corresponding network slice. The processor circuitry is configured to: select at least one network slice of a serving PLMN; camp on a serving cell of the RAN, and; determine, based the one or more network slice coverage area configurations, whether or not the at least one network slice is available in the serving cell. Methods of operation of such an access node are also provided.

In yet another of its example aspects, the technology disclosed herein concerns an access node of a radio access network. In a basic embodiment and mode the access node 28 thus comprises processor circuitry and transmitter circuitry. The processor circuitry is configured to generate a message comprising one or more network slice coverage area configurations, each of the one or more network slice coverage configurations indicating a coverage area of a corresponding network slice. The transmitter circuitry is configured to transmit, to a wireless terminal, the message in a cell served by the access node. The once or more network slice coverage area configurations are used by the wireless terminal to determine whether or not a network slice is available in a serving cell that the wireless terminal camps on. Methods of operation of such an access node are also provided.

In yet another of its example aspects, the technology disclosed herein concerns a management entity which thus belongs to a core network (CN) and which communicates with a wireless terminal, e.g., wireless terminal via a cell of a radio access network (RAN). The core network supports one or more network slices, each of the network slices providing a designated service within a public land mobile network (PLMN). In an example basic embodiment and mode, the management entity comprises receiver circuitry, processor circuitry, and transmitter circuitry. The receiver circuitry is configured to receive, from the wireless terminal, a non-access stratum (NAS) request message. The processor circuitry is configured to generate a NAS response message comprising one or more network slice coverage area configurations. The transmitter circuitry is configured to transmit, to the wireless terminal, the NAS response message. The one or more network slice coverage area configurations are used by the wireless terminal to determine whether or not a network slice is available in a serving cell that the wireless terminal camps on. Methods of operation of such a management entity are also provided.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

1.0 Introduction 1.1 Introduction: Network Architecture

FIG. 1 shows an example telecommunications system 20 comprising one or more radio access networks (RANs) 22 which is connected to one or more core networks (CNs) 24. The telecommunications system 20 may be utilized by one or more Public Land Mobile Networks (PLMNs). A Public Land Mobile Network (PLMN) is a combination of wireless communication services offered by a specific operator in a specific country. For sake of simplified illustration, FIG. 1 shows by vertical dotted lines that the radio access network (RAN) 22 and core network (CN) 24 may possibly be utilized by plural PLMNs such as $PLMN_1$-$PLMN_j$. In the core network (CN) 24 each PLMN has its own management entity 26.

As used herein, the term "telecommunication system" or "communications system" can refer to any network of devices used to transmit information. A non-limiting example of a telecommunication system is a cellular network or other wireless communication system. As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

A core network (CN) such as core network (CN) 24 may comprise numerous servers, routers, and other equipment. As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc. For sake of simplification and for pertinence to the technology disclosed herein core network (CN) 24 is shown as comprising one or more management entities, such as management entities 26$_1$-26$_j$. In an example implementation and in any of the example embodiments and modes described herein, the management entity 26 may be an Access and Mobility Management Function (AMF). As mentioned above, each PLMN has its own one or more management entities 26 in core network (CN) 24.

A radio access network (RAN) such as the illustrated radio access network (RAN) 22 typically comprises plural access nodes, one example access node 28 being illustrated in FIG. 1. As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology.

The radio access network (RAN) 22 with the management entity 26 serves wireless terminals, which also form part of the radio access network (RAN) 22. FIG. 1 shows an example wireless terminal 30. As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

The wireless terminal 30 communicates with its serving radio access network (RAN) 22 over a radio or air interface, illustrated by dashed-dotted line 32 in FIG. 1. Communication between radio access network (RAN) 22 and wireless terminal 30 over the radio interface 32 occurs by utilization of "resources". Any reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and 1 are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix In 5G New Radio ("NR"), a frame consists of 10 ms duration. A frame consists of 10 subframes with each having 1 ms duration similar to LTE. Each subframe consists of $2^{\mu}$ slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links Mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference.

The radio access network (RAN) 22 in turn communicates with one or more core networks (CN) 24 over a RAN-CN interface (e.g., N2 interface), illustrated by dashed-dotted line 34 in FIG. 1.

In general, communication protocols between the wireless terminal and the telecommunication system may be categorized into Access Stratum (AS) and Non-Access Stratum (NAS). AS protocols, such as Radio Resource Control (RRC) and Medium Access Control (MAC), may be used for the wireless terminal to communicate with access nodes of a RAN, whereas NAS protocol(s), such as the NAS protocol specified in 3GPP TS 24.501, may be used for the wireless terminal to communicate with entities (e.g., AMF) of a CN(s), via access nodes of a RAN. Consequently, the wireless terminal may comprise a function to manage the AS protocols, and a separate function to manage the NAS protocol(s). Herein, terminology "NAS" may be used in some context to refer to the function built into the wireless terminal to manage the NAS protocol(s). Similarly, "RRC" may be used in some context to refer to the function built into the wireless terminal to manage the RRC protocol.

1.2 Introduction: Typical Resource Selection

Figure 2:
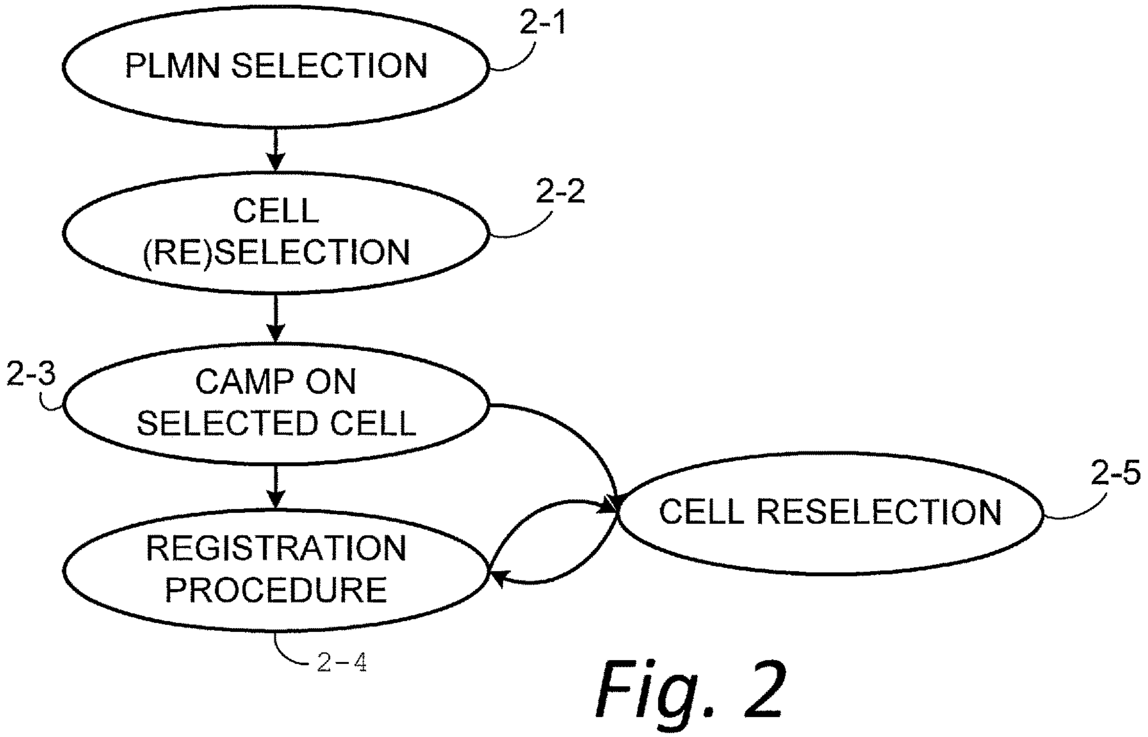
FIG. 2 is a diagrammatic view of operations performed by a wireless terminal of the system of FIG. 1 for resource selection.

FIG. 2 illustrates general acts or steps which may be performed by wireless terminal 30, a UE, in order to obtain appropriate resources for communication in a typical implementation. As shown by act 2-1, the wireless terminal in an idle state (e.g. RRC_IDLE) or in an inactive state (e.g. RRC_INACTIVE) may perform PLMN selection. During the PLMN selection procedure of act 2-1, the wireless terminal may scan all RF channels according to its capabilities to find available PLMNs. On each carrier, the wireless terminal may search for the strongest cell and read its system information (e.g., from SIB1), in order to find out which PLMN(s) the cell belongs to.

If the wireless terminal can read one or several PLMN identities in the strongest cell, each found PLMN may be reported to NAS as a high quality PLMN, but without the RSRP value, provided that a certain high-quality criterion is fulfilled. The high-quality criterion is that, for an NR cell, the measured RSRP value shall be greater than or equal to −110 dBm.

Found PLMNs that do not satisfy the high-quality criterion but for which the wireless terminal has been able to read the PLMN identities may be reported to the NAS together with their corresponding RSRP values. The quality measure reported to NAS may be the same for each PLMN found in one cell.

The search for PLMNs as illustrated by act 2-1 may be stopped on request from the NAS. The wireless terminal may optimize PLMN search of act 2-1 by using stored information, e.g., frequencies and optionally also information on cell parameters from previously received measurement control information elements.

Based on the report of available PLMNs provided by the wireless terminal, the NAS may choose a PLMN, or a list of equivalent PLMNs (if available), that the Access Stratum (AS) may use for cell selection and cell reselection.

After a successful completion of the PLMN selection procedure, the wireless terminal may proceed on a cell selection to search for a suitable cell of the selected PLMN as shown by act 2-2 of FIG. 2. In one configuration, the cell selection may be performed by one of two possible procedures, an initial cell selection procedure and a cell selection procedure using leveraging stored information.

The initial cell selection procedure does not require or involve prior knowledge of which RF channels are NR frequencies. In the initial cell selection procedure, (1) The wireless terminal may scan all RF channels in the NR bands according to its capabilities to find a suitable cell; (2) On each frequency, the wireless terminal may need only search for the strongest cell; and, (3) Once a suitable cell is found, this cell may be selected.

The cell selection that uses leveraging stored information may require stored information of frequencies and optionally also information on cell parameters from previously received measurement control information elements or from previously detected cells. Once the wireless terminal has found a suitable cell, the wireless terminal may select it. If no suitable cell is found, the initial cell selection procedure in a) may be started.

When the cell selection procedure of act 2-1 is successful, as act 2-3 the wireless terminal may choose the cell to receive available services and may monitor the control channel of the selected cell (i.e., act 2-3 shows the wireless terminal camping on the selected cell).

As act 2-4 of FIG. 2, the wireless terminal may, if necessary, register its presence by means of a registration procedure, in the tracking area of the chosen cell. As an outcome of a successful Location Registration, the selected PLMN then becomes the registered PLMN.

While camping on the selected cell as shown by act 2-4, if the wireless terminal finds a more suitable cell, according to cell reselection criteria (preferably configured by the network via system information), as shown by act 2-5 the wireless terminal may reselect onto that cell and camps on it. This act 2-5 may be referred as a cell reselection. If the new cell does not belong to at least one tracking area to which the wireless terminal is registered, a location registration may be performed, as illustrated by act 2-6. In RRC_INACTIVE state, if the new cell does not belong to the configured RAN-based Notification Area (RNA), an RNA update procedure is performed.

The wireless terminal may search for higher priority PLMNs at regular time intervals and search for a suitable cell if another PLMN has been selected by NAS. If the wireless terminal loses coverage of the registered PLMN, either a new PLMN is selected automatically (automatic mode), or an indication of available PLMNs is given to the user so that a manual selection can be performed (manual mode).

The cell reselection may be performed based on network-configured priorities. Absolute priorities of different NR frequencies or inter-RAT (Radio Access Technology) frequencies may be provided to the wireless terminal in the system information, in a connection release message (e.g., RRC Release message), or by inheriting from another RAT at inter-RAT cell (re)selection. In the case of system information, an NR frequency or inter-RAT frequency may be listed without providing a priority. If priorities are provided in dedicated signaling, the wireless terminal may ignore all the priorities provided in system information.

1.3 Introduction: Typical Cell Barring Technology

Cell barring, also known as cell reservation, is a mechanism for a radio access network (RAN) to preclude wireless terminals from camping on a cell. For example, 3GPP TS38.304 specifies the procedures shown in Table 1.

TABLE 1

5.3.1 Cell status and cell reservations

Cell status and cell reservations are indicated in the MIB or SIB1 message as specified in TS 38.331 [3] by means of three fields:

- cellBarred (IE type: "barred" or "not barred")
  Indicated in MIB message. In case of multiple PLMNs indicated in SIB1, this field is common for all PLMNs
- cellReservedForOperatorUse (IE type: "reserved" or "not reserved")
  Indicated in SIB1 message. In case of multiple PLMNs indicated in SIB1, this field is specified per PLMN.
- cellReservedForOtherUse (IE type: "true")
  Indicated in SIB1 message. In case of multiple PLMNs indicated in SIB1, this field is common for all PLMNs.

When cell status is indicated as "not barred" and "not reserved" for operator use and not "true" for other use,

- All UEs shall treat this cell as candidate during the cell selection and cell reselection procedures.

When cell status is indicated as "true" for other use,

- The UE shall treat this cell as if cell status is "barred".

When cell status is indicated as "not barred" and "reserved" for operator use for any PLMN and not "true" for other use,

- UEs assigned to Access Identity 11 or 15 operating in their HPLMN/EHPLMN shall treat this cell as candidate during the cell selection and reselection procedures if the field cellReservedForOperatorUse for that PLMN set to "reserved".
- UEs assigned to an Access Identity 1, 2 and 12 to 14 shall behave as if the cell status is "barred" in case the cell is "reserved for operator use" for the registered PLMN or the selected PLMN.

TABLE 1-continued

NOTE 1: Access Identities 11, 15 are only valid for use in the HPLMN/ EHPLMN; Access Identities 12, 13, 14 are only valid for use in the home country as specified in TS 22.261 [12].

When cell status "barred" is indicated or to be treated as if the cell status is "barred",
- The UE is not permitted to select/reselect this cell, not even for emergency calls.
- The UE shall select another cell according to the following rule:
- If the cell is to be treated as if the cell status is "barred" due to being unable to acquire the MIB:
  - the UE may exclude the barred cell as a candidate for cell selection/reselection for up to 300 seconds.
  - the UE may select another cell on the same frequency if the selection criteria are fulfilled .
- else:
  - If the cell is to be treated as if the cell status is "barred" due to being unable to acquire the SIB1:
    - The UE may exclude the barred cell as a candidate for cell selection/reselection for up to 300 seconds.
  - If the field intraFreqReselection in MIB message is set to "allowed", the UE may select another cell on the same frequency if re-selection criteria are fulfilled;
    - The UE shall exclude the barred cell as a candidate for cell selection/reselection for 300 seconds.
  - If the field intraFreqReselection in MIB message is set to "not allowed" the UE shall not re-select a cell on the same frequency as the barred cell;
    - The UE shall exclude the barred cell and the cells on the same frequency as a candidate for cell selection/reselection for 300 seconds.

The cell selection of another cell may also include a change of RAT.

1.4 Introduction: Network Slicing Technology

Network Slicing is a concept to allow differentiated treatment depending on each customer requirements. With slicing, it is possible for Mobile Network Operators (MNO) to consider customers as belonging to different tenant types with each having different service requirements that govern in terms of what slice types each tenant is eligible to use based on Service Level Agreement (SLA) and subscriptions. In some configurations, a network slice instance may be defined within a Public Land Mobile Network (PLMN) or a Stand-alone Non-public Network (SNPN).

1.4.1 Introduction: Network Slicing General Principles

The following key principles may apply for support of Network Slicing in RAN and provide understanding/explanation for terminology employed herein:

RAN awareness of slices

RAN supports a differentiated handling of traffic for different network slices which have been pre-configured. How RAN supports the slice enabling in terms of RAN functions (i.e. the set of network functions that comprise each slice) is implementation dependent.

Selection of RAN part of the network slice

RAN supports the selection of the RAN part of the network slice, by Network Slice Selection Assistance Information (NSSAI) provided by the UE or the CN which unambiguously identifies one or more of the pre-configured network slices in the PLMN/SNPN.

Resource management between slices

RAN supports policy enforcement between slices as per service level agreements. It should be possible for a single RAN node to support multiple slices. The RAN should be free to apply the best Radio Resource Management (RRM) policy for the SLA in place to each supported slice.

Support of QoS

RAN supports QoS differentiation within a slice.

RAN selection of CN entity

For initial attach, the UE may provide NSSAI to support the selection of an Access and Mobility Management Function (AMF). If available, NG-RAN uses this information for routing the initial NAS to an AMF. If the RAN is unable to select an AMF using this information or the UE does not provide any such information the RAN sends the NAS signaling to one of the default AMFs.

For subsequent accesses, the UE provides a temporary ID, which is assigned to the UE by the CN, to enable the RAN to route the Non-Access Stratum (NAS) message to the appropriate Access and Mobility Management Function (AMF) as long as the temporary ID is valid (RAN is aware of and can reach the AMF which is associated with the temporary ID). Otherwise, the methods for initial attach applies.

Resource isolation between slices

The RAN supports resource isolation between slices. RAN resource isolation may be achieved by means of RRM policies and protection mechanisms that should avoid that shortage of shared resources in one slice breaks the service level agreement for another slice. It should be possible to fully dedicate RAN resources to a certain slice. How RAN supports resource isolation is implementation dependent.

Access control

By means of the unified access control, operator-defined access categories can be used to enable differentiated handling for different slices. RAN may broadcast barring control information (i.e. a list of barring parameters associated with operator-defined access categories) to minimize the impact of congested slices.

Slice Availability

Some slices may be available only in part of the network. The RAN supported Single Network Slice Selection Assistance Information (S-NSSAI(s)) may be (pre)configured. Awareness in the RAN of the slices supported in the cells of its neighbors may be beneficial for inter-frequency mobility in connected mode. It is assumed that the slice availability does not change within the UE's registration area.

The RAN and the CN are responsible to handle a service request for a slice that may or may not be available in a given area. Admission or rejection of access to a slice may depend by factors such as support for the slice, availability of resources, support of the requested service by RAN.

- Support for UE associating with multiple network slices simultaneously
  - In case a UE is associated with multiple slices simultaneously, only one signaling connection is maintained and for intra-frequency cell reselection, the UE always tries to camp on the best cell. For inter-frequency cell reselection, dedicated priorities can be used to control the frequency on which the UE camps.
- Granularity of slice awareness
  - Slice awareness in RAN is introduced at Protocol Data Unit (PDU) session level, by indicating the S-NSSAI corresponding to the PDU Session, in all signaling containing PDU session resource information.
- Validation of the UE rights to access a network slice
  - It is the responsibility of the CN to validate that the UE has the rights to access a network slice. Prior to receiving the Initial Context Setup Request message, the RAN may be allowed to apply some provisional/local policies, based on awareness of which slice the UE is requesting access to. During the initial context setup, the RAN is informed of the slice for which resources are being requested.

1.4.2: Introduction: Network Slicing Vs. Network Sharing

It should be noted that Network Slicing should not be confused with Network Sharing. Network Sharing allows multiple participating operators (e.g. multiple PLMNs) to share resources of a single shared network according to agreed allocation schemes. In contrast, as mentioned, a network Slicing may be defined within a PLMN/SNPN. Therefore, Network Slicing may be separately configured in a network, and may coexist with Network Sharing.

1.4.3: Introduction: Network Slice Identification

Within a PLMN, a network slice may be identified by an S-NSSAI, which may be comprised of a slice/service type, SST, and a slice differentiator, SD. A set of one or more S-NSSAIs is called the NSSAI. NSSAIs may be classified into one of the following types:

- Configured NSSAI: NSSAI provisioned in the UE applicable to one or more PLMNs.
- Default configured NSSAI: a configured NSSAI preconfigured by a home PLMN (HPLMN), commonly decided by all roaming partners, e.g. by the use of SST values standardized by 3GPP or other bodies. Each S-NSSAI in the default configured NSSAI may have a corresponding S-NSSAI as part of the subscribed S-NSSAI(s).
- Requested NSSAI: NSSAI provided by the UE to the Serving PLMN during registration.
- Allowed NSSAI: NSSAI provided by the Serving PLMN during e.g. a Registration procedure, indicating the S-NSSAIs values the UE could use in the Serving PLMN for the current Registration Area.
- Subscribed S-NSSAIs: S-NSSAIs based on subscriber information, which a UE is subscribed to use in a PLMN.

An S-NSSAI can have standard values, i.e., such S-NSSAI is only comprised of an SST with a standardized SST value, and no SD, or non-standard values, i.e., such S-NSSAI is comprised of either both an SST and an SD or only an SST without a standardized SST value and no SD. An S-NSSAI with a non-standard value identifies a single Network Slice within the PLMN with which it is associated. An S-NSSAI with a non-standard value may not be used by the UE in access stratum procedures in any PLMN other than the one to which the S-NSSAI is associated.

The S-NSSAIs in the Subscribed S-NSSAIs (see clause 5.15.3) may contain only HPLMN S-NSSAI values. The S-NSSAIs in the Configured NSSAI, the Allowed NSSAI, the Requested NSSAI, the Rejected S-NSSAIs may contain only values from the Serving PLMN. The Serving PLMN can be the HPLMN or a VPLMN.

NSSAI configurations and management of NSSAIs between the UE and networks, including a home PLMN (HPLMN) and visited PLMNs (VPLMNs) may be handled by the Non-Access Stratum (NAS). For example, 3GPP TS24.501 (V15.4.0) specifies the procedures of Table 2.

TABLE 2

| |
|---|
| 4.6 Network slicing |
| 4.6.1 General |
| The 5GS supports network slicing as described in 3GPP TS 23.501 [8]. Within a PLMN, a network slice is identified by an S-NSSAI, which is comprised of a slice/service type (SST) and a slice differentiator (SD). Inclusion of an SD in an S-NSSAI is optional. A set of one or more S-NSSAIs is called the NSSAI. |
| The following NSSAIs are defined in 3GPP TS 23.501 [8]: |
| a) configured NSSAI; |
| b) requested NSSAI; |
| c) allowed NSSAI; and |
| d) subscribed S-NSSAIs; |
| The following NSSAIs are defined in the present document: |
| a) rejected NSSAI for the current PLMN; and |
| b) rejected NSSAI for the current registration area. |
| A serving PLMN may configure a UE with the configured NSSAI per PLMN. In addition, the HPLMN may configure a UE with a single default configured NSSAI, and consider the default configured NSSAI as valid in a PLMN for which the UE has neither a configured NSSAI nor an allowed NSSAI. |
| The allowed NSSAI and rejected NSSAI for the current registration area are managed per access type independently, i. e. 3GPP access or non-3GPP access, and is applicable for the registration area. |
| If the registration area contains TAIs belonging to different PLMNs, which are equivalent PLMNs, the allowed NSSAI and the rejected NSSAI for the current registration area are applicable to these PLMNs in this registration area. |
| The rejected NSSAI for the current PLMN is applicable for the whole registered PLMN, where the registration area shall only contain TAIs belonging to the registered PLMN. |

TABLE 2-continued 4.6.2 Mobility management aspects 4.6.2.1 General

Upon registration to a PLMN, the UE shall send to the AMF the requested NSSAI which includes one or more S-NSSAIs of the allowed NSSAI for the PLMN or the configured NSSAI and corresponds to the network slice (s) to which the UE intends to register with, if:

a) the UE has a configured NSSAI for the current PLMN;
b) the UE has an allowed NSSAI for the current PLMN; or
c) the UE has neither allowed NSSAI for the current PLMN nor configured NSSAI for the current PLMN and has a default configured NSSAI. In this case the UE indicates to the AME that the requested NSSAI is created from the default configured NSSAI;

If the UE has neither a configured NSSAI nor an allowed NSSAI valid for a PLMN and does not have any default configured NSSAI, the UE does not send a requested NSSAI when requesting registration towards the PLMN. In roaming scenarios, the UE shall also provide the mapped S-NSSAI (s) for the requested NSSAI, if available. The AMF verifies if the requested NSSAI is permitted based on the subscribed S-NSSAIs in the UE subscription and optionally the mapped S-NSSAI (s) provided by the UE, and if so then the AMF shall provide the UE with the allowed NSSAI for the PLMN, and shall also provide the UE with the mapped S-NSSAI(s) for the allowed NSSAI for the PLMN if available. The AMF shall ensure that there are no two or more S-NSSAIs of the allowed NSSAI which are mapped to the same S-NSSAI of the HPLMN. The AMF may also query the NSSF to determine the allowed NSSAI for a given registration area as defined in 3GPP TS 23.501 [8].

The set of network slice(s) for a UE can be changed at any time while the UE is registered to a PLMN, and the change may be initiated by the network, or the UE. In this case, the allowed NSSAI and associated registration area may be changed during the registration procedure. The network may notify the UE of the change of the supported network slice (s) in order to trigger the registration procedure. Change in the allowed NSSAI may lead to AMF relocation subject to operator policy. See subclause 5.4.4 describing the generic UE configuration update procedure for further details.

4.6.2.2 NSSAI storage

If available, the configured NSSAI(s) shall be stored in a non-volatile memory in the ME as specified in annex C.

Each of the configured NSSAI stored in the UE is a set composed of at most 16 S-NSSAIs. Each of the allowed NSSAI stored in the UE is a set composed of at most 8 S-NSSAIs and is associated with a PLMN identity and an access type. Each of the configured NSSAI except the default configured NSSAI, and the rejected NSSAI is associated with a PLMN identity. The S-NSSAI (s) in the rejected NSSAI for the current registration area are further associated with a registration area where the rejected S-NSSAI (s) is not available. The S-NSSAI (s) in the rejected NSSAI for the current PLMN shall be considered rejected for the current PLMN regardless of the access type. There shall be no duplicated PLMN identities in each of the list of configured NSSAI (s), allowed NSSAI (s) , rejected NSSAI (s) for the current PLMN, and rejected NSSAI (s) for the current registration area.

The UE stores NSSAIs as follows:

a) The configured NSSAI shall be stored until a new configured NSSAI is received for a given PLMN. The network may provide to the UE the mapped S-NSSAI (s) for the new configured NSSAI which shall also be stored in the UE. When the UE is provisioned with a new configured NSSAI for a PLMN, the UE shall:

1) replace any stored configured NSSAI for this PLMN with the new configured NSSAI for this PLMN;
2) delete any stored mapped S-NSSAI(s) for the configured NSSAI and, if available, store the mapped S-NSSAI (s) for the new configured NSSAI;
3) delete any stored allowed NSSAI for this PLMN and, if available, the stored mapped S-NSSAI(s) for the allowed NSSAI, if the UE received the new configured NSSAI for this PLMN and the “registration requested” indication in the same CONFIGURATION UPDATE COMMAND message but without any new allowed NSSAI for this PLMN included; and
4) delete any rejected NSSAI for the current PLMN, and rejected NSSAI for the current registration area.

If the UE receives an S-NSSAI associated with a PLMN ID from the network during the PDN connection establishment procedure in EPS as specified in 3GPP TS 24.301 [15], the UE may store the received S-NSSAI in the configured NSSAI for the PLMN TABLE 2-continued identified by the PLMN ID associated with the S-NSSAI, if not already in the configured NSSAI;

The UE may continue storing a received configured NSSAI for a PLMN and associated mapped S-NSSAI(s), if available, when the UE registers in another PLMN.

NOTE 1: The maximum number of configured NSSAIs and associated mapped S-NSSAIs for PLMNs other than the HPLMN that need to be stored in the UE, and how to handle the stored entries, are up to UE implementation.

b) The allowed NSSAI shall be stored until a new allowed NSSAI is received for a given PLMN. The network may provide to the UE the mapped S-NSSAI (s) for the new allowed NSSAI (see subclauses 5.5.1.2 and 5.5.1.3) which shall also be stored in the UE. When a new allowed NSSAI for a PLMN is received, the UE shall:

1) replace any stored allowed NSSAI for this PLMN with the new allowed NSSAI for this PLMN;
2) delete any stored mapped S-NSSAI (s) for the allowed NSSAI and, if available, store the mapped S-NSSAI (s) for the new allowed NSSAI; and
3) remove from the stored rejected NSSAI, the rejected S-NSSAI (s), if any, included in the new allowed NSSAI for the current PLMN;

If the UE receives the CONFIGURATION UPDATE COMMAND message indicating "registration requested" and contains no other parameters (see subclauses 5.4.4.2 and 5. 4. 4. 3) , the UE shall delete any stored allowed NSSAI for this PLMN, and delete any stored mapped S-NSSAI (s) for the allowed NSSAI, if available;

NOTE 2: Whether the UE stores the allowed NSSAI and the mapped S-NSSAI (s) for the allowed NSSAI also when the UE is switched off is implementation specific.

c) When the UE receives the S-NSSAI (s) included in rejected NSSAI in the REGISTRATION ACCEPT message or in the CONFIGURATION UPDATE COMMAND message, the UE shall:

1) store the S-NSSAI (s) into the rejected NSSAI based on the associated rejection cause (s) ;
2) remove from the stored allowed NSSAI for the current PLMN, the rejected S-NSSAI (s), if any, included in the:
   i) rejected NSSAI for the current PLMN, for each and every access type; and
   ii) rejected NSSAI for the current registration area, associated with the same access type;

Once the UE is deregistered over all access types, the rejected NSSAI for the current PLMN shall be deleted. Once the UE is deregistered over an access type, the rejected NSSAI for the current registration area corresponding to the access type shall be deleted. The UE shall delete, if any, the stored rejected NSSAI for the current registration area if the UE moves out of the registration area; and d) When the UE receives the Network slicing indication IE with the Network slicing subscription change indication set to "Network slicing subscription changed" in the REGISTRATION ACCEPT message or in the CONFIGURATION UPDATE COMMAND message, the UE shall delete the network slicing information for each of the PLMNs that the UE has slicing information stored for (excluding the current PLMN) . The UE shall not delete the default configured NSSAI. Additionally, the UE shall update the network slicing information for the current PLMN (if received) as specified above in bullets a) , b) and c) :

4.6.2.3 Provision of NSSAI to lower layers in 5GMM-IDLE mode

The UE NAS layer may provide the lower layers with an NSSAI (either requested NSSAI or allowed NSSAI) when the UE in 5GMM-IDLE mode sends an initial NAS message.

The AMF may indicate, via the NSSAI inclusion mode IE of a REGISTRATION ACCEPT message, an NSSAI inclusion mode in which the UE shall operate over the current access within the current PLMN, if any (see subclauses 5.5.1.2.4 and 5.5.1.3.4), where the NSSAI inclusion mode is chosen among the following NSSAI inclusion modes described in table 4.6.2.3.1.

Table 4.6.2.3.1: NSSAI inclusion modes and NSSAI which shall be provided to the lower layers TABLE 2-continued

| Initial NAS message | NSSAI inclusion mode A | NSSAI inclusion mode B | NSSAI inclusion mode C | NSSAI inclusion mode D |
|---|---|---|---|---|
| REGISTRATION REQUEST message : i) including the 5GS registration type IE set to “initial registration” | Requested NSSAI | Requested NSSAI | Requested NSSAI | No NSSAI |
| REGISTRATION REQUEST message : i) including the 5GS registration type IE set to “mobility registration updating”; and ii) initiated by case other than case g) or n) in subclause 5.5.1. 3.2 | Requested NSSAI | Requested NSSAI | Requested NSSAI | No NSSAI |
| REGISTRATION REQUEST message : i) including the 5GS registration type IE set to “mobility registration updating”; and ii) initiated by case g) or n) in subclause 5.5.1. 3.2 | Allowed NSSAI | Allowed NSSAI | No NSSAI | No NSSAI |
| REGISTRATION REQUEST message : i) including the 5GS registration type IE set to “periodic registration updating” | Allowed NSSAI | Allowed NSSAI | No NSSAI | No NSSAI |
| SERVICE REQUEST message | Allowed NSSAI | See NOTE 1 | No NSSAI | No NSSAI |

NOTE 1: All the S-NSSAIs of the PDU sessions that have the user-plane resources requested to be re-established by the service request procedure or the S-NSSAIs of a control plane interaction triggering the service request is related to (see 3GPP TS 23.501 [8])

NOTE 2: For a REGISTRATION REQUEST message including the 5GS registration type IE set to “emergency registration” and a DEREGISTRATION REQUEST message, no NSSAI is provided to the lower layers.

NOTE 3: The mapped configured S-NSSAI (s) from the S-NSSAI (s) of the HPLMN are not included as part of the S-NSSAIs in the requested NSSAI or the allowed NSSAI when it is provided to the lower layers.

The UE shall store the NSSAI inclusion mode:

a) indicated by the AMF, if the AMF included the NSSAI inclusion mode IE in the REGISTRATION ACCEPT message; or b) decided by the UE, if the AMF did not include the NSSAI inclusion mode IE in the REGISTRATION ACCEPT message;

together with the identity of the current PLMN and access type in a non-volatile memory in the ME as specified in annex C.

The UE shall apply the NSSAI inclusion mode received in the REGISTRATION ACCEPT message over the current access within the current PLMN and its equivalent PLMN (s), if any, in the current registration area.

TABLE 2-continued

| |
|---|
| When a UE performs a registration procedure to a PLMN which is not a PLMN in the current registration area, if the UE has no NSSAI inclusion mode for the PLMN stored in a non-volatile memory in the ME, the UE shall provide the lower layers with:<br>a) no NSSAI if the UE is performing the registration procedure over 3GPP access; or<br>b) requested NSSAI if the UE is performing the registration procedure over non-3GPP access.<br>When a UE performs a registration procedure after an inter-system change from S1 mode to N1 mode, if the UE has no NSSAI inclusion mode for the PLMN stored in a non-volatile memory in the ME and the registration procedure is performed over 3GPP access, the UE shall not provide the lower layers with any NSSAI over the 3GPP access.<br>4.6.3 Session management aspects<br>In order to enable PDU transmission in a network slice, the UE may request establishment of a PDU session in a network slice towards a data network (DN) which is associated with an S-NSSAI and a data network name (DNN) if there is no established PDU session adequate for the PDU transmission. The S-NSSAI included is part of allowed NSSAI of the serving PLMN, which is an S-NSSAI value valid in the serving PLMN, and in roaming scenarios the mapped S-NSSAI is also included for the PDU session if available. See subclause 6.4.1 for further details. The UE determines whether to establish a new PDU session or use one of the established PDU session (s) based on the URSP rules which include S-NSSAIs, if any (see subclause 6.2.9), or based on UE local configuration, as described in subclause 4.2.2 of 3GPP TS 24.526 [19]. |

1.4.4: Introduction: Registration Procedure for Sliced Network

Figure 3:
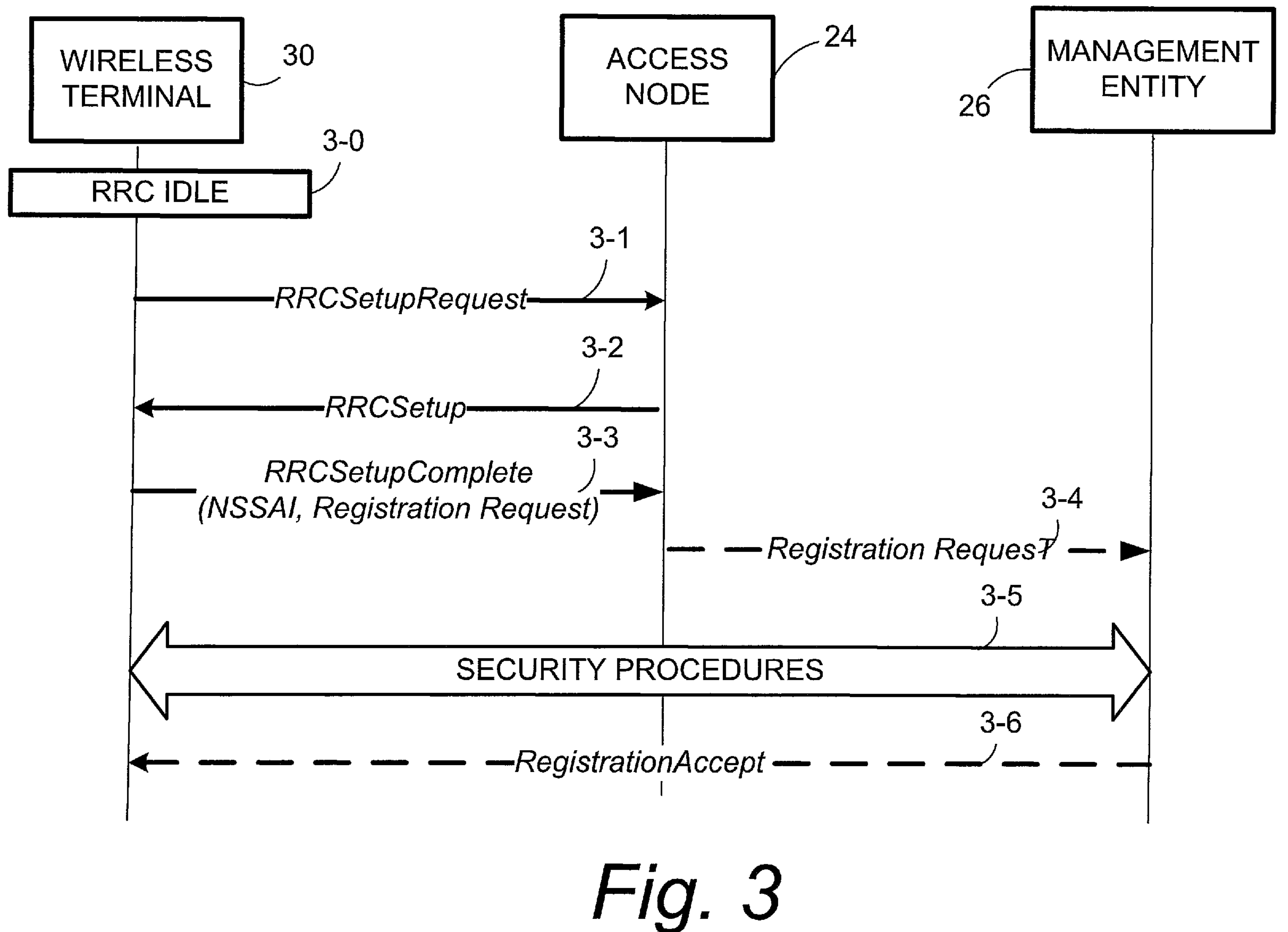
FIG. 3 shows an example scenario of a wireless terminal performing a registration procedure in a sliced network.

FIG. 3 shows an example scenario for the wireless terminal to perform a registration procedure. As shown in act 3-0, the wireless terminal is in RRC_IDLE state. Act 3-1 shows that the wireless terminal may send, triggered by NAS, a RRCSetupRequest message to the access node of the cell that the wireless terminal is currently camping on. In act 3-1, NAS may provide to RRC a Registration Request message and an NSSAI, e.g., Requested NSSAI. As act 3-2 the access node may then respond to the RRCSetupRequest message with an RRCSetup message. Upon receiving the RRCSetup message, as act 3-3 the wireless terminal may send an RRCSetupComplete message, which may include the provisioned NSSAI and the Registration Request message. The access node may use the NSSAI received in the RRCSetupComplete message to select a management entity (e.g., AMF). As act 3-4 the access node may then transparently forward the Registration Request message to the selected management entity. After the wireless terminal, the access node and the management entity perform a security procedure, shown as act 3-5, the management entity may respond to the Registration Request message with a Registration Accept message, illustrated as act 3-6.

In some configurations, the Registration Request message piggybacked in the RRCSetupComplete message (see act 3-3) may also comprise an NSSAI, e.g., Requested NSSAI, which may be used by the management entity and other core network entities to determine an Allowed NSSAI for the wireless terminal. The Allowed NSSAI may be included in the Registration Accept message. Table 3 shows an example format of the RRCSetupComplete message, wherein the information element s-NSSAI-List carries the NSSAI (e.g. Requested NSSAI). Table 4 shows an example format of the Registration Request message of act 3-4. Table 5 shows an example format of the Registration Accept message. The AMF may include a Rejected NSSAI to inform the wireless terminal of the S-NSSAIs that were included in the requested NSSAI in the REGISTRATION REQUEST message but were rejected by the network. In addition, the AMF may also include a Configured NSSAI if the network needs to provide the wireless terminal with a new configured NSSAI for the current PLMN.

TABLE 3

```
RRCSetupComplete ::=                    SEQUENCE {
    rrc-TransactionIdentifier               RRC-TransactionIdentifier,
    criticalExtensions                      CHOICE {
        rrcSetupComplete                        RRCSetupComplete-IEs,
        criticalExtensionsFuture                SEQUENCE {}
    }
}
RRCSetupComplete-IEs ::=                    SEQUENCE {
   selectedPLMN-Identity                INTEGER (1..maxPLMN),
   registeredAMF                        RegisteredAME
OPTIONAL,
    guami-Type                          ENUMERATED {native, mapped}
OPTIONAL,
    S-NSSAI-List                        SEQUENCE (SIZE (1..maxNrofS-NSSAI)) OF
S-NSSAI      OPTIONAL,
   dedicatedNAS-Message                 DedicatedNAS-Message,
   ng-5G-S-TMSI-Value                   CHOICE {
       ng-5G-S-TMSI                         NG-5G-S-TMSI,
       ng-5G-S-TMSI-Part2                   BIT STRING (SIZE (9))
    }
```

TABLE 3-continued

```
OPTIONAL,
     lateNonCriticalExtension                  OCTET STRING
OPTIONAL,
     nonCriticalExtension                      SEQUENCE { }
OPTIONAL
}
RegisteredAMF ::=                     SEQUENCE {
     plmn-Identity                       PLMN-Identity
OPTIONAL,
     amf-Identifier                      AMF-Identifier
}
```

TABLE 4

| IEI | Information Element | Type/Reference | Presence | Format | Length |
|---|---|---|---|---|---|
| | Extended protocol discriminator | Extended Protocol discriminator 9.2 | M | V | 1 |
| | Security header type | Security header type 9.3 | M | V | ½ |
| | Spare half octet | Spare half octet 9.5 | M | V | ½ |
| | Registration request message identity | Message type 9.7 | M | V | 1 |
| | 5GS registration type | 5GS registration type 9.11.3.7 | M | V | ½ |
| | ngKSI | NAS key set identifier 9.11.3.32 | M | V | ½ |
| | 5GS mobile identity | 5GS mobile identity 9.11.3.4 | M | LV-E | 6-n |
| C– | Non-current native NAS key set identifier | NAS key set identifier 9.11.3.32 | O | TV | 1 |
| 10 | 5GMM capability | 5GMM capability 9.11.3.1 | O | TLV | 3-15 |
| 2E | UE security capability | UE security capability 9.11.3.54 | O | TLV | 4-10 |
| 2F | Requested NSSAI | NSSAI 9.11.3.37 | O | TLV | 4-74 |
| 52 | Last visited registered TAI | 5GS tracking area identity 9.11.3.8 | O | TV | 7 |
| 17 | S1 UE network capability | S1 UE network capability 9.11.3.48 | O | TLV | 4-15 |
| 40 | Uplink data status | Uplink data status 9.11.3.57 | O | TLV | 4-34 |
| 50 | PDU session status | PDU session status 9.11.3.44 | O | TLV | 4-34 |
| B– | MICO indication | MICO indication 9.11.3.31 | O | TV | 1 |
| 2B | UE status | UE status 9.11.3.56 | O | TLV | 3 |
| 77 | Additional GUTI | 5GS mobile identity 9.11.3.4 | O | TLV-E | 14 |
| 25 | Allowed PDU session status | Allowed PDU session status 9.11.3.13 | O | TLV | 4-34 |
| 18 | UE's usage setting | UE's usage setting 9.11.3.55 | O | TLV | 3 |
| 5 | Requested DRX parameters | 5GS DRX parameters 9.11.3.2A | O | TLV | 3 |
| 70 | EPS NAS message container | EPS NAS message container 9.11.3.24 | O | TLV-E | 4-n |
| 74 | LADN indication | LADN indication 9.11.3.29 | O | TLV-E | 3-811 |
| | Payload container type | Payload container type 9.11.3.40 | O | TV | 1 |
| 7B | Payload container | Payload container 9.11.3.39 | O | TLV-E | 4-65538 |

TABLE 4-continued

| | | | | | |
|---|---|---|---|---|---|
| 9– | Network slicing indication | Network slicing indication 9.11.3.36 | O | TV | 1 |
| 53 | 5GS update type | 5GS update type 9.11.3.9A | O | TLV | 3 |
| 71 | NAS message container | NAS message container 9.11.3.33 | O | TLV-E | 4-n |
| 60 | EPS bearer context status | EPS bearer context status 9.11.3.23A | O | TLV | 4 |

| 8 | 7 | 6 | 5 | 4 | 3 | 2 | 1 | |
|---|---|---|---|---|---|---|---|---|
| z | z | z | z | z z | z | z | z z | z |
| NSSAI IEI | | | | | | | | octet 1 |
| Length of NSSAI contents | | | | | | | | octet 2 |
| S-NSSAI value 1 | | | | | | | | octet 3<br>octet m |
| S-NSSAI value 2 | | | | | | | | octet m + 1*<br>octet n* |
| . . . | | | | | | | | octet n + 1*<br>octet u* |
| S-NSSAI value n | | | | | | | | octet u + 1*<br>octet v* |

NSSAI information element

| 8 | 7 | 6 | 5 | 4 | 3 | 2 | 1 | |
|---|---|---|---|---|---|---|---|---|
| Network slicing indication IEI | | | | 0<br>Spare | 0<br>Spare | DCNI | NSSCI | octet 1 |

Network slicing indication

Network slicing subscription change indication (NSSCI) (octet 1, bit 1)

| Bit<br>1 | |
|---|---|
| 0 | Network slicing subscription not changed |
| 1 | Network slicing subscription changed |

Default configured NSSAI indication (DCNI) (octet 1, bit 2)

| Bit<br>2 | |
|---|---|
| 0 | Requested NSSAI not created from default configured NSSAI |
| 1 | Requested NSSAI created from default configured NSSAI |

In the UE to network direction bit 1 is spare. The UE shall set this bit to zero.
In the network to UE direction bit 2 is spare. The network shall set this bit to zero.
Bits 3 and 4 are spare and shall be coded as zero.

| 8 | 7 | 6 | 5 | 4 | 3 | 2 | 1 | |
|---|---|---|---|---|---|---|---|---|
| S-NSSAI IEI | | | | | | | | octet 1 |
| Length of S-NSSAI contents | | | | | | | | octet 2 |
| SST | | | | | | | | octet 3 |
| SD | | | | | | | | octet 4*<br>octet 6* |
| Mapped HPLMN SST | | | | | | | | octet 7* |
| Mapped HPLMN SD | | | | | | | | octet 8*<br>octet 10* |

S-NSSAI information element

TABLE 5

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | Registration accept message identity | Message type 9.7 | M | V | 1 |
| | 5GS registration result | 5GS registration result 9.11.3.6 | M | LV | 2 |
| 77 | 5G-GUTI | 5GS mobile identity 9.11.3.4 | O | TLV-E | 14 |
| 4A | Equivalent PLMNs | PLMN list 9.11.3.45 | O | TLV | 5-47 |

TABLE 5-continued

| IEI | Information Element | Type/Reference | Presence | Format | Length |
|---|---|---|---|---|---|
| 54 | TAI list | 5GS tracking area identity list 9.11.3.9 | O | TLV | 9-114 |
| 15 | Allowed NSSAI | NSSAI 9.11.3.37 | O | TLV | 4-74 |
| 11 | Rejected NSSAI | Rejected NSSAI 9.11.3.46 | O | TLV | 4-42 |
| 31 | Configured NSSAI | NSSAI 9.11.3.37 | O | TLV | 4-146 |
| 21 | 5GS network feature support | 5GS network feature support 9.11.3.5 | O | TLV | 3-5 |
| 50 | PDU session status | PDU session status 9.11.3.44 | O | TLV | 4-34 |
| 26 | PDU session reactivation result | PDU session reactivation result 9.11.3.42 | O | TLV | 4-34 |
| 72 | PDU session reactivation result error cause | PDU session reactivation result error cause 9.11.3.43 | O | TLV-E | 5-515 |
| 79 | LADN information | LADN information 9.11.3.30 | O | TLV-E | 12-1715 |
| B- | MICO indication | MICO indication 9.11.3.31 | O | TV | 1 |
| 9- | Network slicing indication | Network slicing indication 9.11.3.36 | O | TV | 1 |
| 27 | Service area list | Service area list 9.11.3.49 | O | TLV | 6-114 |
| 5E | T3512 value | GPRS timer 3 9.11.2.5 | O | TLV | 3 |
| 5D | Non-3GPP de-registration timer value | GPRS timer 2 9.11.2.4 | O | TLV | 3 |
| 16 | T3502 value | GPRS timer 2 9.11.2.4 | O | TLV | 3 |
| 34 | Emergency number list | Emergency number list 9.11.3.23 | O | TLV | 5-50 |
| 7A | Extended emergency number list | Extended emergency number list 9.11.3.26 | O | TLV-E | 7-65538 |
| 73 | SOR transparent container | SOR transparent container 9.11.3.51 | O | TLV-E | 20-2048 |
| 78 | EAP message | EAP message 9.11.2.2 | O | TLV-E | 7-1503 |
| A- | NSSAI inclusion mode | NSSAI inclusion mode 9.11.3.37A | O | TV | 1 |
| 76 | Operator-defined access category definitions | Operator-defined access category definitions 9.11.3.38 | O | TLV-E | 3-n |
| 51 | Negotiated DRX parameters | 5GS DRX parameters 9.11.3.2A | O | TLV | 3 |
| D- | Non-3GPP NW policies | Non-3GPP NW provided policies 9.11.3.36A | O | TV | 1 |
| 60 | EPS bearer context status | EPS bearer context status 9.11.3.23A | O | TLV | 4 |

2.0 Cell (Re)Selection for Network Slicing

In some configurations or occasions, it is desired for network operators to designate one or more radio spectrums, e.g. frequencies, radio bands, to a network slice(s). For example, a network slice for Ultra-Reliable Low Latency Communication (URLLC) may be served by one or more specific radio frequencies. For this purpose, GSM Association has published the document NG.116, General Network Slice Template, which includes a template to specify radio spectrum(s) to be supported by a network slice, as shown in Table 6.

TABLE 6

| Parameters Value | {String, String, String, . . . } |
|---|---|
| Measurement unit | NA |
| Example | n1<br>n77<br>n38 |
| Tags | Scalability attribute |

Figure 4:
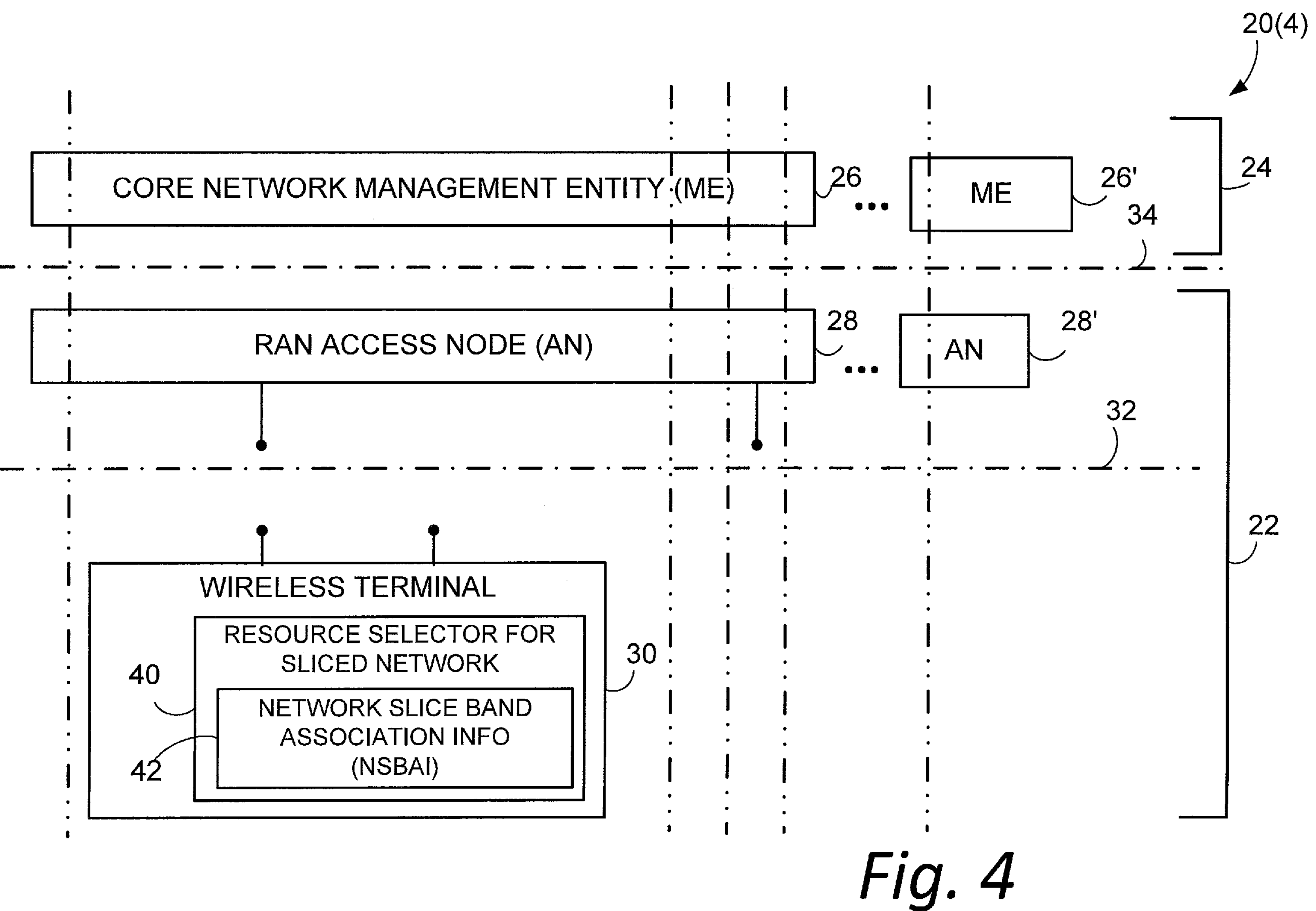
FIG. 4 is a schematic view of a generic communications system utilizing network slice technology and wherein a wireless terminal performs resource selection utilizing network slice band association information.

Various example embodiments and modes described herein pertain to methods and procedures for UE/network to perform/control a cell selection under the restriction of radio spectrum(s) for network slicing. FIG. 4 shows a generic communications system 20(4) which utilizes network slice technology and wherein, according to one or more of various aspects of the technology disclosed herein, a wireless terminal performs resource selection utilizing network slice band association information. The communications system 20(4) of FIG. 4, like the communications system 20 of FIG. 1, comprises one or more radio access networks (RANs) 22 and one or more core networks (CNs) 24. Similarly, core network (CN) 24 of FIG. 4 is shown as comprising one or more management entities 26, 26', . . . . A management entity 26 may be, for example, an Access and Mobility Management Function (AMF). Radio access network (RAN) 22 is shown as comprising one or more access nodes 28, 28' . . . . Although not illustrated as such, the communications system 20(4) of FIG. 3 may be and usually is utilized by plural PLMNs, as indicated by the dashed and double dotted vertical lines.

In the generic communications system 20(4) and other example embodiments and modes encompassed thereby, wireless terminal 30 communicates with a management entity ME of a core network through an access node of a radio access network (RAN), such as one of the access nodes 28. The core network supports one or more network slices, each of the network slices providing a designated service within a public land mobile network (PLMN).

Since the communications system 20(4) is generic to various other example embodiments and modes described herein, it is again mentioned that the wireless terminal may take various forms as mentioned above, and likewise that the access node may have been implemented in many different ways. For example, in addition to the foregoing comments concerning access nodes, it should be mentioned that in any of the example embodiments and modes described herein that the radio access network (RAN) 22 the source and destination may be interconnected by way of a plurality of nodes. In such a network, the source and destination may not be able to communicate with each other directly due to the distance between the source and destination being greater than the transmission range of the nodes. That is, a need exists for intermediate node(s) to relay communications and provide transmission of information. Accordingly, intermediate node(s) may be used to relay information signals in a relay network, having a network topology where the source and destination are interconnected by means of such intermediate nodes. In a hierarchical telecommunications network, backhaul portion of the network may comprise the intermediate links between the core network and the small subnetworks of the entire hierarchical network. Integrated Access and Backhaul (IAB) Next generation NodeB use 5G New Radio communications such as transmitting and receiving NR User Plane (U-Plane) data traffic and NR Control Plane (C-Plane) data. Thus, the radio access network (RAN) 22 may include or represent one or more IAB nodes, including an IAB-donor node which may provide interface to a core network to UEs and wireless backhauling functionality to other IAB-nodes.

Moreover, generic communications system 20(4), and any other communications system described herein, may be realized in virtualized and/or distributed and/or logical form. For example, any access node that serves as a donor node in connecting to the core network may comprise at least one Central Unit (CU) and at least one Distributed Unit (DU). The CU is a logical entity managing the DU collocated in the IAB-donor as well as the remote DUs resident in the IAB-nodes. The CU may also be an interface to the core network, behaving as a RAN base station (e.g., eNB or gNB). In some embodiments, the DU is a logical entity hosting a radio interface (backhaul/access) for other child IAB-nodes and/or UEs. In one configuration, under the control of CU, the DU may offer a physical layer and Layer-2 (L2) protocols (e.g., Medium Access Control (MAC), Radio Link Control (RLC), etc.) while the CU may manage upper layer protocols (such as Packet Data Convergence Protocol (PDCP), Radio Resource Control (RRC), etc.). Access nodes that are not Donor nodes, e.g., IAB-nodes, may comprise DU and Mobile-Termination (MT) functions, where in some embodiments the DU may have the same functionality as the DU in the IAB-donor, whereas MT may be a UE-like function that terminates the radio interface layers. As an example, the MT may function to perform at least one of: radio transmission and reception, encoding and decoding, error detection and correction, signaling, and access to a SIM.

Herein, the term "band" is used to define a set of one or more frequency domain intervals. For a frequency division duplex (FDD), a band may comprise a pair of separate intervals for uplink and downlink transmission respectively, whereas for a time division duplex (TDD), a band may comprise a single interval shared by uplink and downlink. A band may represent a radio spectrum(s) or a spectrum band, symbolized by letter(s) and/or numbers, such as n1, n77 and n38 in Table 6. Although it should be understood that throughout the description of the technology disclosed herein the term "band" can be replaced by any other form of interval(s), such as a radio channel with a channel number (e.g. absolute radio frequency channel number, ARFCN), or by a bandwidth part (BWP) of a radio band.

Figure 5:
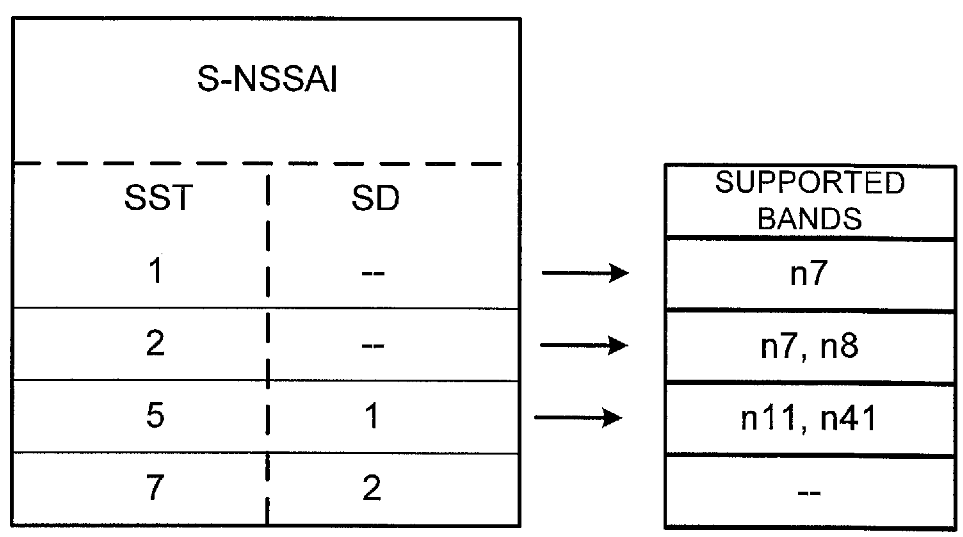
FIG. 5 is a diagrammatic view of an example implementation of the network slice band association information.

FIG. 4 simply illustrates by dashed and double dotted vertical lines that communications system 20(3) may utilize network slicing technology. For the generic embodiment of FIG. 4 and other example embodiments and modes described herein, the wireless terminal 30 may be configured with network slice band association information, NSBAI, also referred to as "network slice availability information", in order to instruct the wireless terminal 30 how to select a band supported by a network slice(s) of interest. The network slice band association information may comprise one or more S-NSSAIs, wherein each of the S-NSSAIs may optionally be associated with one or more supported bands. FIG. 5 shows an example implementation of the network slice band association information, wherein each entry of S-NSSAIs is associated with a list of supported bands. An S-NSSAI not associated with any supported bands (e.g. SST=7) may indicate that the S-NSSAI is not bounded to specific bands.

The generic example embodiment and mode of FIG. 4 shows that wireless terminal 30 comprises terminal resource selector 40 for use in a sliced network. As indicated above, the wireless terminal performs resource selection utilizing network slice band association information. As such, FIG. 4 shows that terminal resource selector 40 has access to network slice band association information 42, which is abbreviated for sake of convenience as NSBAI. The network slice band association information (NSBAI) 42 may be stored in a memory or memory circuitry.

As understood with reference to FIG. 5, the network slice band association information comprises a list of network slice identifiers, the network slice identifiers being shown in FIG. 5 as S-NSSAIs. Each of the network slice identifiers identifies a network slice, and each of at least some of the network slice identifiers are associated with a corresponding radio band(s), as shown by the rightwardly-pointing arrows in FIG. 5. The one or more radio bands are determined from a corresponding radio band(s) associated with the network slice identifier(s) of the at least one network slice.

Figure 6:
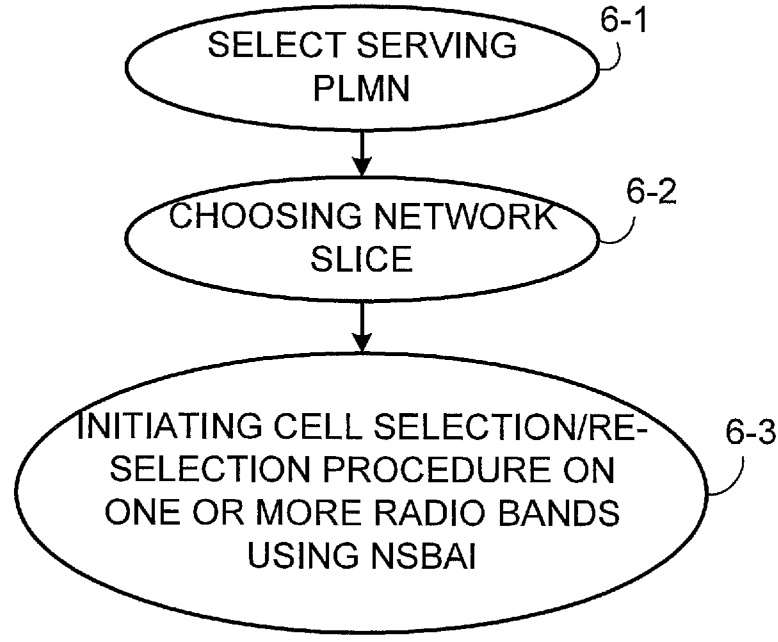
FIG. 6 is a diagrammatic view showing representative, example steps or acts performed by a wireless terminal of the generic communications system of FIG. 4.

FIG. 6 shows representative, example steps or acts performed by the wireless terminal 30 of the generic communications system 20(4). Act 6-1 comprises select a serving PLMN. Act 6-2 comprises choosing at least one network slice. Act 6-3 comprises initiating, based on network slice band association information, a cell selection/reselection procedure on one or more radio bands.

Figure 7:
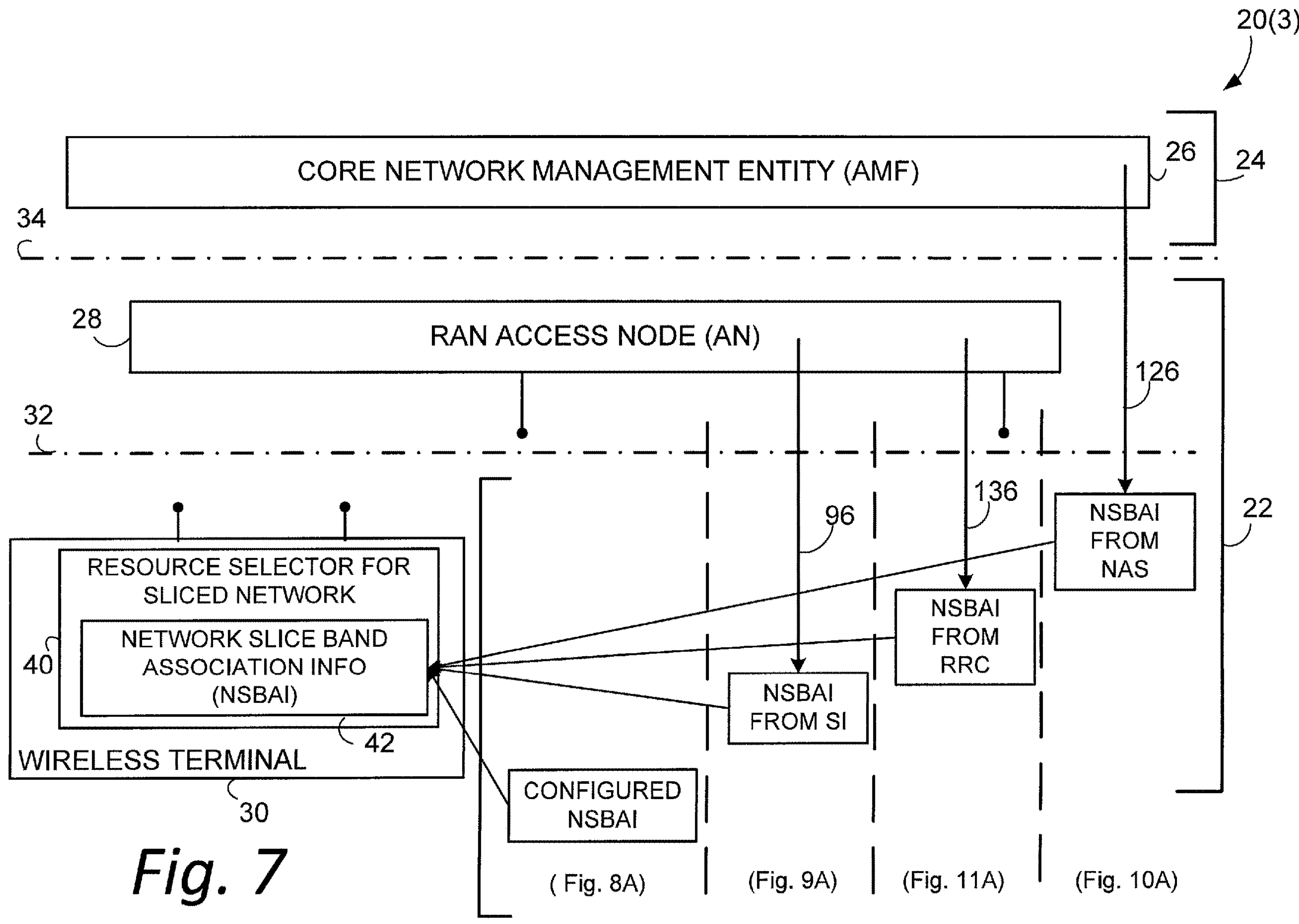
FIG. 7 is a schematic view of the generic communications system of FIG. 4 and further showing various example ways in which a wireless terminal may acquire network slice band association information.

FIG. 7 shows, in simplified diagrammatic form, various example ways in which the wireless terminal 30 may acquire the network slice band association information 42. In an example embodiment and mode depicted by FIG. 8A and FIG. 8B, the network slice band association information (NSBAI) 42 is configured at the wireless terminal 30. In an example embodiment and mode depicted by FIG. 9A and FIG. 9B, the network slice band association information (NSBAI) 42 is provided to the wireless terminal 30 by system information (SI). In an example embodiment and mode depicted by FIG. 10A and FIG. 10B, the network slice band association information (NSBAI) 42 is provided to the wireless terminal 30 by the non-access stratum (NAS). In an example embodiment and mode depicted by FIG. 11A and FIG. 11B, the network slice band association information (NSBAI) 42 is provided to the wireless terminal 30 by radio resource control (RRC) signaling.

2.1 Configured NSBAI

Figure 8A:
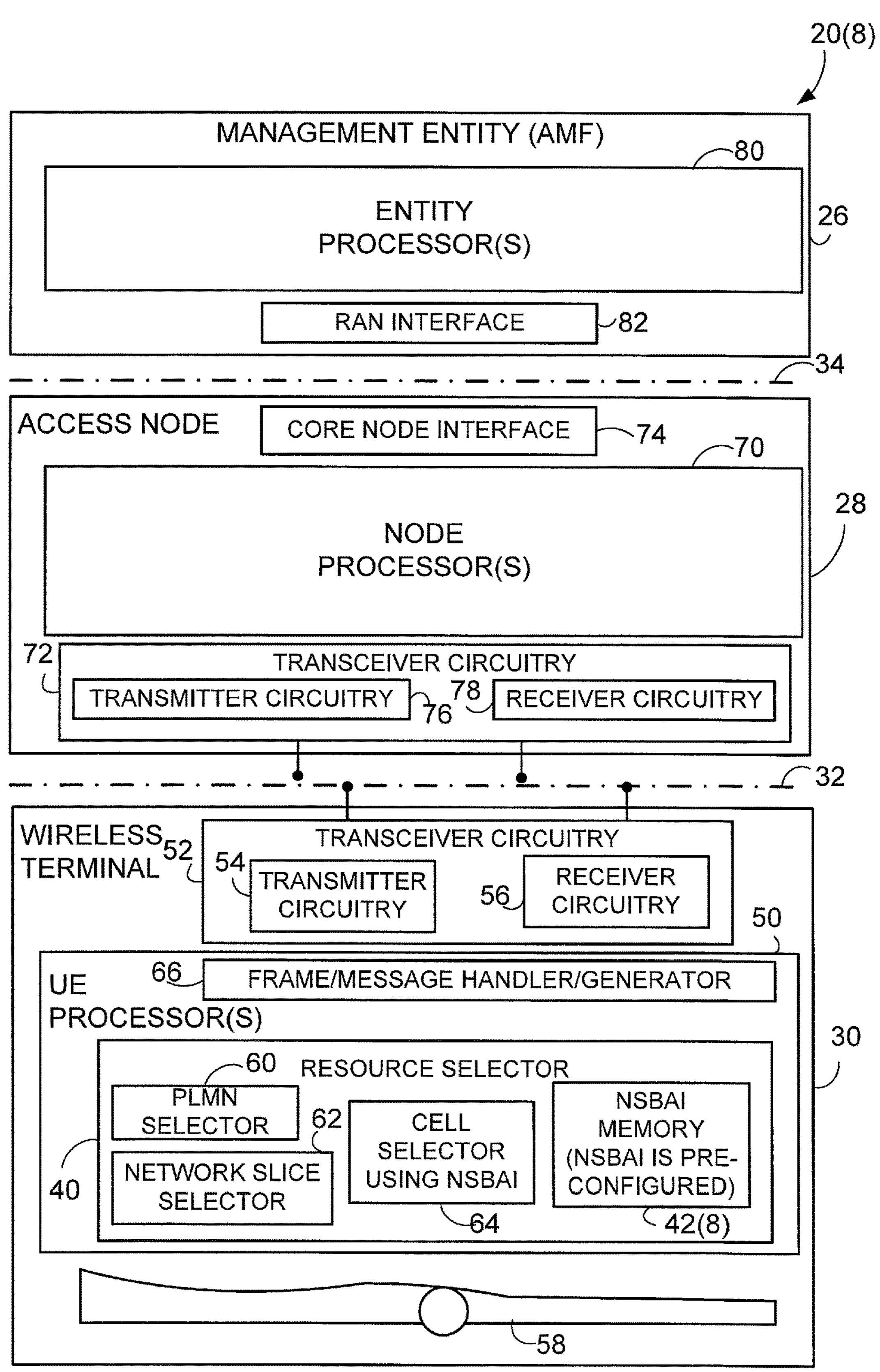
FIG. 8A is a schematic view of an example communications system in which network slice band association information (NSBAI) is configured at the wireless terminal 30.
Figure 8B:
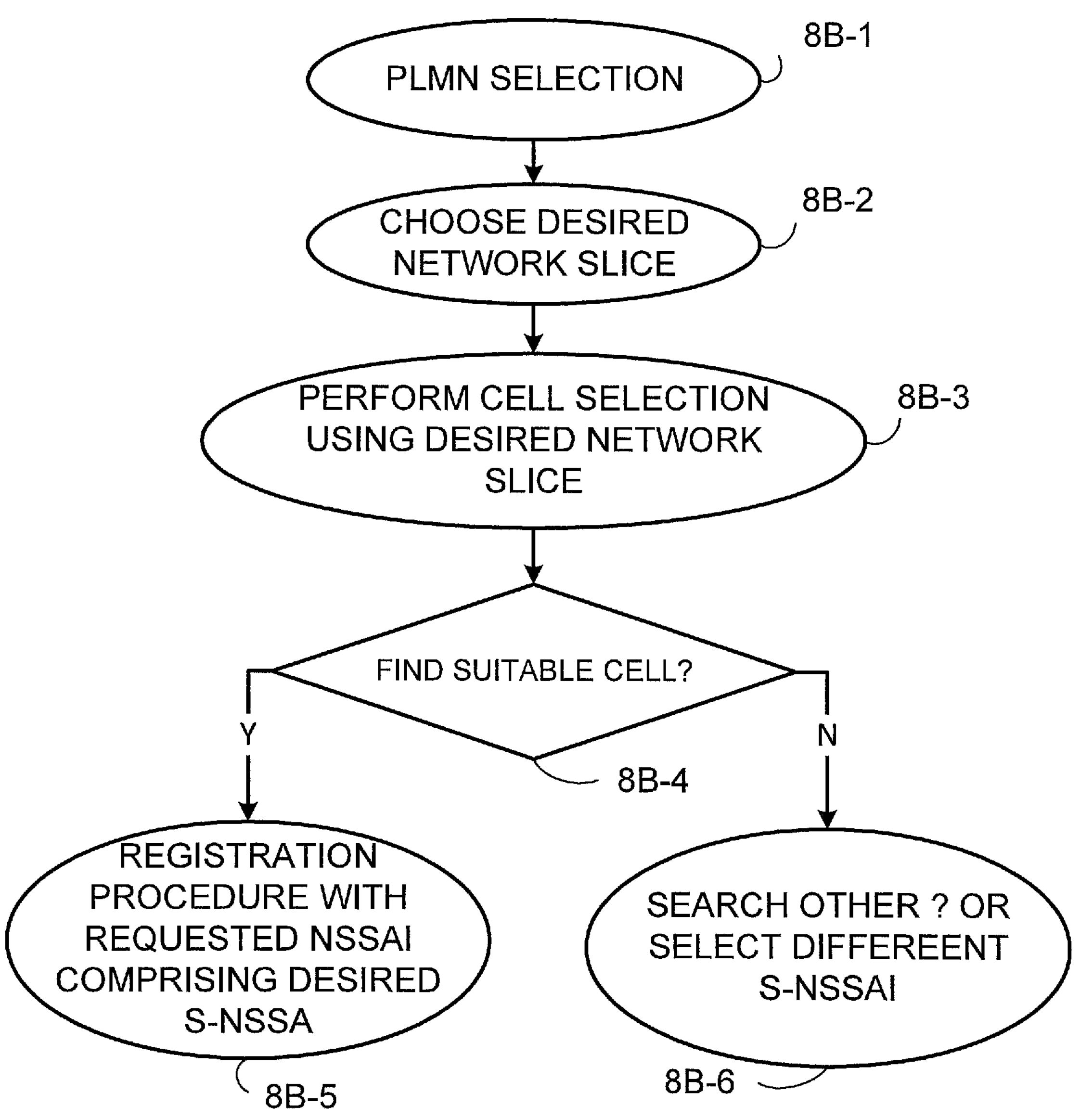
FIG. 8B is a diagrammatic view of example, representative acts or steps that are performed for resource selection for the communications system of FIG. 8A.

FIG. 8A shows, in more detail, an example communications system 20(8) in which network slice band association information (NSBAI) 42 is configured at the wireless terminal 30. FIG. 8B shows example, representative acts or steps that are performed for resource selection for the communications system 20(6) of FIG. 8B.

FIG. 8A shows that wireless terminal 30 comprises terminal processor circuitry 50 and terminal transceiver circuitry 52. The terminal processor circuitry 50 may be realized or comprise one or more processors and at least one memory. The memory includes computer program code, wherein the memory and the computer program code are configured to, working with the at least one processor, cause the decoding device to perform at least at least the operations described herein.

The transceiver circuitry 52 in turn may comprise terminal transmitter circuitry 54 and terminal receiver circuitry 56. The transceiver circuitry 52 includes antenna(e) for the wireless transmission. Transmitter circuitry 54 may include, e.g., amplifier(s), modulation circuitry and other conventional transmission equipment. Receiver circuitry 56 may comprise, e.g., amplifiers, demodulation circuitry, and other conventional receiver equipment. FIG. 8A further shows that wireless terminal 30 may also comprise terminal interfaces 58. Such user interfaces may serve for both user input and output operations, and may comprise (for example) a screen such as a touch screen that can both display information to the user and receive information entered by the user. The interfaces 58 may also include other types of devices, such as a speaker, a microphone, or a haptic feedback device, for example.

The terminal processor circuitry 50 of FIG. 8A is shown as including terminal resource selector 40. In addition to network slice band association information (NSBAI) 42, the terminal resource selector 40 comprises PLMN selector 60; network slice selector 62; and cell selector 64 which uses network slice band association information (NSBAI) 42. In addition, terminal processor circuitry 50 may include frame/message generator/handler 66, as well as many other unillustrated functionalities including those not strictly germane to the technology disclosed herein.

The access node 28 of communications system 20(6) comprises node processor circuitry 70; node transceiver circuitry 72; and interface 74 to core network (CN) 24. The node processor circuitry 70 may be realized or comprise one or more processors and at least one memory. The memory includes computer program code, wherein the memory and the computer program code are configured to, working with the at least one processor, cause the decoding device to perform at least at least the operations described herein.

The node transceiver circuitry 72 may comprise node transmitter circuitry 76 and node receiver circuitry 78. The transceiver circuitry 72 includes antenna(e) for the wireless transmission. Transmitter circuitry 76 may include, e.g., amplifier(s), modulation circuitry and other conventional transmission equipment. Receiver circuitry 78 may comprise, e.g., amplifiers, demodulation circuitry, and other conventional receiver equipment. As indicated above, various aspects of access node 28 including the node transceiver circuitry 72 may be realized by a distributed unit (DU) and a mobile termination unit (MT).

The management entity 26 of communications system 20(8) may comprise core network entity processor circuitry 80 and interface 82 toward the radio access network (RAN) 22. The core network entity processor circuitry 80 may be realized or comprise one or more processors and at least one memory. The memory includes computer program code, wherein the memory and the computer program code are configured to, working with the at least one processor, cause the decoding device to perform at least at least the operations described herein.

In one example implement of the embodiment of FIG. 8A, the network slice band association information may be pre-configured to the wireless terminal 30. The network slice band association information (NSBAI) 42 is preferably preconfigured to the wireless terminal 30 by a home PLMN, HPLMN. In some deployment scenarios, the network slice band association information may be common to the HPLMN and roaming partners, e.g. VPLMNs. In this case, S-NSSAIs in the network slice band association information may be considered to be, or derived from, a default NSSAI with standardized SST values. In other scenarios, the network slice band association information is configured per PLMN, i.e., a separate network slice band association information may be configured for a specific PLMN, HPLMN or VPLMN. In this case, the network slice band association information may include S-NSSAIs with standardized and/or non-standardized SST values.

FIG. 8B shows example, representative acts or steps performed by the wireless terminal 30 of the communications system 20(8). Act 8B-1 shows wireless terminal 30 performing a PLMN selection procedure. After performing the PLMN selection procedure to choose a PLMN, as act 8B-2 the wireless terminal 30 may choose desired network slice(s). Based on the chosen desired network slice(s) of act 8B-2, as act 8B-3 the wireless terminal 30 may perform the cell selection procedure, only on or prioritizing the band(s) associated with the chosen network slice(s). For example, suppose that the wireless terminal 30 chooses the S-NSSAI with its SST value 2 in FIG. 5, which instructs the wireless terminal 30 to search cells on bands n7 and n8. Act 8B-4 comprises wireless terminal 30 checking to determine if a suitable cell was successfully found in either of the bands. If the wireless terminal 30 successfully finds a suitable cell in either of the bands, as act 8B-5 the wireless terminal 30 may proceed to performing the aforementioned registration procedure with a requested NSSAI comprising the chosen S-NSSAI (with SST=2). If the wireless terminal 30 fails to find a suitable cell in those bands, as act 8B-6 the wireless terminal 30 may search for other bands, or may select a different S-NSSAI (such as the S-NSSAI with SST=5 associated with n11 and n41).

2.2 NSBAI Obtained from System Information

Figure 9A:
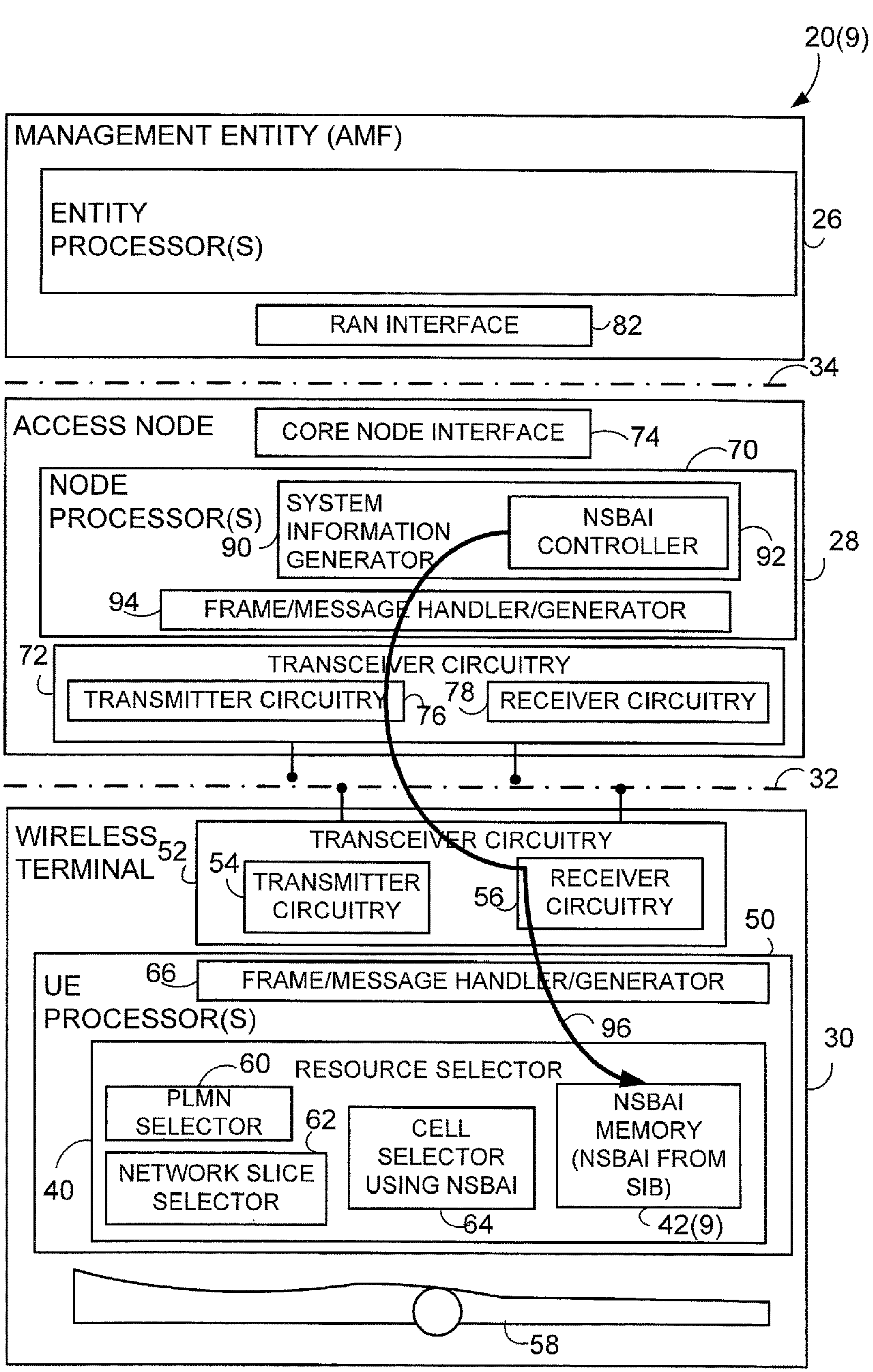
FIG. 9A is a schematic view of an example communications system in which network slice band association information (NSBAI) is obtained by a wireless terminal from system information.
Figure 9B:
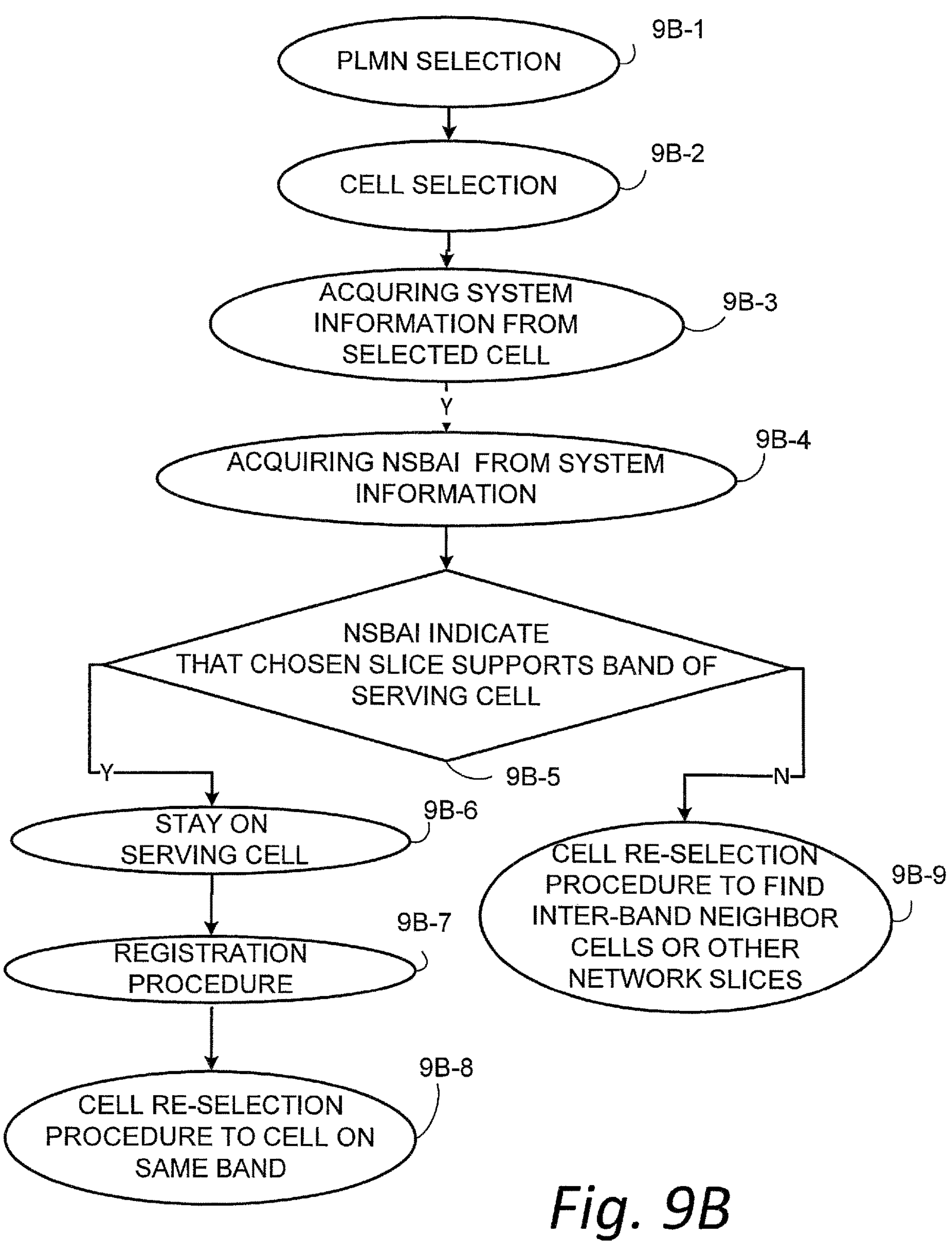
FIG. 9B is a diagrammatic view of example, representative acts or steps that are performed for resource selection for the communications system of FIG. 9A.

FIG. 9A is a schematic view of an example communications system 20(9) in which network slice band association information (NSBAI) is obtained by a wireless terminal from system information. FIG. 9B is a diagrammatic view of example, representative acts or steps that are performed for resource selection for the communications system of FIG. 9A.

Structures and functionalities of the communications system 20(9) of FIG. 9A which are common or essentially the same as one of more of the preceding example embodiments have the same reference numerals and may not be again discussed with reference to FIG. 9A. For example, much of the structure of wireless terminal 30 of FIG. 9A is similar to preceding example embodiments. In view of the fact that in the example embodiment of FIG. 9A the wireless terminal 30 receives its network slice band association information (NSBAI) 42 from system information, FIG. 9A further shows access node 28 as comprising system information generator 90, which is configured to generate system information such as system information blocks, e.g., SIBs, for the cell(s) served by access node 28. The system information generator 90 includes a unit or functionality herein known as node NSBAI controller 92 which controls the formatting or inclusion of the network slice band association information (NSBAI) 42 in the system information generated by system information generator 90. In some example modes, implementations, or scenarios, the NSBAI may be generated by the access node based on (pre)configurations from the management entity. For example, the NSBAI may be generated by the node NSBAI controller 92 based on (pre) configurations from the management entity. In other example modes, implementations, or scenarios, the NSBAI may be generated by the management entity and provided to the access node, e.g., provided to node NSBAI controller 92 so that node NSBAI controller 92 may include the NSBAI in the system information. The system information generator 90 with its node NSBAI controller 92 preferably comprises or is included in node processor circuitry 70 of access node 28. FIG. 9A further illustrates that the node processor circuitry 70 of access node 28 typically also includes a frame/message handler/generator 94, which may serve to format the system information in transmissions of access node 28. The arrow 96 of FIG. 9A shows that wireless terminal 30 of FIG. 9A receives its network slice band association information in memory (NSBAI) 42(9).

In the example embodiment and mode of FIG. 9A the network slice band association information may be broadcasted in system information, e.g. in one or more system information blocks, SIBs. In the FIG. 9A embodiment and mode, the network slice band association information may be specific, e.g., valid (1) within the serving PLMN, (2) within a registration area of the serving PLMN, or (3) within a cell(s) served by an access node, e.g., cells served by the access node. In an example embodiment and mode a network entity, e.g. an AMF 26, may (pre)configure access nodes with available network slices and supported band information, as explained above.

FIG. 9B shows example acts or steps that may be performed by the communications system 20(9) of FIG. 9A. Act 9B-1 shows wireless terminal 30 performing a PLMN selection procedure; act 9B-2 comprises the wireless terminal 30 performing a cell selection procedure as disclosed above. Act 9B-3 comprises the wireless terminal 30 acquiring, from a selected cell, a system information message(s). Act 9B-4 comprises wireless terminal 30 obtaining the network slice band association information from the system information.

The cell that provides the network slice band association information via system information may advertise more than one PLMN. For example, SIB1 may possibly indicate multiple PLMNs. For this case, SIB(s) including the network slice band association information may additionally comprise information indicating which PLMN(s) the network slice band association information may be applied to. Preferably, the system information may include multiple instances of the network slice band association information, each of the instances being applied to one or more designated PLMNs.

For example, Table 7 shows an example format of the SIB1 comprising NetworkSliceBandAssociationInfoList per PLMN, NetworkSliceBandAssociationInfoList further comprising a list of S-NSSAIs and associated bands (frequencyBandList) for each S-NSSAI.

TABLE 7

```
SIB1 ::=                          SEQUENCE {
  cellSelectionInfo                       SEQUENCE {
    q-RxLevMin                            Q-RxLevMin,
    q-RxLevMinOffset                       INTEGER (1..8)
OPTIONAL,                     -- Need S
    q-RxLevMinSUL                          Q-RxLevMin,
OPTIONAL,                     -- Need S
    q-QualMin                             Q-QualMin
OPTIONAL,                     -- Need S
    q-QualMinOffset                        INTEGER (1..8)
OPTIONAL,                     -- Need S
  }
OPTIONAL,                     -- Cond Standalone
  cellAccessRelatedInfo                    CellAccessRelatedInfo,
  connEstFailureControl                    ConnEstFailureControl
OPTIONAL,                     -- Need R
  si-SchedulingInfo                       SI-SchedulingInfo
OPTIONAL,                     -- Need R
  servingCellConfigCommon                    ServingCellConfigCommonSIB
OPTIONAL,                     -- Need R
  ims-EmergencySupport                     ENUMERATED {true}
OPTIONAL,                     -- Need R
  eCallOverIMS-Support                     ENUMERATED {true}
OPTIONAL,                     -- Cond Absent
  ue-TimersAndConstants                    UE-TimersAndConstants
OPTIONAL,                     -- Need R
uac-BarringInfo                        SEQUENCE {
  uac-BarringForCommon                    UAC-BarringPerCatList
OPTIONAL,                -- Need S
  uac-BarringPerPLMN-List                 UAC-BarringPerPLMN-List
OPTIONAL,                -- Need S
  uac-BarringInfoSetList                  UAC-BarringInfoSetList,
  uac-AccessCategory1-SelectionAssistanceInfo CHOICE {
   plmnCommon
```

TABLE 7-continued

```
UAC-AccessCategory1-SelectionAssistanceInfo,
        individualPLMNList                  SEQUENCE (SIZE (2..3maxdPLMN)) OF
UAC-AccessCategory1-SelectionAssistanceInfo
      }
OPTIONAL,                   -- Need S
   }
OPTIONAL,                   -- Need R
   useFullResumeID                   ENUMERATED {true}
OPTIONAL,                   -- Need N
   lateNoneCriticalExtension           OCTET STRING
OPTIONAL,
   nonCriticalExtension                SEQUENCE { }
OPTIONAL,
}
CellAccessRelatedInfo ::=              SEQUENCE {
   plmn-IdentityList                    PLMN-IdentityInfoList,
   cellReservedForOtherUse                ENUMERATED {true} OPTIONAL,
-- Need R
   ...
}
PLMN-IdentityInfoList ::=              SEQUENCE (SIZE (1..maxPLMN)) OF
PLMN-IdentityInfo
PLMN-IdentityInfo ::=                  SEQUENCE {
   plmn-IdentityList                      SEQUENCE (SIZE (1..maxPLMN))
OF PLMN-Identity,
   trackingAreaCode                       TrackingAreaCode
OPTIONAL,                     -- Need R
   ranac                               RAN-AreaCode
OPTIONAL,                     -- Need R
   cellIdentity                         CellIdentity,
   cellReservedForOperatorUse               ENUMERATED {reserved,
notReserved},
   networkSliceBandAssociationInfoList          SEQUENCE (SIZE
(1..maxNrofS-NSSAI) OF NetworkSliceBandAssociationInfo
OPTIONAL,
   ...
}
NetworkSliceBandAssociationInfo          SEQUENCE {
   S-NSSAI                      S-NSSAI,
   frequencyBandList      MultiFrequencyBandListNR-SIB,      OPTIONAL
   ...
}
```

Upon acquiring the system information message(s), as act 9B-5 the wireless terminal 30 may determine if the network slice band association information indicates that the chosen network slice(s) supports the band of the serving cell. If the result of act 9B-5 is affirmative, as act 9B-6 the wireless terminal 30 may stay on the serving cell. Further, as act 9B-7 the wireless terminal 30 may proceed to perform a registration procedure with the requested NSSAI including the S-NSSAI(s) supported on the band. As further shown by act 9B-8, the wireless terminal 30 may further perform a cell reselection procedure to a cell on the same band. If the determination of act 9B-5 is negative, e.g., if the system information indicates that the network slice(s) is (are) not supported in the band of the serving cell, as act 9B-9 the wireless terminal 30 may perform the cell reselection to find other inter-band neighbor cells, or may attempt to choose other network slice(s).

It should be noted that S-NSSAIs in the network slice band association information provided via system information may be specific to the serving PLMN. That is, non-standardized SST values can be used. Meanwhile, an S-NSSAI of interest to the wireless terminal 30 may be based on a list of S-NSSAIs, such as subscribed S-NSSAIs or a default configured NS SAI, configured by the HPLMN. The following shows alternative conditions for an S-NSSAI to be still valid, e.g., recognizable, within the serving PLMN:

- the serving PLMN is the HPLMN, or one of the equivalent PLMNs of the HPLMN;
- the S-NSSAI comprises a standardized SST value; or
- the S-NSSAI has been already configured by the serving PLMN via a registration procedure (the registration procedure may have provided the wireless terminal a mapping of the S-NSSAI to a corresponding S-NSSAI in the serving PLMN).

Otherwise, the wireless terminal 30 may not be able to know which entry in the network slice band association information maps to the S-NSSAI of interest. In this case, after receiving the system information and prior to performing a cell reselection, the wireless terminal 30 may perform the registration procedure, wherein the Registration Accept message may comprise mappings of serving PLMN S-NSSAIs to HPLMN S-NSSAIs. Using the mappings, the wireless terminal 30 may determine if the chosen S-NSSAI(s) supports the band of the serving cell. If positive, the wireless terminal may stay on the cell and/or perform a cell reselection on the same band. Otherwise, the wireless terminal may perform the cell reselection to find other inter-band neighbor cells, or may attempt to choose other network slice(s).

2.3 NSBAI Obtained from Non-Access Stratum

Figure 10A:
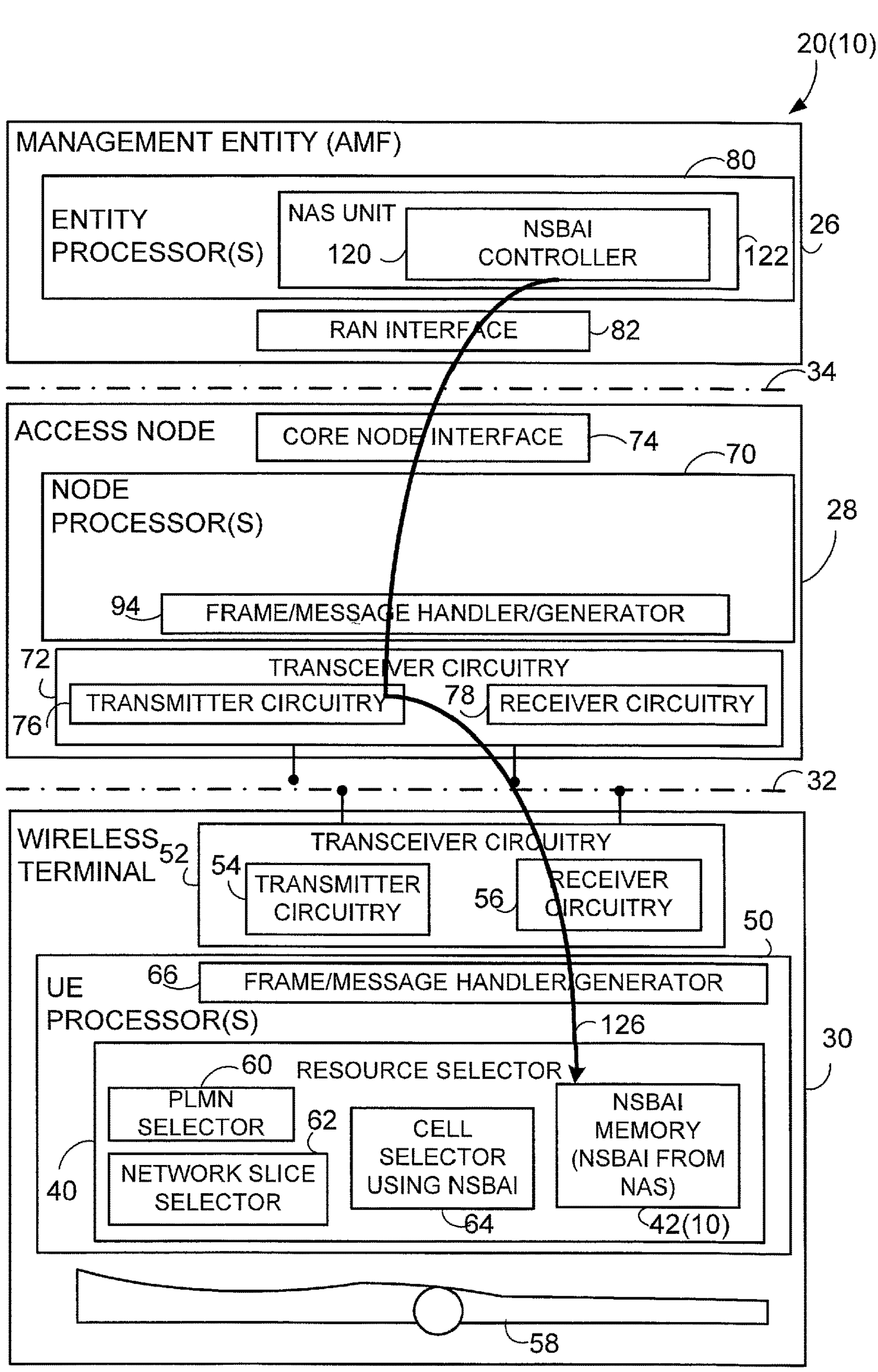
FIG. 10A is a schematic view of an example communications system in which network slice band association information (NSBAI) is obtained by a wireless terminal from the non-access stratum (NAS).
Figure 10B:
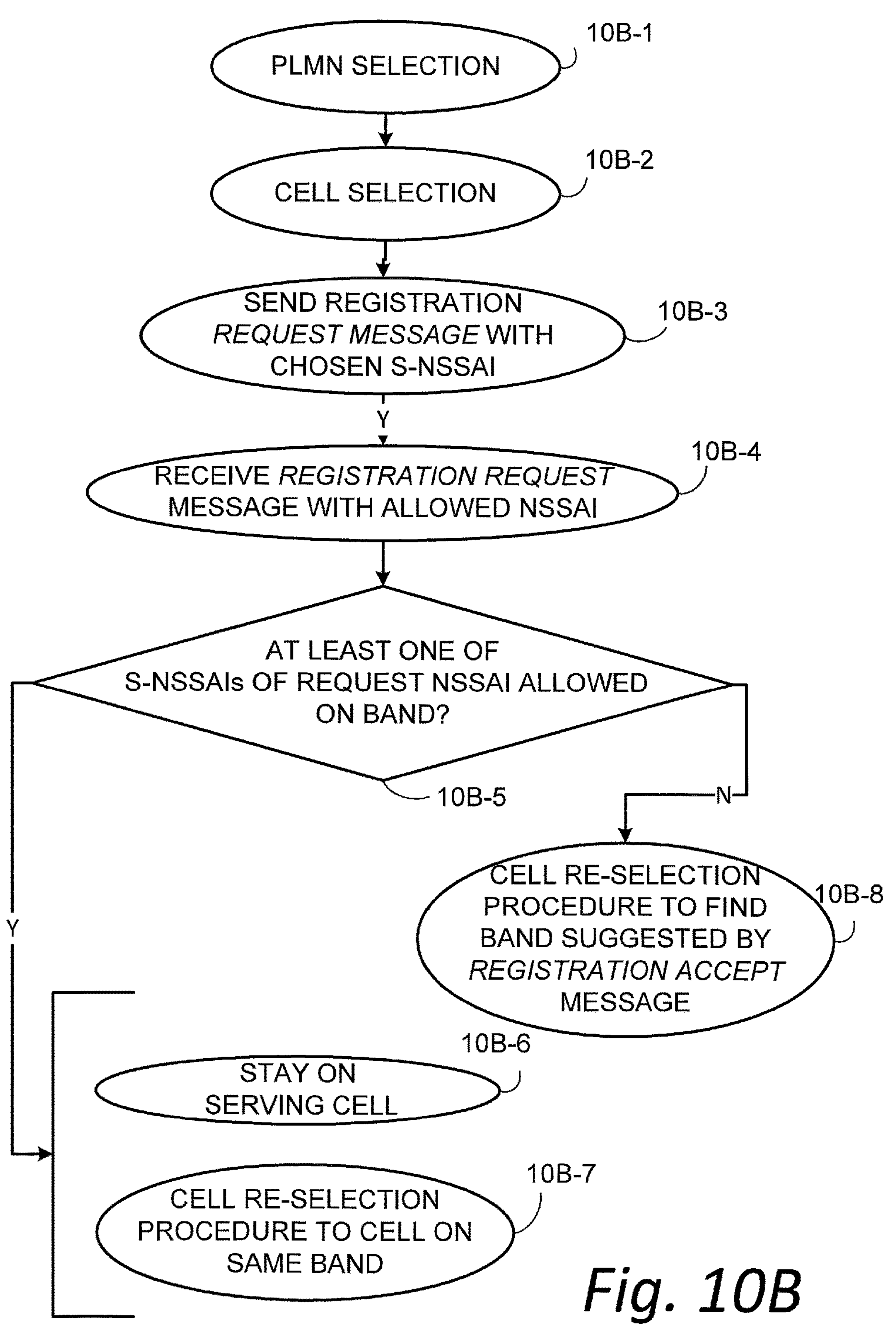
FIG. 10B is a diagrammatic view of example, representative acts or steps that are performed for resource selection for the communications system of FIG. 10A.

FIG. 10A is a schematic view of an example communications system 20(10) in which network slice band association information (NSBAI) is obtained by a wireless terminal from the non-access stratum (NAS), e.g., in a non-access stratum message. FIG. 10B is a diagrammatic view of example, representative acts or steps that are performed for resource selection for the communications system of FIG. 10A.

Structures and functionalities of the communications system 20(10) of FIG. 10A which are common or essentially the same as one of more of the preceding example embodiments have the same reference numerals. For example, much of the structure of wireless terminal 30 of FIG. 10A is similar to preceding example embodiments.

In view of the fact that in the example embodiment of FIG. 10A the wireless terminal 30 receives its network slice band association information (NSBAI) 42 from the non-access stratum (NAS), FIG. 10A further shows management entity 26 as comprising system the non-access stratum (NAS) unit 120, which includes a unit or functionality herein known as core NSBAI controller 122 which controls the formatting or inclusion of the network slice band association information (NSBAI) 42 in the non-access stratum information generated by non-access stratum (NAS) unit 120. The non-access stratum (NAS) unit 120 with its core NSBAI controller 122 preferably comprises or is included in node processor circuitry 70 of management entity 26. The arrow 126 of FIG. 10A shows that wireless terminal 30 of FIG. 10A receives its network slice band association information in memory (NSBAI) 42(10).

As an example implement of the FIG. 10A embodiment and mode, in terms of the network slice band association information (NSBAI) being provided in a non-access stratum message, the network slice band association information may be provided during the registration procedure, preferably provided in a Registration Accept message. In this example implementation, as shown by act 10B-1 in FIG. 10B the wireless terminal 30 may perform PLMN selection and then as act 10B-2 perform cell selection, e.g., using the aforementioned regular cell selection with no limitation on frequencies/bands in terms of network slices. As act 10B-3, the wireless terminal 30 sends a Registration Request message through access node 28 to management entity 26. The Registration Request message may comprise the chosen S-NSSAI(s) as at least a part of the Requested NSSAI. In response to the Registration Request message, as act 10B-4 the wireless terminal 30 receives a Registration Accept message. In the Registration Accept message, each S-NSSAI in the Allowed NSSAI and/or the Configured NSSAI information element(s) may be associated with supported band(s). The network slice band association information (NSBAI) received in the Registration Accept message is stored in network slice band association information (NSBAI) memory 42(10) of wireless terminal 30.

As an exemplary implementation of the network slice band association information, a NAS message, e.g. the Registration Accept message, may comprise an optional information element, such as "Allowed NSSAI Band Association" information element, for the Allowed NSSAI, and/or may comprise another optional "Configured NSSAI Band Association" information element for the Configured NSSAI. FIG. 12 illustrates an example format of the optional information elements, which shares the same structure shown as "NSSAI Band Association". Herein, each S-NSSAI value in the NSSAI information element is associated, in the order of the S-NSSAI fields, with one entry of the NSSAI Band Association information element, wherein each entry comprises one or more bands. If a particular S-NSSAI has no band association, the length of the corresponding Association x field in the NSSAI Band Association information element may be set to zero.

Upon receiving the Registration Accept message in act 10B-4 in the implementation scenario of FIG. 10B, wireless terminal 30 may stay on the currently serving cell as indicated by act 10B-6, and/or as indicated by act 10B-7 may perform a cell reselection on the same band of the currently serving cell, if it is determined as act 10B-5 that the Registration Accept message indicates that at least one of the S-NSSAIs in the Requested NSSAI is allowed on the band. Otherwise, as act 10B-8 the UE may initiate a cell reselection to one of the bands suggested by the Registration Accept message, or may attempt to choose other network slice(s).

For example, suppose that 30 wireless terminal 30 desires a network slice with S-NSSAI=(SST:1, SD: n/a) and wireless terminal 30 is currently camping on a cell on band n7. The wireless terminal 30 may initiate, on the cell, the registration procedure by sending the Registration Request message, which may include a Requested NSSAI being set to the S-NSSAI. If the Registration Accept message includes an Allowed NSSAI with the S-NSSAI (or a serving PLMN specific S-NSSAI mapped from the S-NSSAI), and if the corresponding entry in the Allowed NSSAI Band Association includes n7, wireless terminal 30 may consider that the S-NSSAI is supported in n7 and may not initiate a cell reselection. On the other hand, if the corresponding entry does not include n7, but does include n8, wireless terminal 30 may initiate a cell reselection to find a cell on n8.

2.3 NSBAI Obtained from RRC Signaling

Figure 11A:
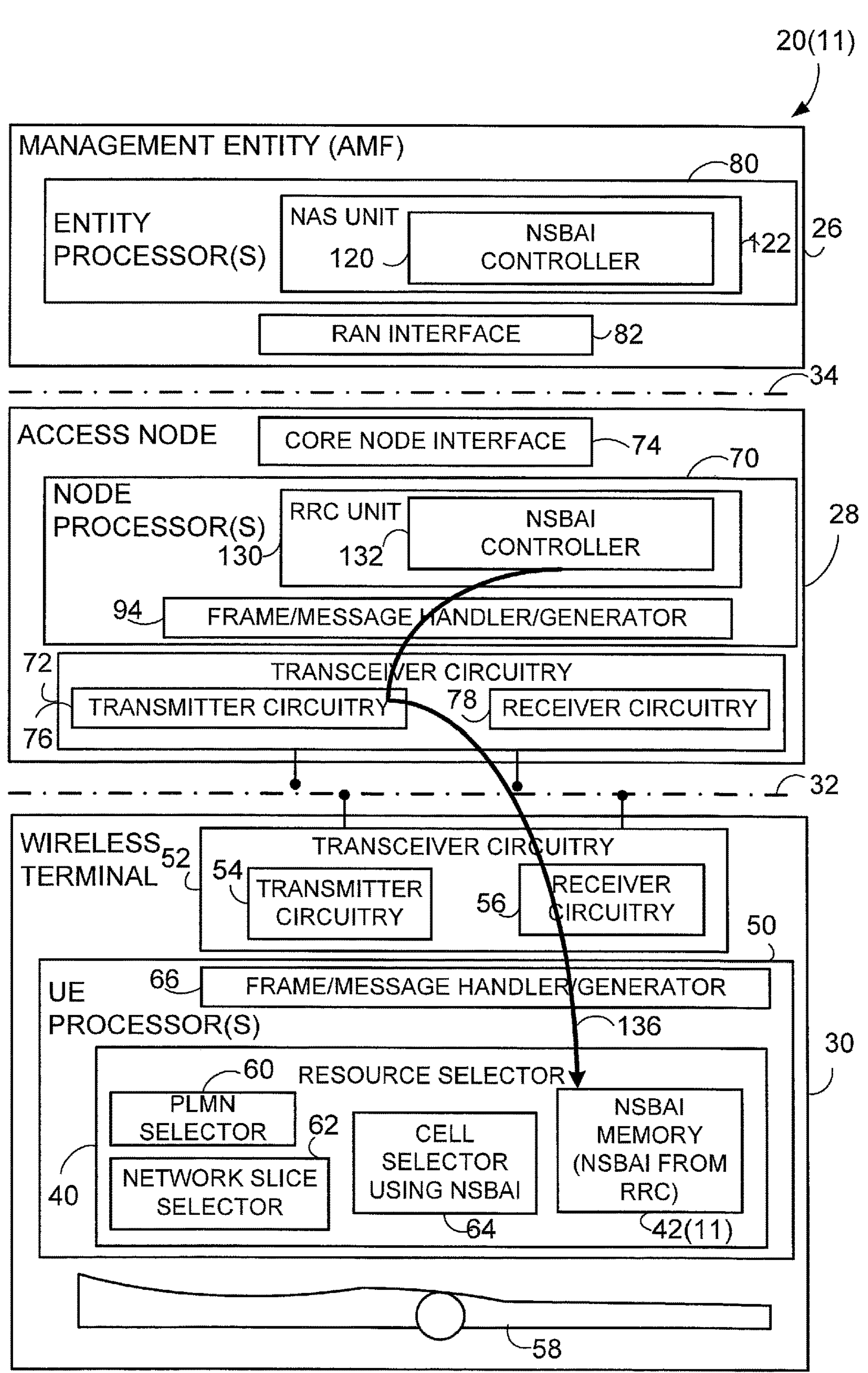
FIG. 11A is a schematic view of an example communications system in which network slice band association information (NSBAI) is obtained by a wireless terminal from radio resource control (RRC) signaling.
Figure 11B:
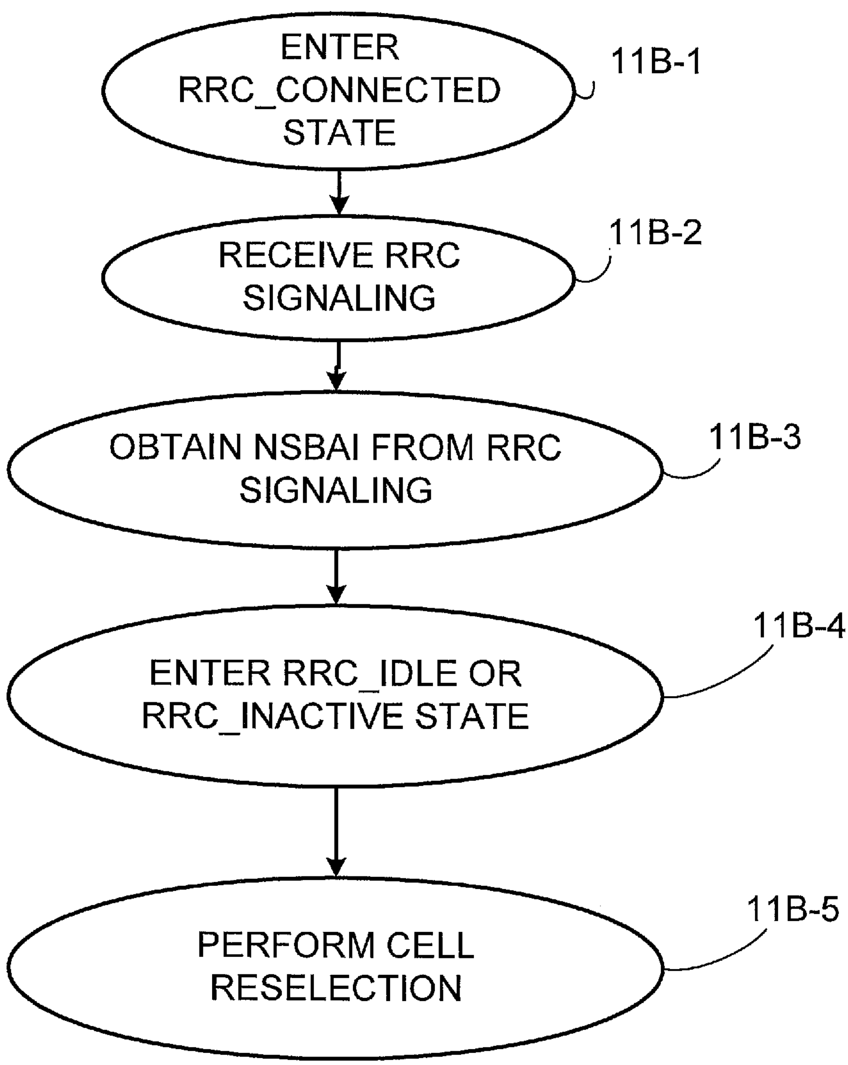
FIG. 11B is a diagrammatic view of example, representative acts or steps that are performed for resource selection for the communications system of FIG. 11A.

FIG. 11A is a schematic view of an example communications system 20(11) in which network slice band association information (NSBAI) is obtained by a wireless terminal from radio resource control (RRC) signaling. FIG. 11B is a diagrammatic view of example, representative acts or steps that are performed for resource selection for the communications system of FIG. 11A.

Structures and functionalities of the communications system 20(11) of FIG. 11A which are common or essentially the same as one of more of the preceding example embodiments have the same reference numerals and may not be again discussed with reference to FIG. 11A. For example, much of the structure of wireless terminal 30 of FIG. 11A is similar to preceding example embodiments. In view of the fact that in the example embodiment of FIG. 11A the wireless terminal 30 receives its network slice band association information (NSBAI) 42 from RRC signaling received from access node 28, FIG. 11A further shows access node 28 as comprising radio resource control (RRC) unit 130, which is configured to generate RRC signals for transmission to wireless terminal 30 and to process RRC signals received from wireless terminal 30. The radio resource control (RRC) unit 130 includes a unit or functionality herein known as node NSBAI controller 132 which controls the formatting or inclusion of the network slice band association information (NSBAI) 42 in the RRC signal(s) generated by system radio resource control (RRC) unit 130. In some example modes, implementations, or scenarios, the NSBAI may be generated by the access node based on (pre)configurations from the management entity. For example, the NSBAI may be generated by the node NSBAI controller 132 based on (pre) configurations from the management entity. In other example modes, implementations, or scenarios, the NSBAI may be generated by the management entity and provided to the access node, e.g., provided to node NSBAI controller 132 so that node NSBAI controller 132 may include the NSBAI in the RRC signal or messages. The radio resource control (RRC) unit 130 with its node NSBAI controller 132 preferably comprises or is included in core node processor circuitry 70 of access node 28. The arrow 136 of FIG. 11A shows that wireless terminal 30 of FIG. 11A receives its network slice band association information in memory (NSBAI) 42(11).

In the example embodiment and mode of FIG. 11A, the network slice band association information may be provided by a dedicated RRC signaling during the RRC_CONNECTED state, such as RRCReconfiguration message and/or RRCRelease message. FIG. 11B shows example acts which may be performed in the communications system 20(11) of FIG. 11A. Act 11B-1 shows wireless terminal 30 entering the RRC_CONNECTED state. Act 11B-2 shows wireless terminal 30 receiving RRC signaling, such as an RRCReconfiguration message. Act 11B-3 depicts the wireless terminal 30 obtaining the network slice band association information (NSBAI) from the RRC signaling for use by wireless terminal 30. Act 11B-4 shows that wireless terminal 30 may enter RRC_IDLE or RRC_INACTIVE state. Act 11B-5 further shows that wireless terminal 30 may perform a cell reselection based on the network slice band association information.

2.4 NSBAI Considerations

For the example embodiments and modes disclosed above, such as FIG. 8A, FIG. 9A, FIG. 10A, and FIG. 11A, if the network slice band association information does not list an S-NSSAI of interest, or if it lists an S-NSSAI of interest with no band associations, the network slice identified by the S-NSSAI may be considered to be not bounded to specific bands.

Furthermore, as an alternative implementation of any of the foregoing example embodiments and modes, the network slice band association information may comprise an entry with an S-NSSAI and one or more associated bands not supported for the S-NSSAI, i.e., blacklist. The network slice identified by the S-NSSAI may be considered to be supported in any available bands, except for those one or more associated bands.

FIG. 13 shows example representative steps or acts which may be performed by a generic wireless terminal, e.g., UE, of FIG. 4. A generic wireless terminal 30 encompasses and is capable of operation according any one of the foregoing example embodiments and modes, including FIG. 8A-FIG. 8B, FIG. 9A-FIG. 9B, FIG. 10A—FIG. 10B, and FIG. 11A-FIG. 11B. Act 13-1 comprises selecting a PLMN. Act 13-2 comprises choosing, based on the PLMN, a network slice(s) that the wireless terminal desires to use. Act 13-3 comprises initiating a cell selection/reselection, based on network slice band association information. The network slice band association information (NSBAI) 42 may either be preconfigured to the wireless terminal (as in the case of FIG. 8A-FIG. 8B), provided in an RRC message, e.g. a system information message (as in the case of FIG. 9A-FIG. 9B) or a dedicated RRC message(s) (as in the case of FIG. 11A-FIG. 11B), or provided in a NAS message (as in the case of FIG. 10A-FIG. 10B). Examples of RRC message(s) include a reconfiguration message, a release message, or any other RRC message(s). An example of a NAS message is a registration accept message.

FIG. 14 shows example representative steps or acts which may be performed by an access node 28 according to the example embodiment and mode of FIG. 9A-FIG. 9B or FIG. 11A-FIG. 11B. The access node 28 may, for example, be a gNB. Act 14-1 comprises generating an RRC message comprising network slice band association information. Such an RRC message may be a system information message, a reconfiguration message, release message or any other RRC message. The network slice band association information may comprise a list of network slice identifiers, each of the network slice identifiers identifying a network slice, each of some of the network slice identifiers being associated with a corresponding radio band(s). The network slice band association information may be used by the wireless terminal to perform a cell selection/reselection procedure. Act 4B-2 comprises transmitting the RRC message with its network slice band association information (NSBAI) to wireless terminal 30.

FIG. 15 shows example representative steps or acts which may be performed by a management entity of a core network, such as management entity 26 of the example embodiment and mode of FIG. 10A-FIG. 10B. As indicated above, the management entity 26 may be an Access and Mobility Management Function (AMF). Act 15-1 comprises receiving a non-access stratum message from wireless terminal 30. The non-access stratum message may be a registration request message, for example. Act 15-2 comprising generating a responsive non-access stratum message, such as a registration accept message, which comprises network slice band association information. The network slice band association information may comprise a list of network slice identifiers, each of the network slice identifiers identifying a network slice, each of some of the network slice identifiers being associated with a corresponding radio band(s). Act 15-3 comprises transmitting the responsive non-access stratum message, e.g., the registration accept message, to wireless terminal 30. The network slice band association information included in the non-access stratum signaling of the registration accept message may be used by the wireless terminal to perform a cell selection/reselection procedure.

3.0 Cell Barring (Cell Reservation) for Network Slicing

Figure 16:
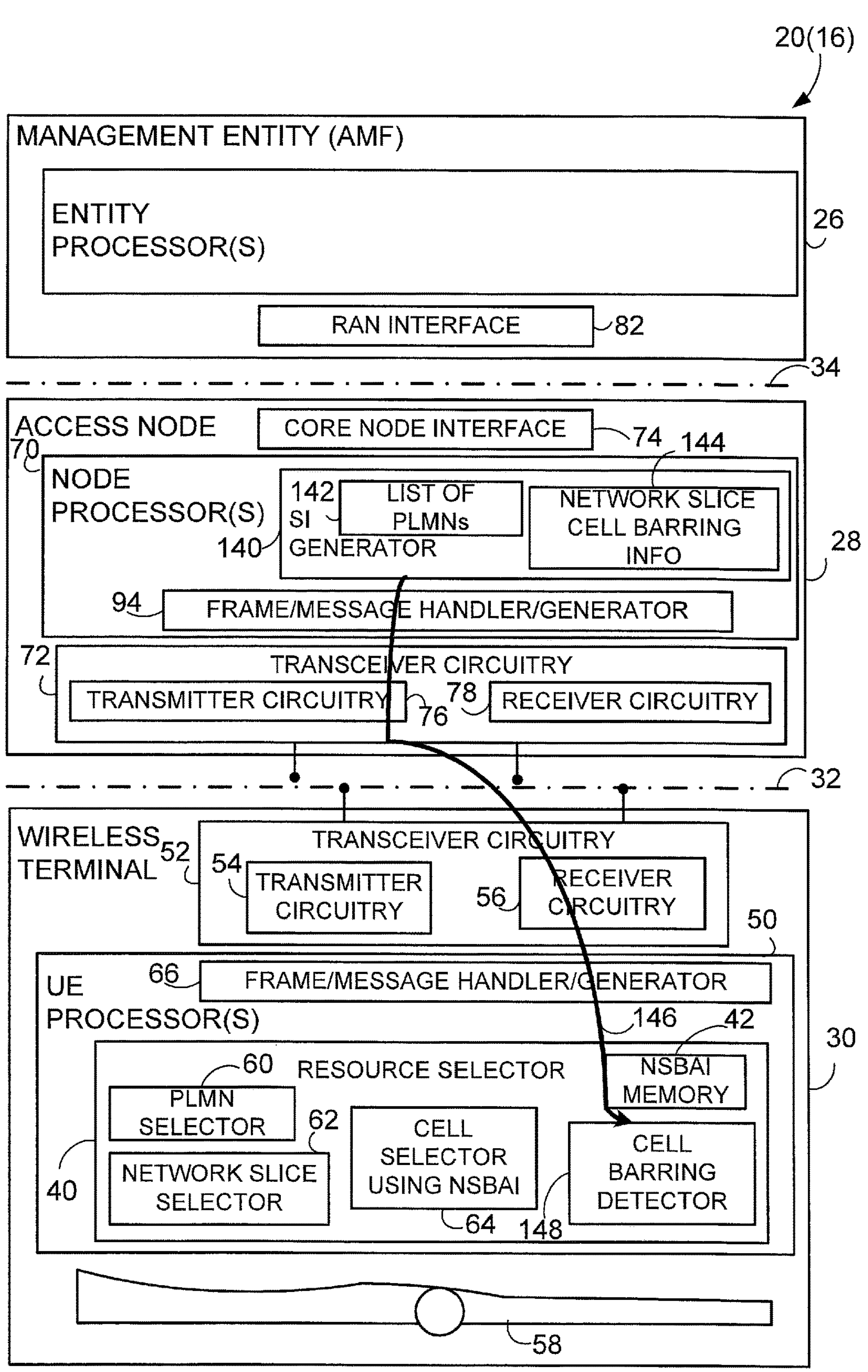
FIG. 16 is a schematic view of an example communications system in which a wireless terminal utilizes network slice cell barring information obtain from system information broadcast from an access node in conjunction with resource selection.

In some example embodiments and modes, such as that of FIG. 16, it may be desired to restrict camping on certain cells for wireless terminals supporting specific network slices. For example, a network operator may not want to use some cells for a network slice designated for a particular purpose, such as a purpose of V2X, vehicle-to-everything, communications, for example. FIG. 16 shows an example embodiment and mode configured to enable cell barring for one or more network slices within a cell. The example embodiment and mode of FIG. 16 is an example implementation of the generic example embodiment and mode of FIG. 4 and FIG. 5, and as such explanations of FIG. 4 and FIG. 5 are applicable to communications system 20(16) of FIG. 16 as well. For example, the communications system 20(16) of FIG. 16, comprises one or more radio access networks (RANs) 22 and one or more core networks (CNs) 24, with one management entities 26 being shown in the core network (CN) 24 by way of example and one access node 28 being shown by way of example in radio access network (RAN) 22. Although not illustrated as such, the communications system 20(16) of FIG. 16 may be and usually is utilized by plural PLMNs. In FIG. 16, wireless terminal 30 communicates with a management entity of a core network through an access node of a radio access network (RAN). The core network supports one or more network slices, each of the network slices providing a designated service within a public land mobile network (PLMN).

Since the communications system 20(4) is generic to various other example embodiments and modes described herein, it is again mentioned that the wireless terminal may take various forms as mentioned above, and likewise that the access node may have been implemented in many different ways. For example, in addition to the foregoing comments concerning access nodes, it should be mentioned that in any of the example embodiments and modes described herein that the radio access network (RAN) 22 the source and destination may be interconnected by way of a plurality of nodes. Moreover, communications system 20(16) may be realized in virtualized and/or distributed and/or logical form.

Structures and functionalities of the communications system 20(16) of FIG. 16 which are common or essentially the same as one of more of the preceding example embodiments have the same reference numerals. For example, much of the structure of wireless terminal 30 of FIG. 16 and much of the structure of access node 28 of FIG. 16 is similar to preceding example embodiments. However, in in the example embodiment of FIG. 16 the access node 28 generates system information which comprises a list of one or more PLMN identifiers and an association of each of the PLMN identifiers with corresponding network slice cell barring information. The network slice cell barring information comprises one or more network slice identifiers of network slices for which the cell is barred. Accordingly, in the example embodiment and mode of FIG. 16 node processor circuitry 70 is shown as comprising system information generator 140, with system information generator 140 having access to list 142 of one or more PLMN identifiers and access to an association of each of the PLMN identifiers with corresponding network slice cell barring information 142, so that the system information generated by system information generator 140 includes both the list 142 and the associated corresponding network slice cell barring information 144. The access node 28 also comprises node transmitter circuitry 76, which transmits the system information to a cell. Arrow 146 of FIG. 16 shows the transmission of the system information, which includes network slice cell barring information 142 and the network slice cell barring information 144, to wireless terminal 30.

The wireless terminal 30 of communications system 20(16) of FIG. 16 comprises receiver circuitry, e.g., terminal receiver circuitry 56, and processor circuitry, e.g., terminal processor circuitry 50. The receiver circuitry is configured to receive, from a cell served by the access node 28, system information comprising a list of one or more PLMN identifiers and an association of each of the PLMN identifiers with corresponding network slice cell barring information. As indicated above, the network slice cell barring information comprises one or more network slice identifiers of network slices for which the cell is barred. The terminal processor circuitry 50, and terminal resource selector 40 in particular, comprises PLMN selector 60; network slice selector 62; cell selector 64 which uses network slice band association information (NSBAI) 42; and cell barring detector 148. As such, the processor terminal circuitry 50 serves to select a serving PLMN; choose a network slice(s); and to determine, based on a network slice identifier(s) identifying the network slice(s) and the network slice cell barring information associated with the serving PLMN, whether or not the cell is barred for the network slice(s). The cell barring detector 148 of terminal processor circuitry 50 may perform the determination whether or not the cell is barred for the network slice(s).

It should be understood that this network slice-based cell barring as shown, by way of example, with reference to FIG. 16, differences in some regards from the resource selection of the previous embodiments. In the FIG. 16 embodiment and mode, the barring affects a particular network slice within a cell that advertises the barring. Therefore, in the FIG. 16 example embodiment and mode, the wireless terminal that discovers the particular network slice being barred in the cell may look for other cells in bands including the band of the barring cell. On the other hand, in the earlier-described embodiments, if the network slice band association information indicates that a particular network slice is not supported in a band, the wireless terminal may not search for cells on that band at all.

In one example implementation, a cell may broadcast system information comprising one or more identities of network slices barred in the cell. For example, as shown in Table 8, SIB1 may include, for each of supported PLMNs, network slice cell barring information, a list of identities of network slices (S-NSSAIs) barred in the cell (e.g. cellReservedForNetworkSlices).

TABLE 8

```
SIB1 ::=                        SEQUENCE {
    cellSelectionInfo                       SEQUENCE {
        q-RxLevMin                              Q-RxLevMin,
        q-RxLevMinOffset                        INTEGER (1..8)
OPTIONAL,                      -- Need S
        q-RxLevMinSUL                           Q-RxLevMin
OPTIONAL,                      -- Need R
        q-QualMin                               Q-QualMin
OPTIONAL,                      -- Need S
        q-QualMinOffset                         INTEGER (1..8)
OPTIONAL                       -- Need S
    }
OPTIONAL,                      -- Cond Standalone
    cellAccessRelatedInfo                   CellAccessRelatedInfo,
    connEstFailureControl                   ConnEstFailureControl
OPTIONAL,                      -- Need R
    si-SchedulingInfo                       SI-SchedulingInfo
OPTIONAL,                      -- Need R
    servingCellConfigCommon
ServingCellConfigCommonSIB
OPTIONAL,                      -- Need R
    ims-EmergencySupport                    ENUMERATED { true }
OPTIONAL,                      -- Need R
    eCallOverIMS-Support                    ENUMERATED { true}
OPTIONAL,                      -- Cond Absent
    ue-TimersAndConstants                   UE-TimersAndConstants
OPTIONAL,                      -- Need R
  uac-BarringInfo                       SEQUENCE {
      uac-BarringForCommon              UAC-BarringPerCatList
OPTIONAL,                      -- Need S
      uac-BarringPerPLMN-List           UAC-BarringPerPLMN-List
```

TABLE 8-continued

```
OPTIONAL,                          -- Need S
            uac-BarringInfoSetList                  UAC-BarringInfoSetList,
            uac-AccessCategory1-SelectionAssistanceInfo CHOICE {
                 plmnCommon
UAC-AccessCategory1-SelectionAssistanceInfo,
                 individualPLMNList                  SEQUENCE (SIZE
 (2..maxPLMN)) OF UAC-AccessCategory1-SelectionAssistanceInfo
            }
OPTIONAL                           -- Need S
      }
OPTIONAL,                          -- Need R
      useFullResumeID                               ENUMERATED {true}
OPTIONAL,                          -- Need N
      lateNonCriticalExtension                        OCTET STRING
OPTIONAL,
      nonCriticalExtension                          SEQUENCE { }
OPTIONAL
}
CellAccessRelatedInfo ::=                   SEQUENCE {
      plmn-IdentityList                         PLMN-IdentityInfoList,
      cellReservedForOtherUse                     ENUMERATED {true} OPTIONAL,
-- Need R
      ...
}
     PLMN-IdentityInfoList ::=                           SEQUENCE (SIZE
     (1..maxPLMN)) OF PLMN-IdentityInfo
     PLMN-IdentityInfo ::=                              SEQUENCE {
          plmn-IdentityList                                SEQUENCE (SIZE
     (1..maxPLMN) ) OF PLMN-Identity,
          trackingAreaCode                                 TrackingAreaCode
     OPTIONAL,                          -- Need R
          ranac                                          RAN-AreaCode
     OPTIONAL,                          -- Need R
          cellIdentity                                    CellIdentity,
          cellReservedForOperatorUse                 ENUMERATED {reserved,
     notReserved},
          cellReservedForNetworkSlices               SEQUENCE (SIZE (1..
     maxNrofS-NSSAI) OF S-NSSAI,
          ...
     }
```

Upon selecting a cell, the wireless terminal 30 may decide whether or not a network slice of interest is barred by the using the network slice cell barring information, specifically whether or not the S-NSSAI of the network slice is included in the network slice cell barring information. However, values of S-NSSAIs in the network slice cell barring information, that are assigned by the serving PLMN of the cell, may or may not be known to the wireless terminal 30, which may affect the decision and subsequent actions by the wireless terminal 30.

In the above regard, an S-NSSAI of interest to the wireless terminal 30 may be based on a list of S-NSSAIs, such as subscribed S-NSSAIs or a default configured NSSAI, which is configured by the home PLMN, HPLMN. The wireless terminal 30 may be configured to use the condition for an S-NSSAI to be valid, e.g., recognizable, within the serving PLMN, as disclosed in one or more of the preceding embodiments. In a case an S-NSSAI of interest is valid, the wireless terminal 30 may check if this S-NSSAI is included in the network slice cell barring information advertised by the serving cell. If positive, e.g., if the S-NSSAI is valid, the wireless terminal 30 may proceed to make a determination whether the serving cell is “barred” or “not barred” based on the network slice cell barring information 144. Thereafter the wireless terminal 30 may proceed to the procedure disclosed above (5.3.1 Cell status and cell reservations in TS 38.304).

On the other hand, if the S-NSSAI of interest is not valid, the wireless terminal 30 may defer the decision of whether the network slice identified by the S-NSSAI is barred in the serving cell until after the wireless terminal 30 completes a registration procedure, as disclosed in one or more of the preceding embodiments. In the case of the S-NSSAI of interest not being valid, the registration accept message received from management entity 26, e.g., an Access and Mobility Management Function (AMF), may provide mapping information that allows mapping between the S-NSSAI of interest, presumably configured by the HPLMN, and a corresponding S-NSSAI for the serving PLMN. Based on the mapping information, the wireless terminal 30 may then check if the S-NSSAI mapped for the serving PLMN is included in the network slice cell barring information advertised by the serving cell. If positive, the wireless terminal 30 may consider the serving cell as “barred”, otherwise the wireless terminal 30 may consider the serving cell as “not barred”, and thereafter may proceed to the procedure disclosed above (5.3.1 Cell status and cell reservations in TS 38.304).

Figures 17, 18:
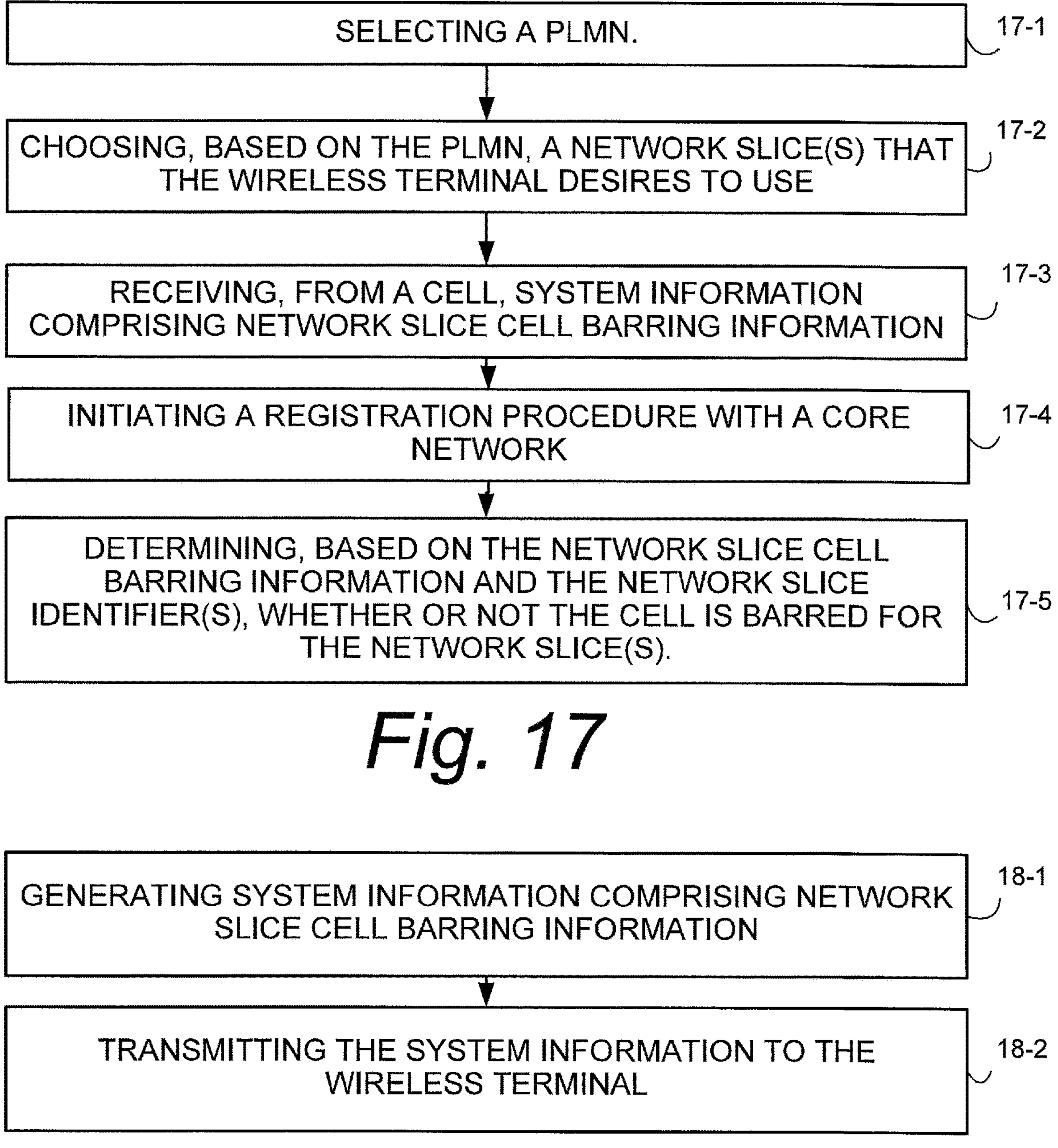
FIG. 17 is a flowchart showing example, representative acts or steps that may be performed by a wireless terminal according to the example embodiment and mode of FIG. 16.
FIG. 18 is a flowchart showing example, representative acts or steps that may be performed by an access node according to the example embodiment and mode of FIG. 16.

FIG. 17 is a flow chart showing example representative steps or acts performed by a wireless terminal, e.g., a user equipment, of the communications system 20(16) of FIG. 16. Act 17-1 comprises selecting a PLMN. Act 17-2 comprises choosing, based on the PLMN, a network slice(s) that the wireless terminal desires to use. Act 16-3 comprises receiving, from a cell, system information comprising network slice cell barring information. The network slice cell barring information further comprises one or more network slice identifiers of network slices for which the cell is barred. Act 17-4 is an optional act that may be executed in a case that the network slice identifier(s) that identifies the network slice(s) assigned by a HPLMN is not valid/unknown/not recognized in a serving PLMN. Act 17-4 comprises initiating a registration procedure with a core network. The registration procedure of act 17-4 may allow the wireless terminal to obtain a network slice identifier(s) for the serving PLMN that maps to the network slice identifier(s) assigned by the HPLMN. Act 16-5, executed after either act 17-3 or act 17-4 as the case may be, comprises determining, based on the network slice cell barring information and the network slice identifier(s), whether or not the cell is barred for the network slice(s).

FIG. 18 is a flow chart showing example representative steps or acts performed by an access node 28 of communications system 20(16). The access node 28 may be, for example, a gNB. Act 18-1 comprises generating system information comprising network slice cell barring information. The network slice cell barring information further comprises one or more network slice identifiers of network slices for which the cell is barred. Act 18-2 comprises transmitting the system information to the wireless terminal 30.

4.0 Area Scope for Band Associations for Network Slicing

The preceding embodiment discloses that the network slice band association information may be valid within a PLMN, a registration area, a cell, or some other form of an area. In the example embodiments and modes of FIG. 19A the network slice band association information is configured by the network, and a recipient wireless terminal, e.g., UE, is advantageously informed of an area scope of the network slice band association information. The "area scope" of the network slice band association information is used to indicate a validity area, e.g., an area/coverage wherein the configured network slice band association information is valid. In doing so, within such an area the network may not need to re-configure the information, and/or the wireless terminal may not to attempt to obtain the band association information again.

Figure 19A:
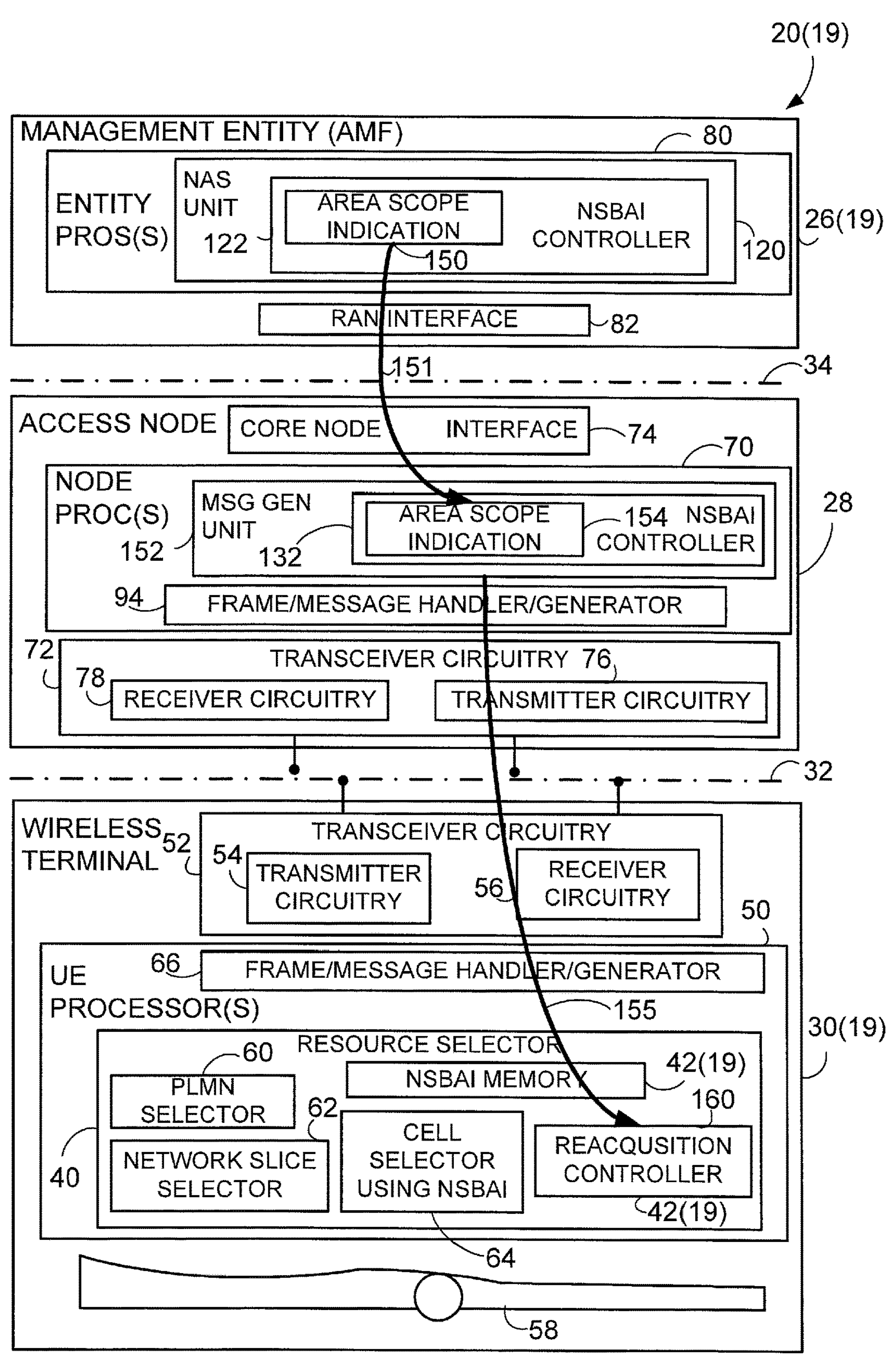
FIG. 19A is a schematic view of an example generic communications system in which a wireless terminal utilizes an area scope indicator included in network slice band association information, NSBAI, to determine whether to perform a reacquisition procedure.
Figure 19B:
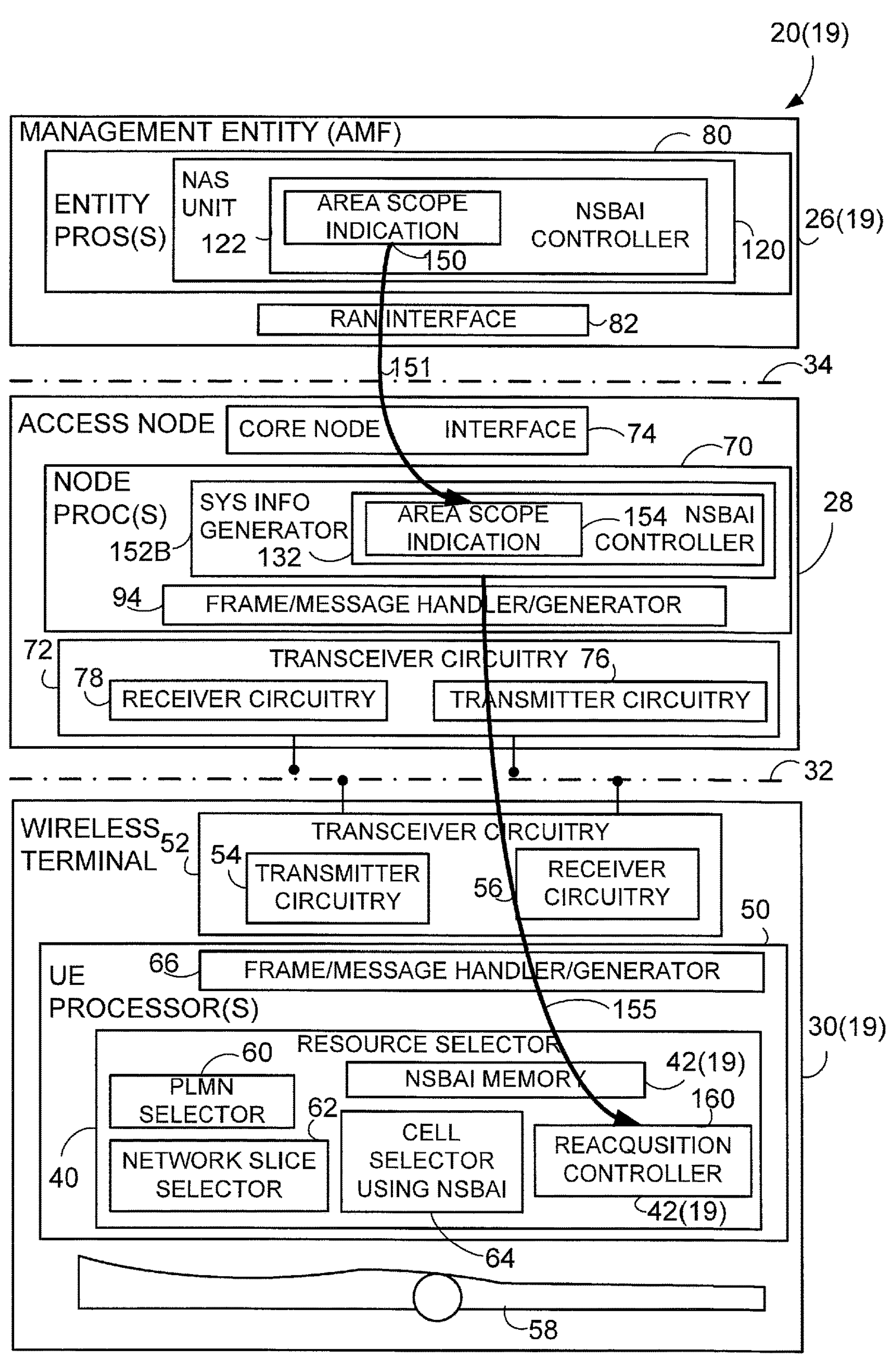
FIG. 19B is a schematic view of an example communications system in which the network slice band association information, NSBAI, including the area scope indication is carried in system information.
Figure 19C:
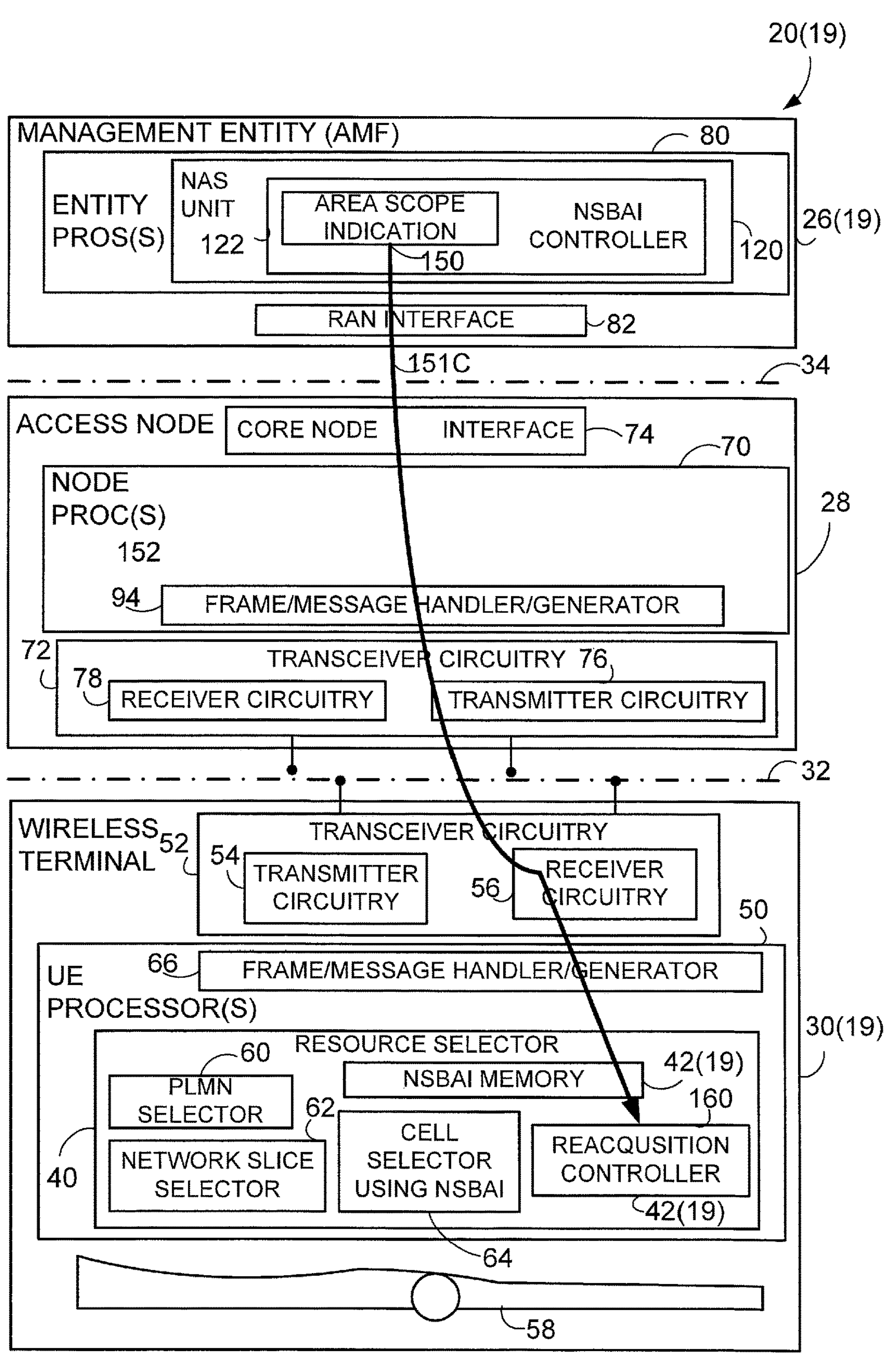
FIG. 19C is a schematic view of an example communications system in which the network slice band association information, NSBAI, including the area scope indication is carried in a non-access stratum message.
Figure 19D:
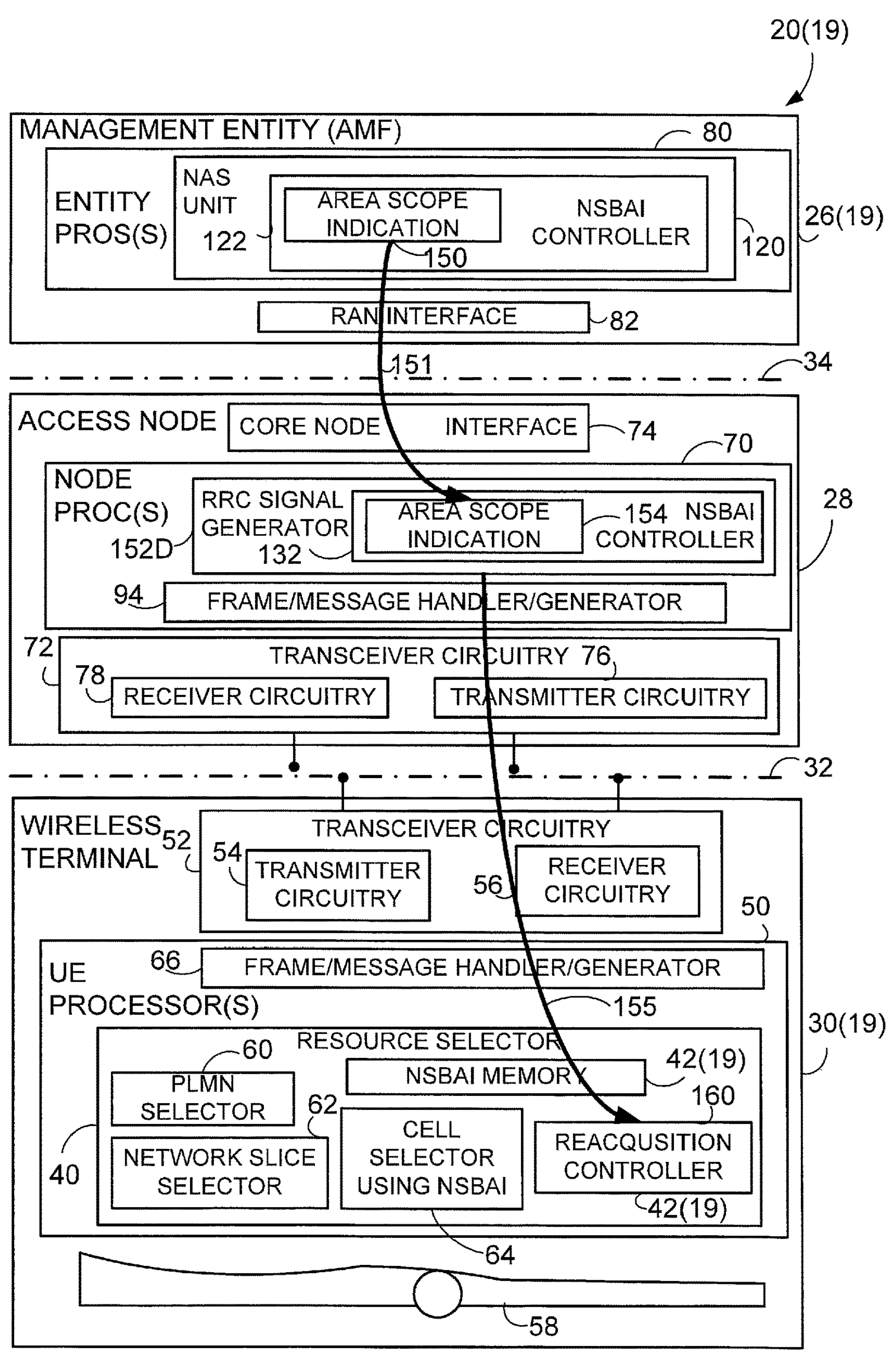
FIG. 19D is a schematic view of an example communications system in which the network slice band association information, NSBAI, including the area scope indication is carried in dedicated RRC signaling during the RRC_CONNECTED state.

The example embodiment and mode of FIG. 19A is generic to the example embodiments and modes of FIG. 19B-FIG. 19D, and therefore all comments concerning FIG. 19A are applicable to the example embodiments and modes of FIG. 19B-FIG. 19D as well. Moreover, the example embodiment and mode of FIG. 19A is itself an example implementation of the generic example embodiment and mode of FIG. 4 and FIG. 5, and as such explanations of FIG. 4 and FIG. 5 are applicable to communications system 20(19) of FIG. 19A as well. For example, the communications system 20(19) of FIG. 19A comprises one or more radio access networks (RANs) 22 and one or more core networks (CNs) 24, with one management entities 26 being shown in the core network (CN) 24 by way of example and one access node 28 being shown by way of example in radio access network (RAN) 22. Although not illustrated as such, the communications system 20(19) of FIG. 19A may be and usually is utilized by plural PLMNs. In FIG. 19A, wireless terminal 30 communicates with a management entity of a core network through an access node of a radio access network (RAN). The core network supports one or more network slices, each of the network slices providing a designated service within a public land mobile network (PLMN).

Since the communications system 20(4) is generic to various other example embodiments and modes described herein, it is again mentioned that the wireless terminal may take various forms as mentioned above, and likewise that the access node may have been implemented in many different ways. For example, in addition to the foregoing comments concerning access nodes, it should be mentioned that in any of the example embodiments and modes described herein that the radio access network (RAN) 22 the source and destination may be interconnected by way of a plurality of nodes. Moreover, communications system 20(19) may be realized in virtualized and/or distributed and/or logical form.

Structures and functionalities of the communications system 20(19) of FIG. 19A which are common or essentially the same as one of more of the preceding example embodiments have the same reference numerals. For example, much of the structure of wireless terminal 30 of FIG. 19A and much of the structure of access node 28 of FIG. 19A is similar to preceding example embodiments. However, in in the example embodiment of FIG. 19A the management entity 26(19) generates an area scope indication which indicates an area in which the network slices is supported on the radio band(s).

The management entity 26(19) of communications system 20(19) may comprise core network entity processor circuitry 80 and interface 82 toward the radio access network (RAN) 22. The core network entity processor circuitry 80 may be realized or comprise one or more processors and at least one memory. The memory includes computer program code, wherein the memory and the computer program code are configured to, working with the at least one processor, cause the decoding device to perform at least at least the operations described herein. FIG. 19A further shows management entity 26(19) as comprising system the non-access stratum (NAS) unit 120, which includes the core NSBAI controller 122. The core NSBAI controller 122 controls the formatting or inclusion of the network slice band association information (NSBAI) 42 in the non-access stratum information generated by non-access stratum (NAS) unit 120. In the example embodiment and mode of FIG. 19A and other embodiments and modes to which FIG. 19A is generic, the network slice band association information, NSBAI, includes the area scope indication. FIG. 19A therefore illustrates core NSBAI controller 122 as including area scope indication generator/memory 150. The non-access stratum (NAS) unit 120 with its core NSBAI controller 122 including the area scope indication generator/memory 150 preferably comprises or is included in node processor circuitry 70 of management entity 26(19). The arrow 151 of FIG. 19A shows that management entity 26(19) provides the network slice band association information, NSBAI, including the area scope indication to radio access network (RAN) 22, e.g., to access node 28.

The access node 28 of the example embodiment and mode of FIG. 19A comprises node processor circuitry 70, node transceiver circuitry 72, and interface 74 to core network (CN) 24. The node transceiver circuitry 72 may comprise node transmitter circuitry 76 and node receiver circuitry 78. The transceiver circuitry 72 includes antenna(e) for the wireless transmission. Transmitter circuitry 76 may include, e.g., amplifier(s), modulation circuitry and other conventional transmission equipment. Receiver circuitry 78 may comprise, e.g., amplifiers, demodulation circuitry, and other conventional receiver equipment. As indicated above, various aspects of access node 28 including the node transceiver circuitry 72 may be realized by a distributed unit (DU) and a mobile termination unit (MT).

The node processor circuitry 70 of the access node 28 of FIG. 19A is shown as comprising, among other units and functionalities, frame/message handler/generator 94 and message generator 152. The message generator 152 in turn comprises the node NSBAI controller 132. In the example embodiment and mode of FIG. 19A, the node NSBAI controller 132 receives the network slice band association information, NSBAI, from the management entity 26(19), which includes the area scope indication. Thus, FIG. 19A shows node NSBAI controller 132 as comprising area scope indication manager/memory 154. The network slice band association information, NSBAI, including the area scope indication, is included in a message generated by message generator 152, transmitted by access node 28 to wireless terminal 30(19), as shown by arrow 155 in FIG. 19A.

The wireless terminal 30(19) of communications system 20(19) of FIG. 19A comprises terminal transceiver circuitry 52 and processor circuitry, e.g., terminal processor circuitry 50. The transceiver circuitry 52 in turn may comprise terminal transmitter circuitry 54 and terminal receiver circuitry 56. The transceiver circuitry 52 includes antenna(e) for the wireless transmission. Transmitter circuitry 54 may include, e.g., amplifier(s), modulation circuitry and other conventional transmission equipment. Receiver circuitry 56 may comprise, e.g., amplifiers, demodulation circuitry, and other conventional receiver equipment. FIG. 19A further shows that wireless terminal 30(19) may also comprise terminal interfaces 58. Such user interfaces may serve for both user input and output operations, and may comprise (for example) a screen such as a touch screen that can both display information to the user and receive information entered by the user. The interfaces 58 may also include other types of devices, such as a speaker, a microphone, or a haptic feedback device, for example.

The receiver circuitry 56 of wireless terminal 30(19) is configured to receive, from a cell served by the access node 28, a message comprising network slice band association information, NSBAI, including the area scope indication. The message received by wireless terminal 30(19) which comprising network slice band association information, NSBAI, including the area scope indication, is depicted by arrow 155 in FIG. 19A.

The terminal processor circuitry 50 of FIG. 19A is shown as including terminal resource selector 40. In addition to memory or registers 42(19) for storing network slice band association information (NSBAI), the terminal resource selector 40 comprises PLMN selector 60; network slice selector 62; cell selector 64 which uses network slice band association information (NSBAI) 42; and reacquisition controller 160. In addition, terminal processor circuitry 50 may include frame/message generator/handler 66, as well as many other unillustrated functionalities including those not strictly germane to the technology disclosed herein.

In the example embodiment and mode of FIG. 19, the network slice band association information comprises one or more network slice identifiers. Each of the one or more network slice identifiers serves to identify a network slice. Each of the one or more network slice identifiers is associated with a radio band(s) and an area scope indication. The radio band(s) indicate a frequency domain interval(s) on which a network slice identified by the each of the one or more network slice identifiers is supported. The area scope indication indicates an area in which the network slices is supported on the radio band(s).

As exemplified herein, the area scope indicator, also herein referred to as "area scope", may indicate an area(s)/coverage(s), such as one or more PLMNs, one or more tracking/registration areas, one or more cells, one or more system information areas, one or more RAN notification areas, or any other geographical area/coverage. In some cases, the area scope may comprise an identity or a list of identities that directly specifies the area/coverage. For example, the area scope may comprise a list of tracking area identities or cell identities. In other cases, the area scope may indicate just a type of area/coverage identities, such as "PLMN" and "Registration Area". For example, if the area scope is type "PLMN", the validity area may be the area served by the serving PLMN. Likewise, if the area scope is type "Registration Area", the validity area may be the current registration area (specified by one or more tracking area identities (TAIs) or tracking area codes (TACs)).

It should be understood though that an area scope of network slice band association information instructs an area of validity for band associations; it does not indicate a validity area of associated network slices (which will be covered in the following embodiment). Indeed, the S-NSSAI(s) associated with the network slice band association information may or may not be valid outside of the area indicated by the area scope, but the network slice band association information becomes invalid outside of the area.

The management entity 26(19) of FIG. 19A thus comprises core network (CN) 24 and communicates with a wireless terminal 30 via a cell of radio access network (RAN) 22. The core network (CN) 24 supports one or more network slices, each of the network slices providing a designated service within a public land mobile network (PLMN). The management entity 26(19) of FIG. 19A thus comprises receiver circuitry and transmitter circuitry, both of which may comprise interface 82 toward the radio access network (RAN) 22, and core network entity processor circuitry 80. The receiver circuitry is configured to receive, from the wireless terminal 30, a non-access stratum (NAS) request message. The processor circuitry 80, including area scope indication generator/memory 150, is configured to generate a NAS response message comprising network slice band association information. The transmitter circuitry is configured to transmit, to the wireless terminal, the NAS response message.

The access node 28 of FIG. 19A thus belongs to or comprises a radio access network (RAN). The access node of the example embodiment and mode of FIG. 19A comprises processor circuitry and transmitter circuitry. The processor circuitry, e.g., message generator 152, is configured to generate a message comprising network slice band association information, including the area scope indication. The transmitter circuitry is configured to transmit, to the wireless terminal, the message in a cell. As described in other embodiments and modes hereof to which FIG. 19A is generic, the message generated by message generator 152 may take different forms, such as a system information message, a radio resource control (RRC) message, e.g., a dedicated RRC message such as a RRCReconfiguration message or a RRCRelease message, for example.

The wireless terminal 30(19) of the example embodiment and mode of FIG. 19A thus communicates with a management entity of a core network, e.g., management entity 26(19), through an access node of a radio access network (RAN), e.g., through access node 28. The core network supports one or more network slices, each of the network slices providing a designated service within a public land mobile network (PLMN). In the example embodiment and mode of FIG. 19, the wireless terminal comprises receiver circuitry and processor circuitry. The receiver circuitry is configured to receive, from a first cell of the RAN, a message comprising network slice band association information. As indicated above, the network slice band association information further comprises one or more network slice identifiers, each of the one or more network slice identifiers identifying a network slice, each of the one or more network slice identifiers being associated with a radio band(s) and an area scope indication. The radio band(s) indicate a frequency domain interval(s) on which a network slice identified by the each of the one or more network slice identifiers is supported. The area scope indication indicating an area in which the network slices is supported on the radio band(s).

The processor circuitry of wireless terminal 30(19), e.g., terminal processor circuitry 50, is configured to select from the network slice band association information at least one network slice identifier of a serving PLMN, and then to store the network slice band association information. Upon the wireless terminal camping on a second cell of the RAN, the processor circuitry is configured to initiate a reacquisition procedure to reacquire, from the second cell, the network slice band association information based on an area scope indication corresponding to the selected at least one network slice identifier, comprised in the stored network slice band association information. In other words, based on the area scope indication corresponding to the selected at least one network slice identifier, which is included in the stored network slice band association information, the processor circuitry and reacquisition controller 160 in particular is configured to make a determination whether to initiate a reacquisition procedure to reacquire, from the second cell, the network slice band association information.

In the example embodiment and mode of FIG. 19A, the reacquisition procedure is initiated by reacquisition controller 160 in a case that the second cell is not within an area indicated by the area scope indication corresponding to the selected at least one network slice identifier. The stored network slice band association information is used in the second cell to perform a cell (re)selection procedure, in a case that the second cell is within the area indicated by the area scope indication corresponding to the selected at least one network slice identifier 4.1 Area Scope Indication Carried by System Information FIG. 19B shows an example embodiment and mode of the generic system of FIG. 19A in which the network slice band association information, NSBAI, including the area scope indication is carried in system information transmitted by access node 28. FIG. 19B thus shows that access node 28 comprises system information generator 152B, which in turn manages and stores the area scope indication manager/memory 154. Thus, in the example embodiment and mode of FIG. 19B the message 155 is broadcasted system information.

In a case, such as that illustrated in FIG. 19B, that an instance of network slice band association information for a serving PLMN is provided in a system information block(s) (SIB(s)), an area scope indication(s) associated with the instance may be also provided in a SIB(s), preferably in the same SIB(s) that carries the instance of network slice band association. Upon receiving the SIB(s) from a cell, the wireless terminal may store the instance of the network slice band association information and the associated area scope indication(s) in its memory, e.g., network slice band association information memory 42(19A). In an event that the wireless terminal selects a new cell, if the stored area scope indication(s) indicates that the instance of the network slice association information is valid in the new cell, the wireless terminal may not need to reacquire the SIB(s) from this cell. Instead, the wireless terminal may use the saved instance of network slice band association information in the new cell.

As described in the preceding embodiments, a network slice may be defined within a PLMN, and thus multiple instances of network slice band association information may be present in system information in a case that there are more than one PLMN sharing a radio access network (RAN). Therefore, each instance may be associated with a designated area scope indication(s).

In one example implementation, one area scope indication may indicate a validity area of all network slices defined in one instance of network slice band association information. The validity area may be within a PLMN (serving PLMN), a current registration area, an area specified by a list of tracking area codes or an area specified by a list of cells. For example, Table 9 shows an example format of system information, specifically SIB1 that carries PLMN identities and SIBx (preferably different from SIB1) that carries one or more instances of network slice band association information.

TABLE 9

```
SIB1 ::=                                   SEQUENCE {
...
    cellAccessRelatedInfo                              CellAccessRelatedInfo,
...
}
CellAccessRelatedInfo ::=                              SEQUENCE {
    plmn-IdentityList                                    PLMN-IdentityInfoList,
    cellReservedForOtherUse                               ENUMERATED {true} OPTIONAL,
-- Need R
    ...
}
PLMN-IdentityInfoList ::=                              SEQUENCE (SIZE (1..maxPLMN)) OF
PLMN-IdentityInfo
PLMN-IdentityInfo ::=                      SEQUENCE {
    plmn-IdentityList                      SEQUENCE (SIZE (1..maxPLMN)) OF
PLMN-Identity,
    trackingAreaCode                       TrackingAreaCode
OPTIONAL,                                  -- Need R
    ranac                                    RAN-AreaCode
OPTIONAL,                                  -- Need R
    cellIdentity                              CellIdentity,
    cellReservedForOperatorUse                         ENUMERATED {reserved,
notReserved},
    ...
}
```

TABLE 9-continued

```
SIBx ::=                              SEQUENCE {
...
     networkSliceBandAssociationInfoListForPLMNs                  SEQUENCE
 (SIZE (1..maxPLMN)) OF
NetworkSliceBandAssociationInfoListPerPLMN
...
}
NetworkSliceBandAssociationListPerPLMN::= SEQUENCE {
     networkSliceBandAssociationInfoList
NetworkSliceBandAssociationInfoList,
     areaScope                        ENUMERATED {PLMN, RegistrationArea, TACs, Cells}
OPTIONAL,
     TAC-List SEQUENCE (SIZE (1..maxNrofTAC)) OF TrackingAreaCode
OPTIONAL, - Cond TACs
     cellList SEQUENCE (SIZE (1..maxNrofCell)) OF phyCellId
OPTIONAL, - Cond Cells
}
NetworkSliceBandAssociationInfoList::=                      SEQUENCE (SIZE
(1..maxNrofS-NSSAI) OF NetworkSliceBandAssociationInfo
NetworkSliceBandAssociationInfo SEQUENCE {
     S-NSSAI                                        S-NSSAI        OPTIONAL,
     frequencyBandList                             MultiFrequencyBandListNR-SIB
OPTIONAL,
     ...
}
```

Figure 20A:
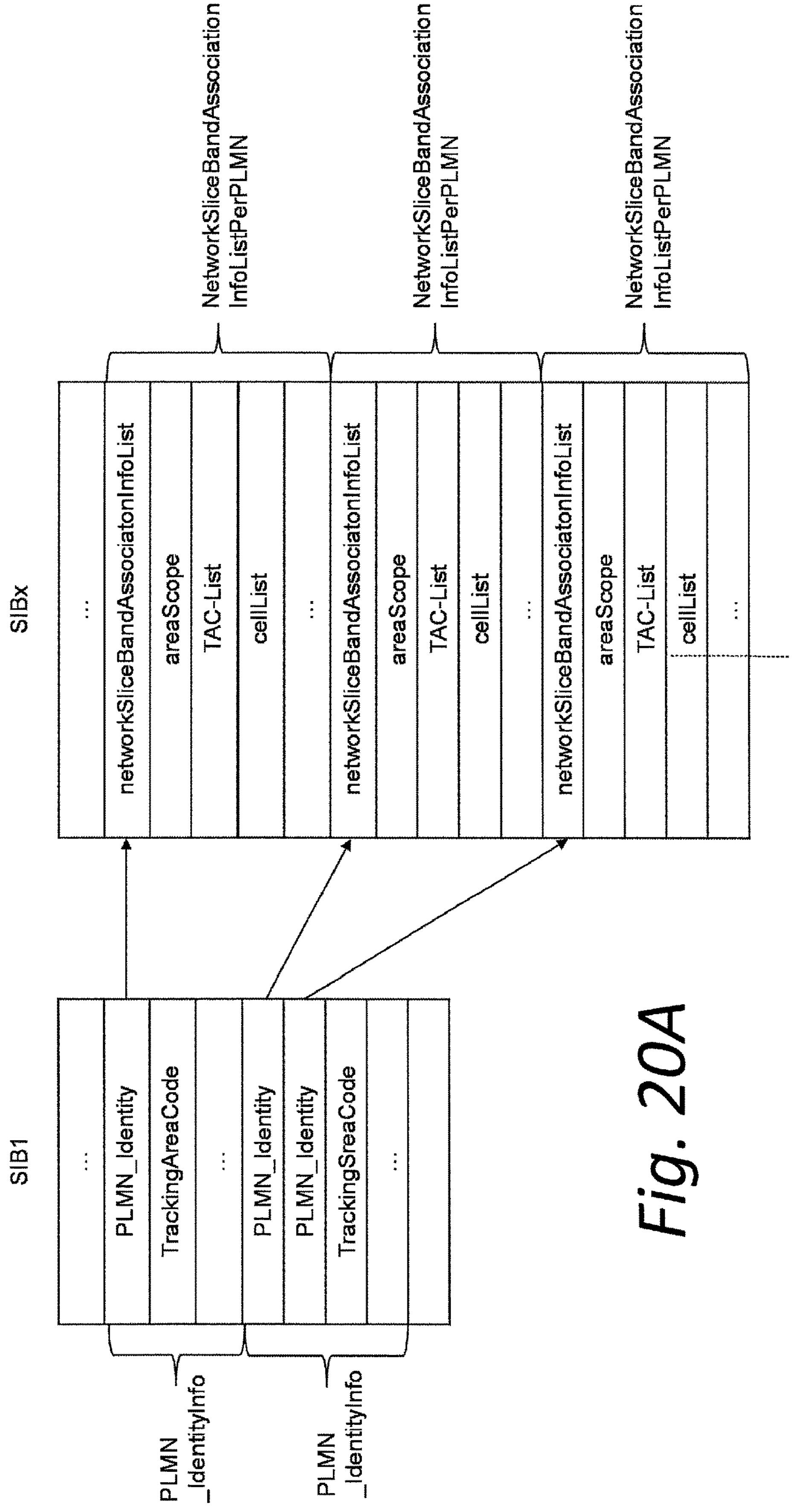
FIG. 20A is a diagrammatic view showing a graphical representation of a first implementation of how area scope indication may be indicated in system information including SIB1 and SIBx.

FIG. 20A shows a graphical representation of SIB1 and SIBx disclosed in Table 9, wherein each of networkSliceBandAssociationInfoListPerPLMN information elements (IEs) in SIBx may be associated with one PLMN_Identity field in SIB1, by the order of presences. Each of the networkSliceBandAssociationInfoListPerPLMN IEs may comprise networkSliceBandAssociationInfoList, areaScope, optional TAC-List and optional cellList. The areaScope IE may indicate that the corresponding networkSliceBandAssociationInfoList is valid within a serving PLMN, a current registration area, within tracking area codes identified by TAC-List or within cells identified by cellist. The TAC-List IE may be conditionally present when areaScope="TACs". Likewise, the cellList IE may be conditionally present, only when areaScope="Cells".

In another example implementation of the embodiment and mode of FIG. 19B, an area scope indication may be assigned for each network slice, instead of network slice band association information). Table 9B shows an example format of SIB1 and SIBx for this other example implementation.

TABLE 9B

```
SIB1 ::=                            SEQUENC {
...
    cellAccessRelatedInfo                      CellAccessRelatedInfo,
...
}
CellAccessRelatedInfo ::= SEQUENCE {
   plmn-IdentityList                         PLMN-IdentityInfoList,
   cellReservedForOtherUse                    ENUMERATED {true}OPTIONAL, --Need R
     ...
}
PLMN-IdentityInfoList ::= SEQUENCE (SIZE (1..maxPLMN)) OF
PLMN-IdentityInfo
PLMN-IdentityInfo ::=                        SEQUENCE {
    plmn-IdentityList                        SEQUENCE (SIZE (1..maxPLMN)) OF
PLMN-Identity,
    trackingAreaCode                         TrackingAreaCode
OPTIONAL,                          -- Need R
    ranac                              RAN-AreaCode
OPTIONAL,                          -- Need R
    cellIdentity                            CellIdentity,
    cellReservedForOperatorUse ENUMERATED {reserved,
notReserved},
    ...
}
 SIBx ::=                            SEQUENCE {
 ...
     networkSliceBandAssociationInfoListForPLMNs             SEQUENCE
 (SIZE (1..maxPLMN)) OF NetworkSliceBandAssociationInfoList
 ...
 }
 NetworkSliceBandAssociationInfoList::=                     SEQUENCE (SIZE
 (1..maxNrofS-NSSAI) OF NetworkSliceBandAssociationInfo
 NetworkSliceBandAssociationInfo                        SEQUENCE {
     s-NSSAI                            S-NSSAI        OPTIONAL,
     frequencyBandList MultiFrequencyBandListNR-SIB
```

TABLE 9B-continued

```
OPTIONAL,
    areaScope                          ENUMERATED {PLMN, RegistrationArea, TACs,
Cells}                            OPTIONAL,
    TAC-List SEQUENCE (SIZE (1..maxNrofTAC)) OF TrackingAreaCode
OPTIONAL,                          - Cond TACs
    cellList SEQUENCE (SIZE (1..maxNrofCell)) OF phyCellId
OPTIONAL - Cond Cells
    ...
}
```

Figure 20B:
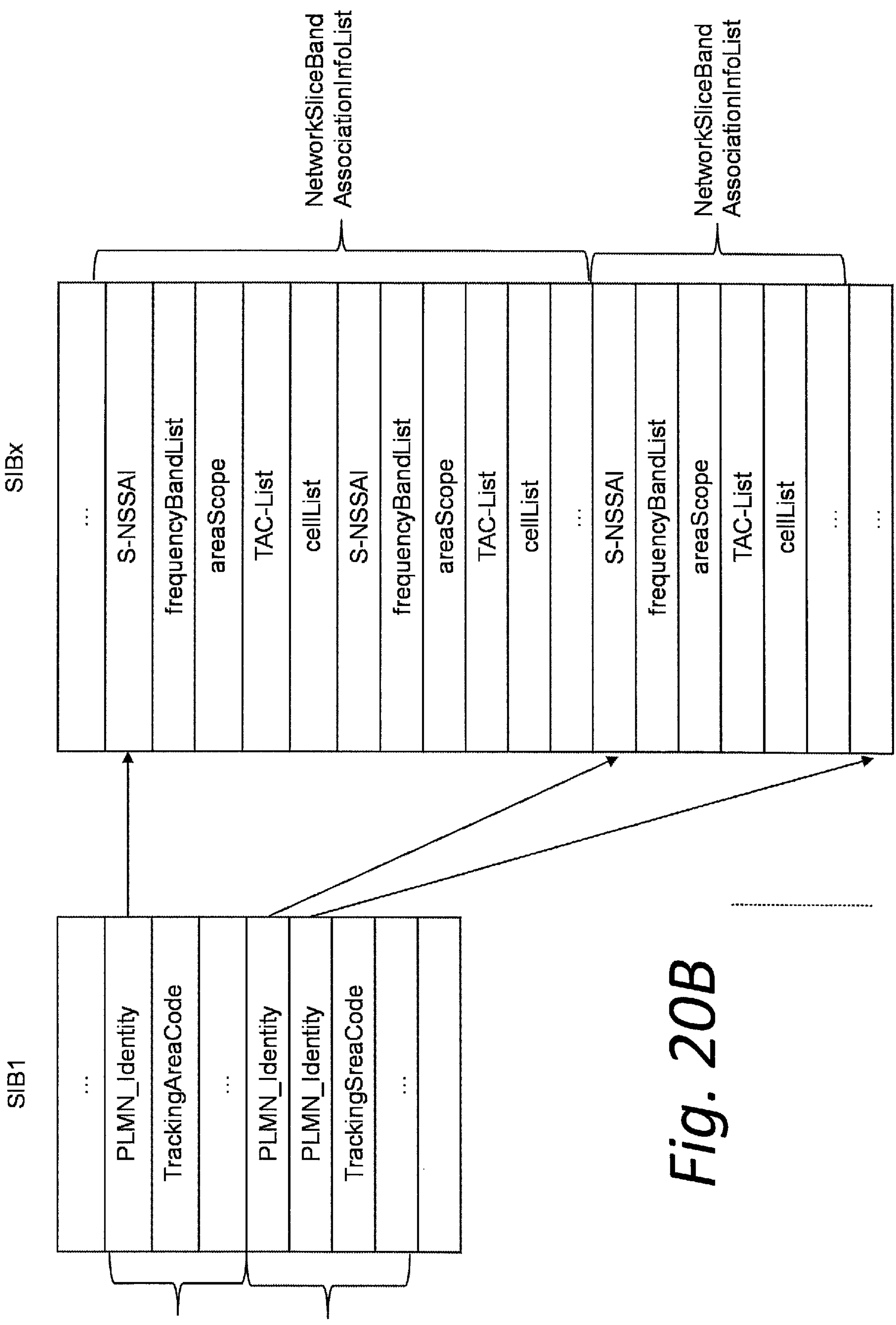
FIG. 20B is a diagrammatic view showing a first implementation of how area scope indication may be indicated in system information including SIB1 and SIBx.

FIG. 20B shows a graphical representation of SIB1 and SIBx disclosed in Table 9, wherein areaScope and cellList may be included inside of NetworkSliceBandAssociationInfo. The areaScope IE may indicate that the corresponding network slice (S-NSSAI) is valid within a serving PLMN, a current registration area, within tracking area codes identified by TAC-List or within cells identified by cellList. The TAC-List IE may be conditionally present when areaScope="TACs". Likewise, the cellList IE may be conditionally present, only when areaScope="Cells".

4.2 Area Scope Indication Carried by NAS Message

FIG. 19C shows an example embodiment and mode of the generic system of FIG. 19A in which the network slice band association information, NSBAI, including the area scope indication is carried in a non-access stratum message. FIG. 19C thus shows that based on information of area scope indication generator/memory 150, management entity 26(19) generates a non-access stratum message 151C that carries the network slice band association information, NSBAI, including the area scope indication, to the wireless terminal 30(19). The non-access stratum message 151C is transmitted from management entity 26(19) by interface 82 toward the radio access network (RAN) 22 to access node 28, and is transmitted by access node 28 to wireless terminal 30(19). At wireless terminal 30(19) the network slice band association information, NSBAI, is stored in network slice band association information (NSBAI) memory 42(19), and is used by reacquisition controller 160 in its determination of whether a reacquisition procedure is necessary in view of the area scope indication.

In the example embodiment and mode of FIG. 19C, therefore, area scope indication(s) for the network slice band association information may be provided from a core network by a NAS message, such as message 151C. Similar to the preceding embodiment, the area scope indication(s) may be configured during the registration procedure, preferably along with provisioning of the network slice band association information.

As an exemplary implementation of the FIG. 19C example embodiment and mode, the Registration Accept message may comprise the NSSAI Band Association IE, as disclosed earlier, with additional Area Scope and Cell List fields as shown in FIG. 21A, wherein the Area Scope IE may take one of the following values: {"PLMN", "RegistrationArea", "TACs" "Cells"}. The TAC List field may be conditionally present when Area Scope is "TACs". Likewise, the Cell List field may be conditionally present when the Area Scope is "Cells".

Figure 21B:
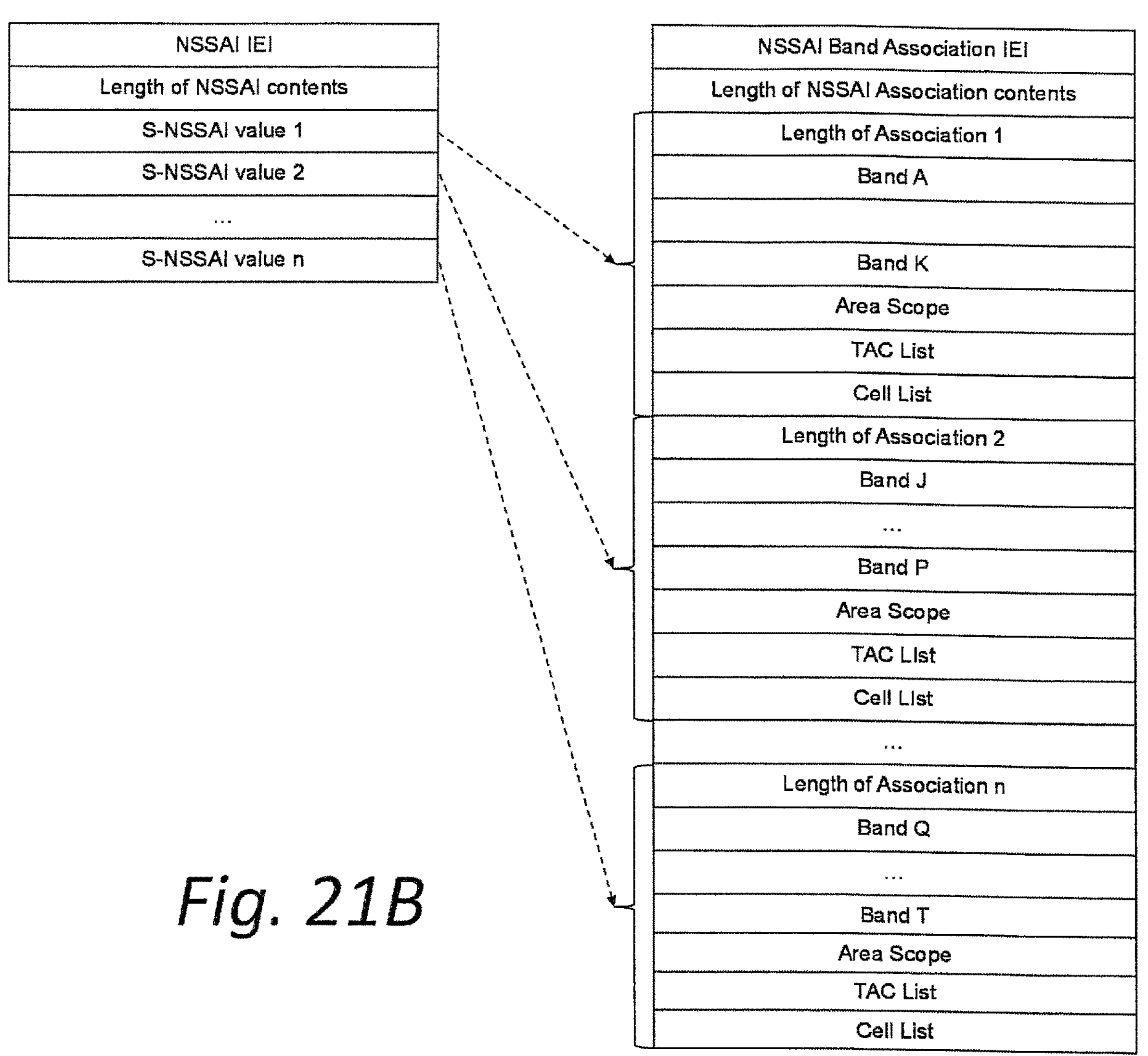
FIG. 21B is a diagrammatic view showing a second implementation of how area scope indication may be indicated in a non-access stratum message.

Another exemplary implementation of the example embodiment and mode of FIG. 19C is shown in FIG. 21B, wherein the additional Area Scope field and the optional TAC List or Cell List are associated with each of S-NSSAI fields in the NSSAI IE.

In an example embodiment and mode such as that of FIG. 19C wherein the network slice band association information and area scope indication(s) are configured by a NAS message, the Area Scope field may be optional. If omitted, i.e., the area scope of a band association may follow the scope of the corresponding NSSAI. For example, if the "Association 1" in FIG. 21B has no Area Scope field, and if the corresponding NSSAI IE is an Allowed NSSAI, the band associations under "Association 1" may be valid in the current registration area, since the scope of an Allowed NSSAI is within the current registration area. Similarly, if the "Association 1" in FIG. 21B has no Area Scope field, and if the corresponding NSSAI IE is a Configured NSSAI, the band associations under "Association 1" may be valid in the serving PLMN.

4.3 Area Scope Indication Carried by RRC Message

FIG. 19D shows an example embodiment and mode of the generic system of FIG. 19A in which the network slice band association information, NSBAI, including the area scope indication is carried in dedicated RRC signaling during the RRC_CONNECTED state. FIG. 19D thus shows that access node 28 comprises RRC signaling generator 152D, which in turn manages and stores the area scope indication manager/memory 154. Thus, in the example embodiment and mode of FIG. 19D the message 155 is dedicated RRC signaling during the RRC_CONNECTED state.

In the example embodiment and mode of FIG. 19D, the network slice band association information and associated area scope indication(s) may be provided by a dedicated RRC signaling during the RRC_CONNECTED state, such as RRCReconfiguration message and/or RRCRelease message. Such a dedicated RRC message may comprise a list of PLMN identities and an instance of the network slice band association information with an area scope indication(s) (e.g. NetworkSliceBandAssociationListPerPLMN in Table 9A, or NetworkSliceBandAssociationInfoList in Table 9B) for each of the PLMN identities.

4.4 Area Scope Indication: Area Identities

When receiving the network slice band association information with an area scope indication(s), the wireless terminal 30(19) may store the network slice band association information and the area scope indication(s) in its memory, e.g., network slice band association information (NSBAI) memory 42(19). In addition, the wireless terminal may store one or more area identities based on the area scope(s), wherein the one or more area identities to be stored may be: (1) the serving PLMN identity (if the area scope is "PLMN"), (2) the tracking area codes (TACs) of the current registration area (if the area scope is "Registration Area"), (3) the TACs included in the TAC list (if the area scope is "TACs"), or (4) the cell identities included in the Cell List (if the area scope is "Cells").

4.5 Area Scope Indication: Node Operations

Then upon entering a new cell, the wireless terminal may determine if the stored network slice band association information is valid in the new cell, based on the stored area scope indication(s). For example, if the stored area scope is "PLMN" and if the new cell advertises (via system information) the same PLMN identity as the one stored in the wireless terminal, the stored network slice band association information may be considered to be valid in the new cell. Likewise, if the stored area scope is "Registration Area" or "TACs" and if the new cell advertises one of the stored TACs, the stored network slice band association information may be considered to be valid in the new cell. Similarly, if the stored area scope is "Cell List" and if the identity of the new cell is in the stored cell list, the stored network slice band association information may be considered to be valid in the new cell. Otherwise, the stored network slice band association information may be considered to be invalid in the new cell.

In a case that the stored network slice band association information turns to be valid in a new cell, the wireless terminal may follow the operation and mode disclosed in the preceding embodiment, as if the stored network slice band association information were provided by the new cell. Otherwise, the UE may attempt to obtain network slice band association information by system information acquisition, and/or through the registration procedure to the core network, as disclosed previously.

Figure 22A:
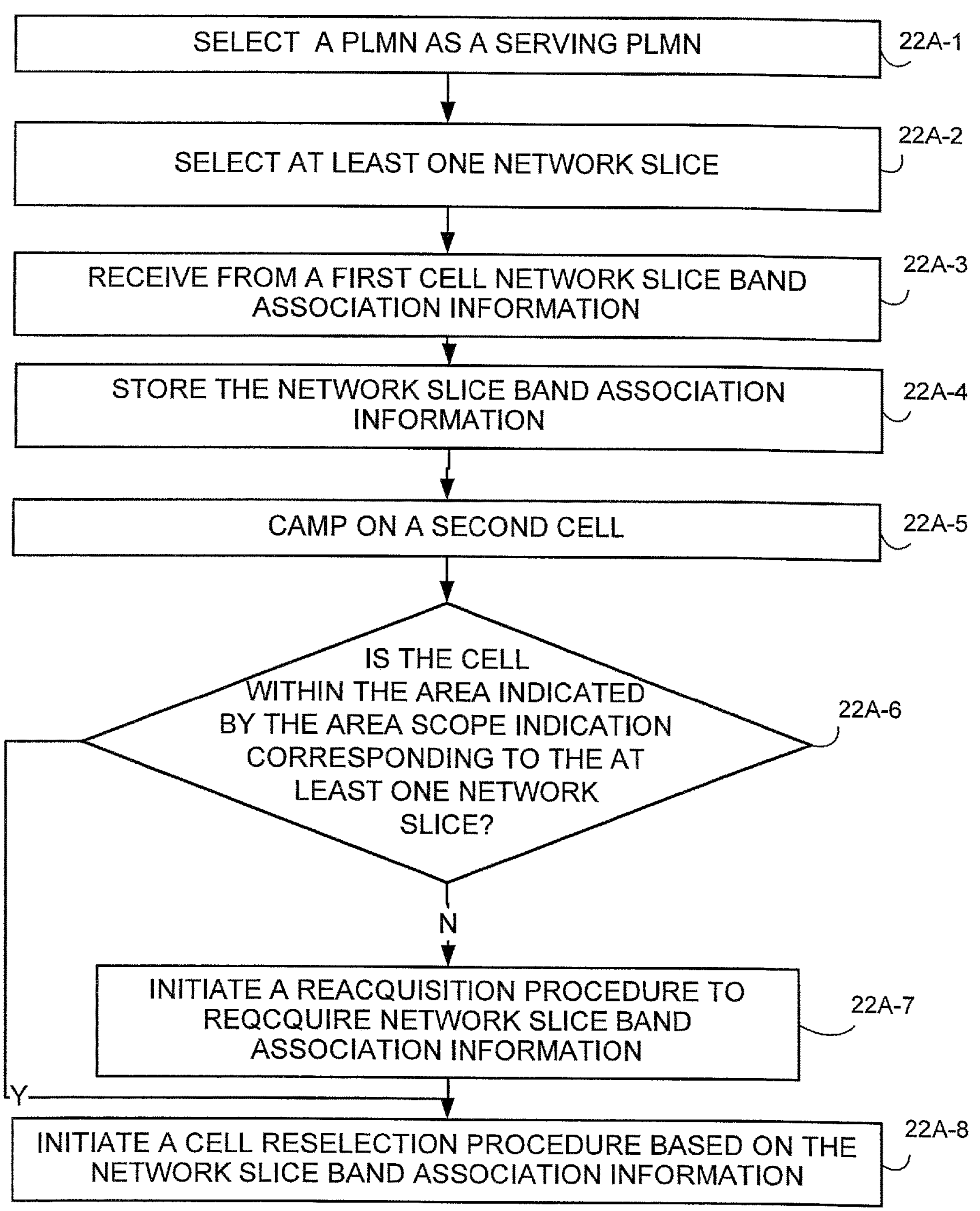
FIG. 22A is a flow chart showing example representative steps or acts performed by a wireless terminal of the example embodiment and mode of FIG. 14A.

FIG. 22A is a flow chart showing example representative steps or acts performed by a wireless terminal, e.g. UE, of the example generic embodiment and mode of FIG. 19A. As such, the acts of FIG. 22A are performed by the wireless terminals of the example embodiments and modes of FIG. 19B-FIG. 19D. Act 22A-1 comprises selecting a PLMN as a serving PLMN. Act 22A-2 comprises choosing, based on the serving PLMN, a network slice(s) that the wireless terminal desires to use. Act 22A-3 comprises receiving, from a first cell, a message comprising network slice band association. The message may be a system information message (e.g. SIB1/SIBx), a NAS message (e.g. Registration Accept message) or a dedicated RRC message. The network slice band association information may comprise one or more network slice identifiers, each of the one or more network slice identifiers identifying a network slice, each of the one or more network slice identifiers being associated with a radio band(s) and an area scope indication, the radio band(s) indicating a frequency domain interval(s) on which a network slice identified by the each of the one or more network slice identifiers is supported, the area scope indication indicating an area in which the network slices is supported on the radio band(s). Act 22A-4 comprises storing the network slice band association information. Act 22A-5 comprises camping on a second cell. Act 22A-6 comprises determining whether or not the network slice band association information needs to be reacquired from the second cell. The determination is based on the area scope indication in the stored network slice band association information, the area scope indication corresponding to the selected at least one network slice. If the second cell is within the area indicated by the area scope indication, as shown in Act 22A-7, a reacquisition procedure is initiated to reacquire the network slice band association information from the second cell. The reacquired network slice band association information may be stored in the wireless terminal, and may coexist with or replace a previously stored version(s). Act 22A-8 comprises initiating a cell reselection procedure to reselect a third cell, if necessary, using the stored network slice band association information. The stored network slice band association information may be the one received in Act 22A-3, or the one reacquired in Act 22A-7. The cell reselection procedure in Act 22A-8 may follow the preceding embodiment: preferably triggered based on (i) regular neighbor cell measurements (to select a cell with better signal quality) or (ii) the network slice band association information (in a case that the band of the currently camped cell does not support the network slice(s) of interest).

Figure 22B:
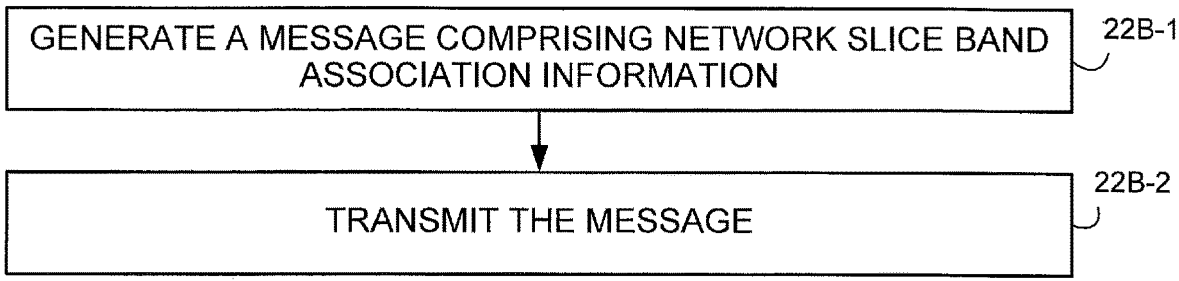
FIG. 22B is a flow chart showing example representative steps or acts performed by an access node of the example embodiment and mode of FIG. 14A.

FIG. 22B is a flow chart showing example representative steps or acts performed by an access node, e.g. gNB, of the example generic embodiment and mode of FIG. 19A. As such, the acts of FIG. 22A are performed by access nodes of the example embodiments and modes of FIG. 19B-FIG. 19D. Act 22B-1 comprises generating at least one message comprising network slice band association information. Such a message may be a system information message as shown, for example, in FIG. 19B, or a dedicated RRC message as shown, for example, in FIG. 19D. The dedicated RRC message may be, for example, a reconfiguration message or a release message. The network slice band association information may comprise one or more network slice identifiers, each of the one or more network slice identifiers identifying a network slice, each of the one or more network slice identifiers being associated with a radio band(s) and an area scope indication, the radio band(s) indicating a frequency domain interval(s) on which a network slice identified by the each of the one or more network slice identifiers is supported, the area scope indication indicating an area in which the network slices is supported on the radio band(s). Act 22B-2 comprises transmitting the message, such as message 155.

Figure 22C:
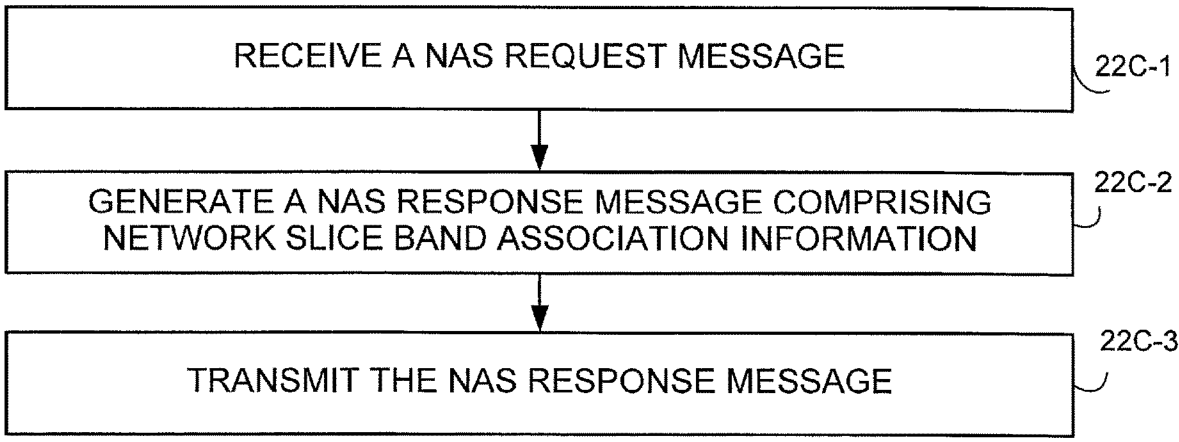
FIG. 22C is a flow chart showing example representative steps or acts performed by a management entity of the example embodiment and mode of FIG. 14A.

FIG. 22C is a flow chart showing example representative steps or acts performed by a management entity of a core network, e.g., AMF, of the example generic embodiment and mode of FIG. 19A. As such, the acts of FIG. 22A are performed by the management entities of the example embodiments and modes of FIG. 19C. Act 22C-1 comprises receiving a non-access stratum (NAS) request message, e.g., a Registration Request message, from a wireless terminal. Act 22C-2 comprises generating a NAS response message, such as, for example, a Registration Accept message. The NAS response message comprises network slice band association information. The network slice band association information may comprise one or more network slice identifiers, each of the one or more network slice identifiers identifying a network slice, each of the one or more network slice identifiers being associated with a radio band(s) and an area scope indication, the radio band(s) indicating a frequency domain interval(s) on which a network slice identified by the each of the one or more network slice identifiers is supported, the area scope indication indicating an area in which the network slices is supported on the radio band(s). Act 22C-3 comprises transmitting the NAS response message, as shown by message 151C of FIG. 19C.

5.0 Coverage Area for Network Slicing

The aforementioned GSMA NG.116, General Network Slice Template, also describes another attribute, an "area of service" attribute, which may be used to specify a network slice with a list of the countries where the service of a network slice will be provided. Table 11 is an example template of the "area of service" attribute.

TABLE 11

| Parameter Value | {String, String . . . } |
| --- | --- |
| Measurement unit | NA |
| Example | Canada<br>France<br>Japan<br>UK |

TABLE 11-continued

| Parameter Value | {String, String . . . } |
|---|---|
| Tags | Character Attribute/Operation<br>Scalability Attribute<br>KPI |

The example embodiment and mode of FIG. 23 goes beyond GSMA NG.116 in that, e.g., the communications network 20(23) provides one or more network slice coverage area configurations, in which each of the one or more network slice coverage configuration(s) indicate a coverage area of a corresponding network slice. As used herein, the "network slice coverage area configuration" may also be referred to as "coverage area attribute", or "slice coverage area attribute", or "region attribute". The network slice coverage area configuration(s) provided by the example embodiment and mode of FIG. 23 is beneficial, for example, in providing, for a country listed in the area of service attribute of Table 11, for example, a further indication of whether the service is provided in the whole country or just in part of the country. The network slice coverage area configuration may be provided for one or more, and perhaps all, of the countries listed in the area of service attribute of Table 11. Thus, if a specific location is required, this network slice coverage area configuration or area coverage attribute may be used to specify regions of the country. Table 12 is an example template of such a region specification.

TABLE 12

| Parameters Value | Integer |
|---|---|
| Measurement unit | NA |
| Example | 1. full country<br>2. list of regions |
| Tags | Character Attribute/Operation<br>Scalability Attribute<br>KPI |

Figure 23A:
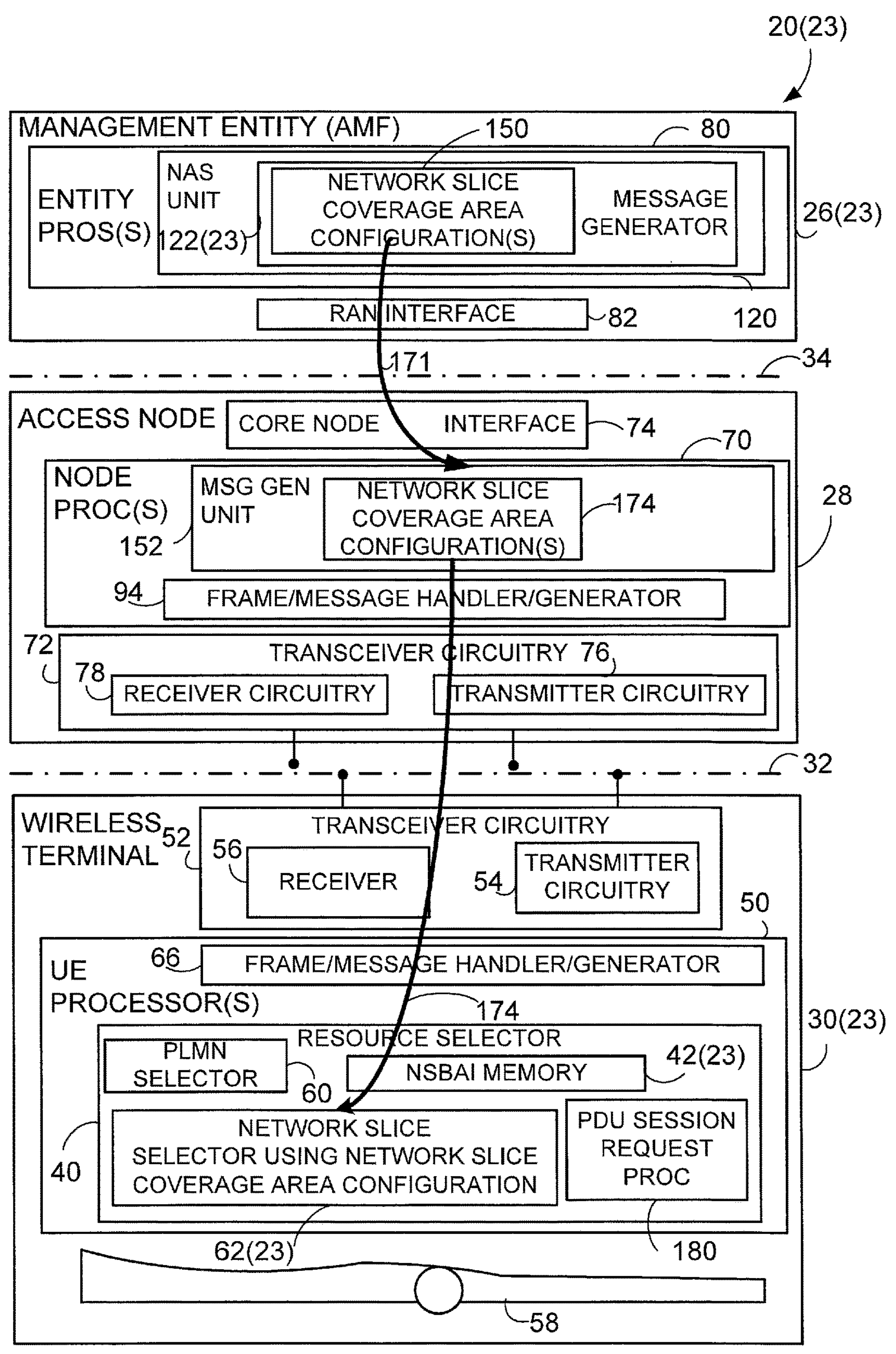
FIG. 23A is a schematic view of an example generic communications system in which a wireless terminal is provided with network slice coverage area configuration to indicate a coverage area of a corresponding network slice.
Figure 23B:
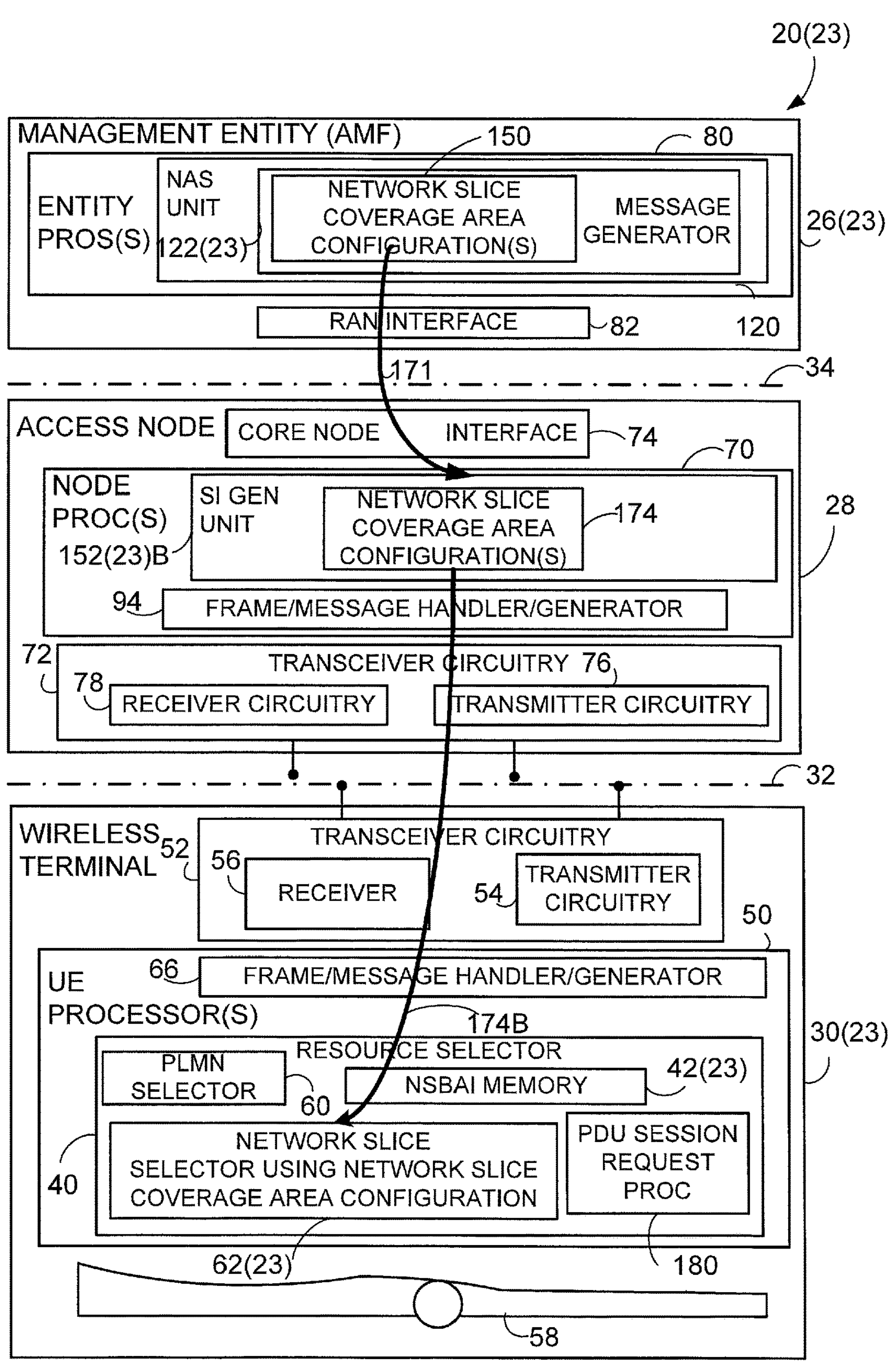
FIG. 23B is a schematic view of an example communications system in which the network slice coverage area configuration is carried in system information.
Figure 23C:
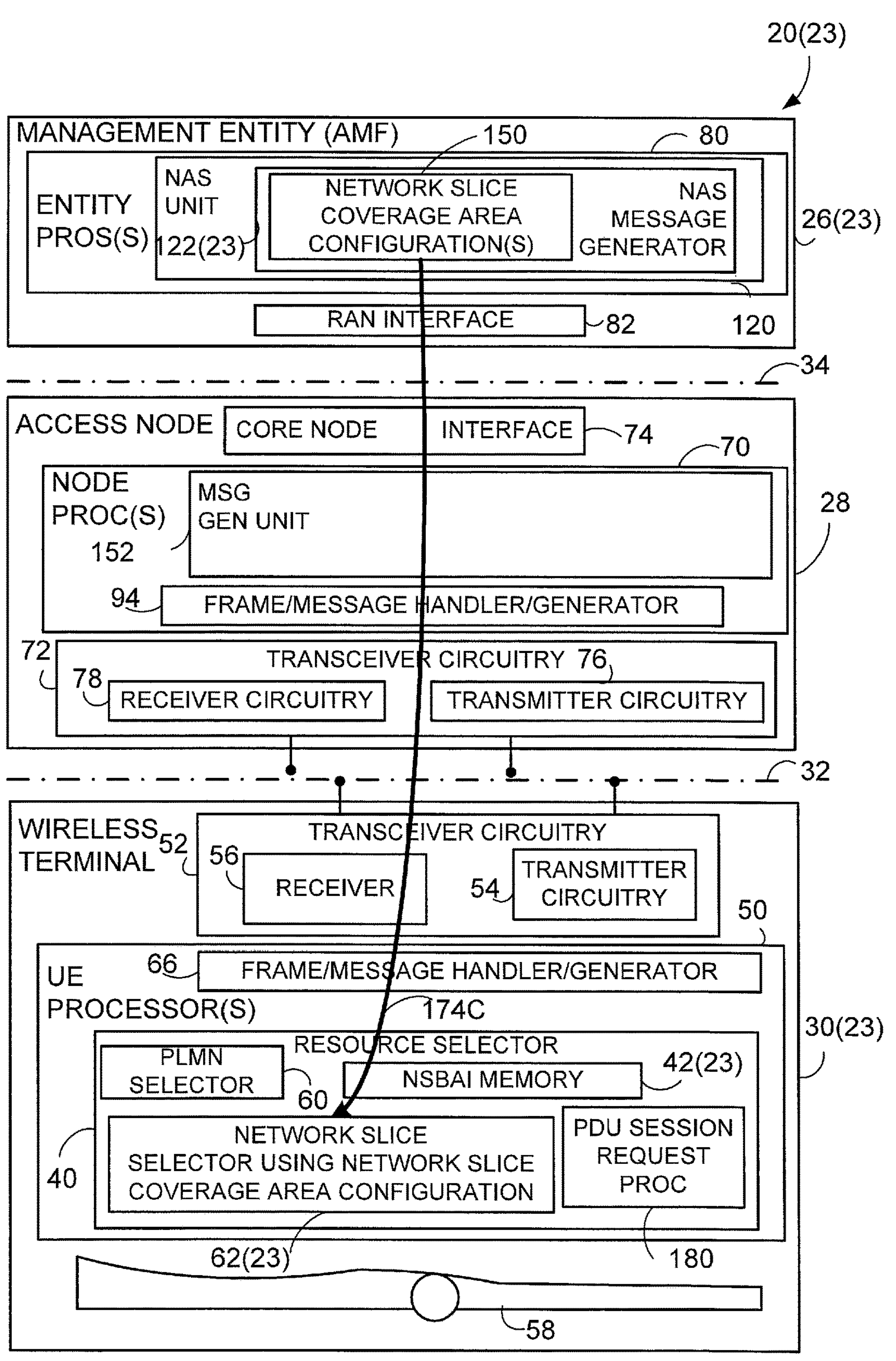
FIG. 23C is a schematic view of an example communications system in which the network slice coverage area configuration is carried in a non-access stratum message.
Figure 23D:
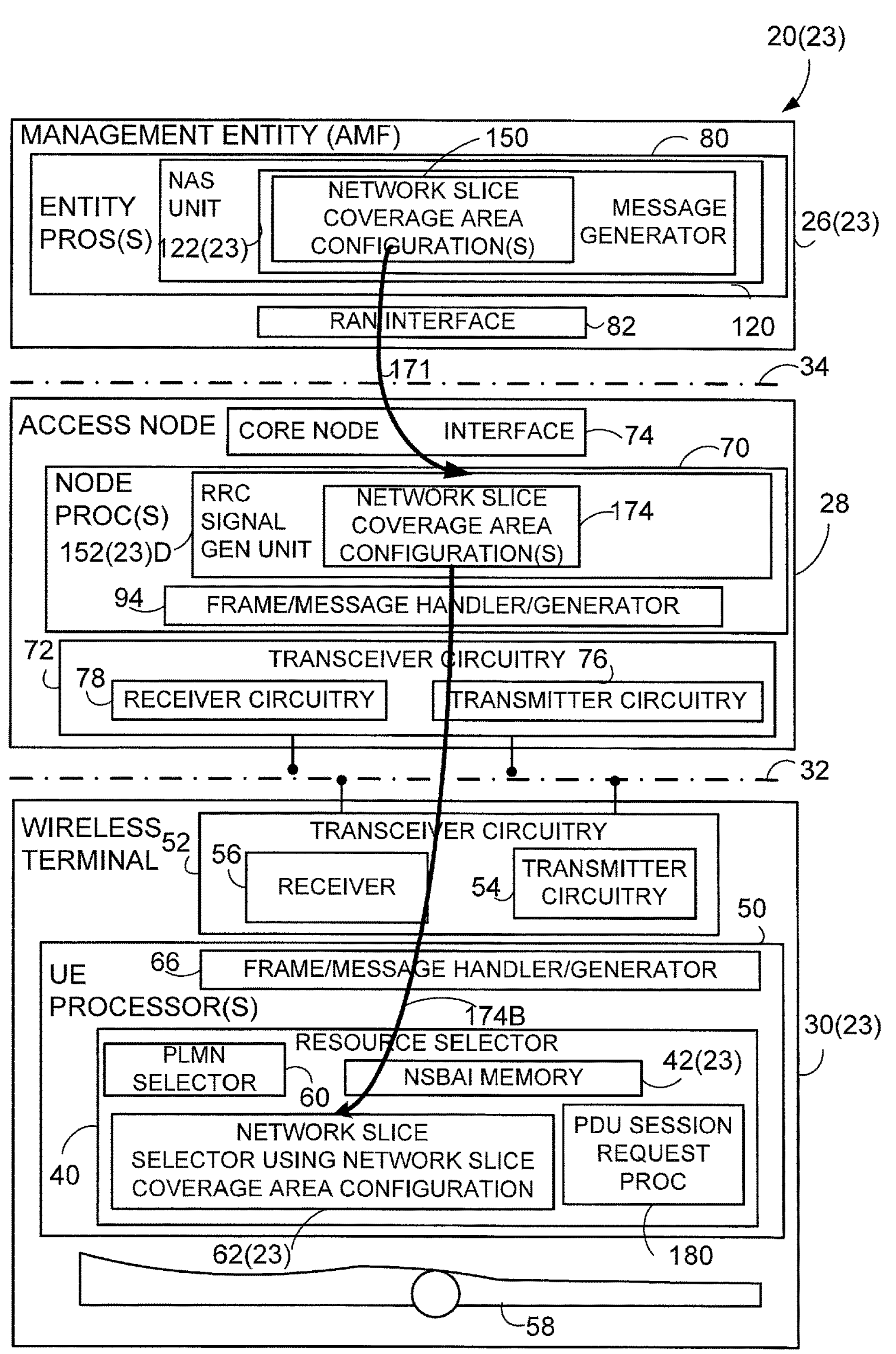
FIG. 23D is a schematic view of an example communications system in which the network slice coverage area configuration is carried in dedicated RRC signaling.

The example embodiment and mode of FIG. 23A is generic to the example embodiments and modes of FIG. 23B-FIG. 23D, and therefore all comments concerning FIG. 23A are applicable to the example embodiments and modes of FIG. 23B-FIG. 23D as well. Moreover, the example embodiment and mode of FIG. 23A is itself an example implementation of the generic example embodiment and mode of FIG. 4 and FIG. 5, and as such explanations of FIG. 4 and FIG. 5 are applicable to communications system 20(23) of FIG. 23A as well.

For example, the communications system 20(23) of FIG. 23A comprises one or more radio access networks (RANs) 22 and one or more core networks (CNs) 24, with one management entities 26 being shown in the core network (CN) 24 by way of example and one access node 28 being shown by way of example in radio access network (RAN) 22. Although not illustrated as such, the communications system 20(23) of FIG. 23A may be and usually is utilized by plural PLMNs. In FIG. 23A, wireless terminal 30 communicates with a management entity of a core network through an access node of a radio access network (RAN). The core network supports one or more network slices, each of the network slices providing a designated service within a public land mobile network (PLMN).

Since the communications system 20(4) is generic to various other example embodiments and modes described herein, it is again mentioned that the wireless terminal may take various forms as mentioned above, and likewise that the access node may have been implemented in many different ways. For example, in addition to the foregoing comments concerning access nodes, it should be mentioned that in any of the example embodiments and modes described herein that the radio access network (RAN) 22 the source and destination may be interconnected by way of a plurality of nodes. Moreover, communications system 20(23) may be realized in virtualized and/or distributed and/or logical form.

Structures and functionalities of the communications system 20(23) of FIG. 23A which are common or essentially the same as one of more of the preceding example embodiments have the same reference numerals. For example, much of the structure of wireless terminal 30 of FIG. 23A and much of the structure of access node 28 of FIG. 23A is similar to preceding example embodiments. However, in in the example embodiment of FIG. 23A the management entity 26(23) generates a network slice coverage area configuration, or area coverage attribute, which indicates a coverage area of a corresponding network slice.

The management entity 26(23) of communications system 20(23) may comprise core network entity processor circuitry 80 and interface 82 toward the radio access network (RAN) 22. The core network entity processor circuitry 80 may be realized or comprise one or more processors and at least one memory. The memory includes computer program code, wherein the memory and the computer program code are configured to, working with the at least one processor, cause the decoding device to perform at least at least the operations described herein. FIG. 23A further shows management entity 26(23) as comprising system the non-access stratum (NAS) unit 120, which may include message generator 122(23). The AS message generator 122(23) controls generation, formatting, and/or inclusion of the network slice coverage area configuration in a message, such as a non-access stratum message. FIG. 23A therefore illustrates core non-access stratum (NAS) unit 120 with its message generator 122(23) as including network slice coverage area configuration generator/memory 170. The non-access stratum (NAS) unit 120 with its network slice coverage area configuration generator/memory 170 preferably comprises or is included in node processor circuitry 70 of management entity 26(23). The arrow 171 of FIG. 23A shows that management entity 26(23) provides the network slice coverage area configuration to radio access network (RAN) 22, e.g., to access node 28.

There three possible implementations regarding the message(s) which carry the network slice coverage area configuration. In a first example implementation, the network slice band association information (NSBAI) and the coverage area configuration are in separate messages. In a second example implementation, the network slice band association information (NSBAI) and the coverage area configuration are included in a same message but as separate information elements. In a third example implementation, the network slice band association information (NSBAI) and the coverage area configuration are included in a same message and are combined in one information element. Thus, for the above second and third example implementations, in which the message may include both the network slice band association information and the network slice coverage area configuration, the message generator 122(23) may comprise or be included in the core NSBAI controller 122 of previously described embodiments and modes. In such case, the network slice band association information, NSBAI, may include the network slice coverage area configuration.

The access node 28 of the example embodiment and mode of FIG. 23A comprises node processor circuitry 70, node transceiver circuitry 72, and interface 74 to core network (CN) 24. The node transceiver circuitry 72 may comprise node transmitter circuitry 76 and node receiver circuitry 78. The transceiver circuitry 72 includes antenna(e) for the wireless transmission. Transmitter circuitry 76 may include, e.g., amplifier(s), modulation circuitry and other conventional transmission equipment. Receiver circuitry 78 may comprise, e.g., amplifiers, demodulation circuitry, and other conventional receiver equipment. As indicated above, various aspects of access node 28 including the node transceiver circuitry 72 may be realized by a distributed unit (DU) and a mobile termination unit (MT).

The node processor circuitry 70 of the access node 28 of FIG. 23A is shown as comprising, among other units and functionalities, frame/message handler/generator 94 and message generator 152. In the example embodiment and mode of FIG. 23A, the access node 28 receives the network slice coverage area configuration from the management entity 26(23), as indicated by arrow 171, and is stored in network slice coverage area configuration manager/memory 174. The network slice coverage area configuration as stored in network slice coverage area configuration manager/memory 174 is included in a message generated by message generator 152 which transmitted by access node 28 to wireless terminal 30(23), as shown by arrow 175 in FIG. 23A. In an example implementation, the network slice coverage area configuration may optionally be included in a same massage that carries the network slice band association information (NSBAI).

The wireless terminal 30(23) of communications system 20(23) of FIG. 23A comprises terminal transceiver circuitry 52 and processor circuitry, e.g., terminal processor circuitry 50. The transceiver circuitry 52 in turn may comprise terminal transmitter circuitry 54 and terminal receiver circuitry 56. The transceiver circuitry 52 includes antenna(e) for the wireless transmission. Transmitter circuitry 54 may include, e.g., amplifier(s), modulation circuitry and other conventional transmission equipment. Receiver circuitry 56 may comprise, e.g., amplifiers, demodulation circuitry, and other conventional receiver equipment. FIG. 23A further shows that wireless terminal 30(23) may also comprise terminal interfaces 58. Such user interfaces may serve for both user input and output operations, and may comprise (for example) a screen such as a touch screen that can both display information to the user and receive information entered by the user. The interfaces 58 may also include other types of devices, such as a speaker, a microphone, or a haptic feedback device, for example.

The receiver circuitry 56 of wireless terminal 30(23) is configured to receive, from a cell served by the access node 28, a message comprising the network slice coverage area configuration, as indicated by arrow 175 in FIG. 23A. As indicated above, the network slice coverage area configuration may optionally be included in a same massage that carries the network slice band association information (NSBAI).

The terminal processor circuitry 50 of FIG. 23A is shown as including terminal resource selector 40. In addition to memory or registers 42(23) for storing network slice band association information (NSBAI), the terminal resource selector 40 comprises PLMN selector 60; network slice selector 62(23) which uses the network slice coverage area configuration, and protocol data unit (PDU) session establishment request procedure unit 180, also known as PDU session request procedure unit 180.

As understood from the foregoing and further described herein, the management entity 26(23) thus belongs to core network (CN) 24 and communicates with a wireless terminal, e.g., wireless terminal 30(23), via a cell of a radio access network (RAN). The core network supports one or more network slices, each of the network slices providing a designated service within a public land mobile network (PLMN). In an example basic embodiment and mode, the management entity comprises receiver circuitry, processor circuitry, and transmitter circuitry. The receiver circuitry is configured to receive, from the wireless terminal, a non-access stratum (NAS) request message. The processor circuitry is configured to generate a NAS response message comprising one or more network slice coverage area configurations. The transmitter circuitry is configured to transmit, to the wireless terminal, the NAS response message. The one or more network slice coverage area configurations are used by the wireless terminal to determine whether or not a network slice is available in a serving cell that the wireless terminal camps on.

As understood from the foregoing and further described herein, in a basic example embodiment and mode the access node 28 thus comprises processor circuitry and transmitter circuitry. The processor circuitry is configured to generate a message comprising one or more network slice coverage area configurations, each of the one or more network slice coverage configurations indicating a coverage area of a corresponding network slice. The transmitter circuitry is configured to transmit, to a wireless terminal, the message in a cell served by the access node. The once or more network slice coverage area configurations are used by the wireless terminal to determine whether or not a network slice is available in a serving cell that the wireless terminal camps on.

As understood from the foregoing and further described herein, the wireless terminal 30(23) communicates with a management entity of a core network through an access node of a radio access network (RAN). As mentioned, the core network supports one or more network slices, each of the network slices providing a designated service within a public land mobile network (PLMN). In a basic example embodiment and mode the wireless terminal 30(23) comprises receiver circuitry and processor circuitry. The receiver circuitry is configured to receive a message comprising one or more network slice coverage area configurations. Each of the one or more network slice coverage configurations indicates a coverage area of a corresponding network slice. The processor circuitry is configured to: select at least one network slice of a serving PLMN; camp on a serving cell of the RAN, and; determine, based the one or more network slice coverage area configurations, whether or not the at least one network slice is available in the serving cell.

5.1 Types of Messages Carrying Coverage Area Identities

Various methods can be used to provide the configuration of the coverage area attribute, such as NAS signaling, system information broadcast and dedicated RRC signaling.

FIG. 23B shows the network slice coverage area configuration is carried in system information. In FIG. 23B, the access node 28 comprises system information message generator 152(23)B which includes the network slice coverage area configuration in system information such as a system information block (SIB). In FIG. 23B the network slice coverage area configuration is thus broadcast as system information as indicated by arrow 174B.

FIG. 23C is a schematic view of an example communications system in which the network slice coverage area configuration is carried in a non-access stratum message, e.g., non-access stratum signaling. In the case of using the NAS signaling, a NAS message, such as the aforementioned Registration Accept message may be used, wherein the NAS message may further comprise an optional information element (IE), "Allowed NSSAI Coverage Area" IE, for the Allowed NSSAI, and/or may comprise another optional "Configured NSSAI Coverage Area" IE for the Configured NSSAI.

FIG. 23D is a schematic view of an example communications system in which the network slice coverage area configuration is carried in dedicated RRC signaling. In FIG. 23D, the access node 28 comprises RRC message generator 152(23)D which includes the network slice coverage area configuration in RRC signaling. In FIG. 23D the network slice coverage area configuration is thus transmits the RRC signaling carrying the network slice coverage area configuration as indicated by arrow 174D.

5.2 Types of Coverage Area Identities

As mentioned above, the network slice coverage area configuration may also be referred to as the region attribute region or the coverage area attribute. The network slice coverage area configuration may be preferably be described by a listing of area identities, such as identities of tracking areas, base stations/access nodes, cells, sectors, beams or any other types of areas via which the network slice is provided. It will be understood from the preceding embodiments that an S-NSSAI in an Allowed NSSAI is effective in the current registration area, and an S-NSSAI in a Configured NSSIA is effective in the serving PLMN. Therefore, this embodiment is aimed to provide different kinds of granularity for the coverage area attribute.

In one configuration, a coverage area attribute for a network slice may be configured to the wireless terminal as a list of area identities, such as a list of tracking area codes and/or a list of cell identities. Each of the cell identities may be a physical cell ID, global cell ID or any other type of identity that identify a cell.

FIG. 24A illustrates an example format of the optional information elements in a case that a list of cell identities is used for the coverage area attribute. The format, shown as "NSSAI Coverage Area", may be shared by the Allowed NSSAI Coverage Area IE and the Configured NSSAI Coverage Area IE. Herein, each S-NSSAI value in the NSSAI IE is associated, in the order of the S-NSSAI fields, with one entry of the NSSAI Coverage Area IE, wherein each entry comprises one or more cell identities. If a particular S-NSSAI has no specific coverage area, the length of the corresponding Association x field in the NSSAI Coverage Area IE may be set to zero.

FIG. 24B illustrates another example format of the network slice coverage area configuration combined in the aforementioned network slice band association information (NSBAI), wherein each of the S-NSSAIs in the NSSAI IE (e.g., Allowed NSSAI IE or Configured NSSAI IE) may be associated with one of the Association x (x: 1-n) fields in the NSBAI. The Association x fields may comprise one or more sub-associations, where each of the sub-associations may possess the same structure as the Association x field of FIG. 21B. The structure shown in FIG. 24B should be understood in such a way that each sub-association indicates an area/coverage for the corresponding S-NSSAI, and thus the union of such sub-associations corresponding to the same S-NSSAI may form the total coverage area of the S-NSSAI. Any other area (e.g., a cell, or a tracking area) not covered by the union may be considered as an unsupported area for the S-NSSAI. It is also worth noting that in this structure each sub-association can have designated band associations or no band association at all.

In another example implementation, instead of configuring a list of area identities as a coverage area attribute, each area may transmit/broadcast network slice identifiers, e.g., S-NSSAIs, that are supported/available in the area. For example, each cell of a radio access network (RAN) may broadcast system information comprising supported network slice identifiers. One non-limiting implementation of this example is to repurpose the network slice band association information disclosed in Table 9A or Table 9B. That is, each of S-NSSAIs listed in the network slice band association information in system information broadcasted in a cell, regardless of whether or not a band(s) is associated, may be considered as an S-NSSAI supported in the cell. On the other hand, any S-NSSAI not listed in the network slice band association information may be considered as unsupported/unavailable in the cell. For this operation and mode, the wireless terminal of this embodiment may perform an additional step to check whether an S-NSSAI of interest is listed in the network slice band association information.

5.3 Coverage Area Identities Indicating Support or Nonsupport

The foregoing example embodiments and modes concerning network slice coverage area configuration have been described from the perspective of the network slice coverage area configuration identifies providing an indication of support in the specified area(s). In yet another example embodiment and mode, each area may transmit/broadcast network slice identifiers, e.g., S-NSSAIs, which are NOT supported/available in the area. For example, each cell of a radio access network (RAN) may broadcast system information comprising unsupported/unavailable network slice identifiers for each PLMN. Table 13 shows an example format of a SIB, e.g., SIBy, carrying the unsupported/unavailable network slice identifiers, wherein networkSliceForbiddenInfoForPLMNs is a list of one or more NetworkSliceForbiddenInfo IEs. Similar to FIG. 20A, each of the on one or more NetworkSliceForbiddenInfo IEs may be associated with one PLMN_Identity IE in SIB1, by the order of presences. Each NetworkSliceForbiddenInfo IE comprises a list of S-NSSAIs that are unsupported/unavailable in the cell for the associated PLMN. SIBy may be an independent SIB, or may be a part of another SIB (e.g., SIB1 or SIBx).

Accordingly, in this example embodiment and mode typified by Table 13, if an S-NSSAI of interest is in an Allowed NSSAI or in a Configured NSSAI of a serving PLMN (obtained in the aforementioned registration process) and the S-NSSAI is listed in the NetworkSliceForbiddenInfo for the serving PLMN, the S-NSSAI may be considered to be unsupported/unavailable in the cell that broadcasts the system information (e.g., SIBy). If the S-NSSAI is in the Allowed NSSAI or in the Configured NSSAI of the serving PLMN and the S-NSSAI is not listed in the NetworkSliceForbiddenInfo for the serving PLMN, the S-NSSAI may be considered to be supported/available in the cell.

TABLE 13

```
SIBy ::=                                          SEQUENCE {
...
  networkSliceForbiddenInfoForPLMNs               SEQUENCE (SIZE
(1..maxPLMN)) OF NetworkSliceForbiddenInfo
...
}
NetworkSliceForbiddenInfo::=                      SEQUENCE (SIZE (1..
maxNrofS-NSSAI) OF S-NSSAI
```

In any of the configurations in this embodiment, in a case that a network slice of interest for a PLMN turns out to be supported/available in a cell, the wireless terminal may be allowed to use services offered by the network slice. For example, the wireless terminal may be allowed to initiate a packet data unit (PDU) session establishment procedure to establish a PDU session for the network slice with the core network. On the other hand, in the case that a network slice of interest for a PLMN turns out to be unsupported/unavailable in a cell, the wireless terminal may not be allowed to use services offered by the network slice, and thus may refrain from initiating a PDU session establishment procedure in the cell.

5.3 Operations of Nodes Using Coverage Area Attribute

Figure 25A:
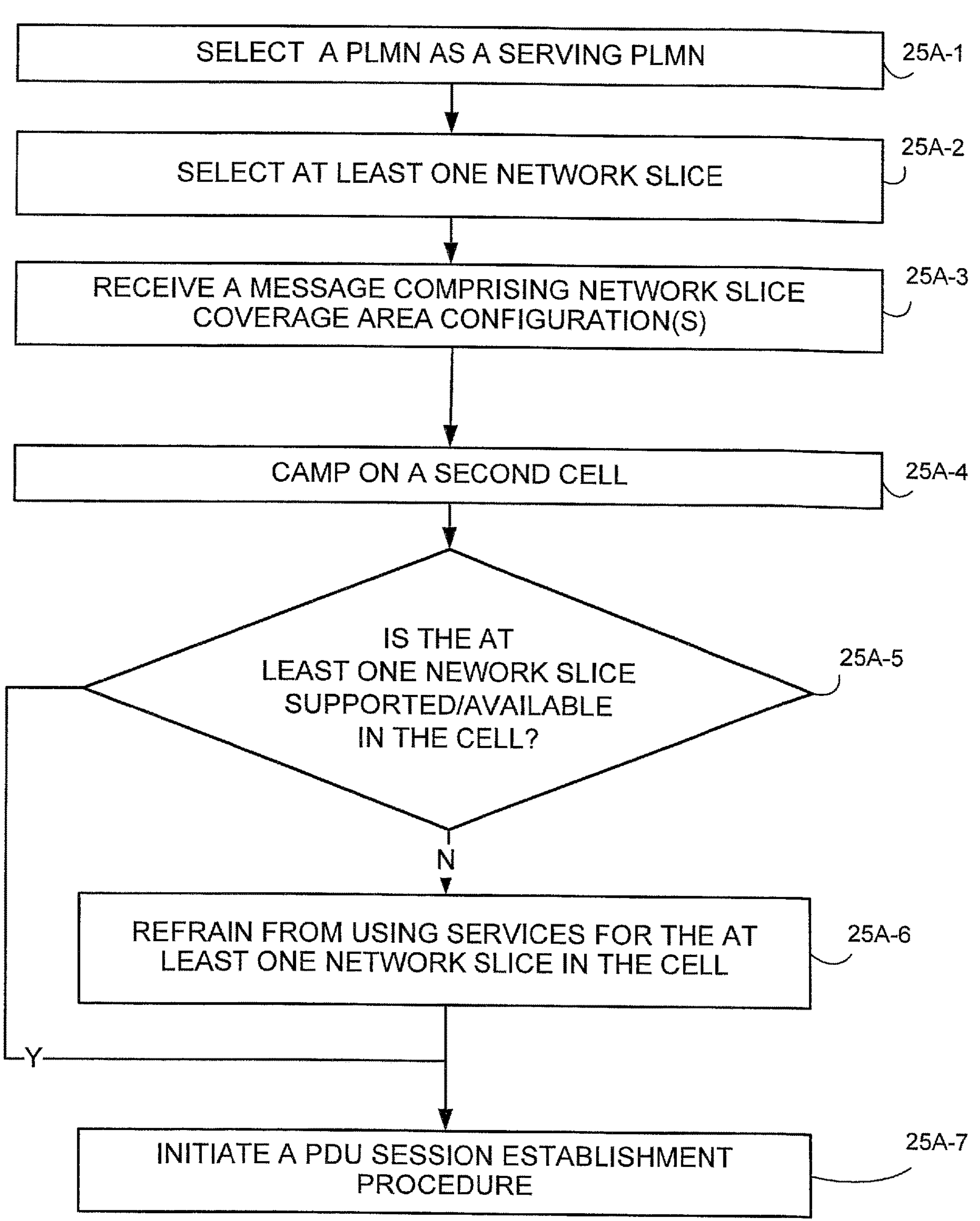
FIG. 25A is a flow chart showing example representative steps or acts performed by a wireless terminal of the example embodiment and mode of FIG. 23A.

FIG. 25A is a flow chart showing example representative steps or acts performed by a wireless terminal, wireless terminal 30(23) of the example embodiment and mode of generic FIG. 23A, and thus of the example embodiments and modes of FIG. 23B-FIG. 23D. Act 25A-1 comprises selecting a PLMN as a serving PLMN. Act 25A-2 comprises choosing, based on the serving PLMN, at least one network slice that the wireless terminal desires to use. Act 25A-3 comprises receiving a message comprising one or more network slice coverage area configurations. The message may be a system information message (e.g. SIB1/SIBx), a NAS message (e.g. Registration Accept message) or a dedicated RRC message. Each of the network slice coverage area configurations may indicate a coverage area of a corresponding network slice. In one example implementation, the each of the network slice coverage area configurations may comprise a list of area identities, such as a list of tracking area codes and a list of cell identities, in which the corresponding network slice is supported/available. In another example implementation, the each of the network slice coverage area configurations may comprise a network slice identifier supported/available in a cell that transmit/broadcast the message. In yet another example implementation, the each of the network slice coverage area configurations may comprise a network slice identifier unsupported/unavailable in a cell that transmit/broadcast the message. Act 25A-4 comprises camping on a cell. This cell may or may not be the same cell from which the wireless terminal received the message in Act 25A-3. Act 25A-5 comprises determining, based on the one or more network slice coverage area configurations, whether or not the at least one network slice is supported/available in the cell. If the determination is affirmative, the wireless terminal may be allowed to use services of the at least one network slice, and as shown in Act 25A-6, may initiate a PDU session establishment procedure to establish, with a core network, a PDU session for the at least one network slice. If the determination is negative, as shown in Act 25A-7, the wireless terminal may refrain from using services for the at least one network slice in the cell. For example, the wireless terminal may not initiate a PDU session establish procedure while camping in the cell.

Figure 25B:
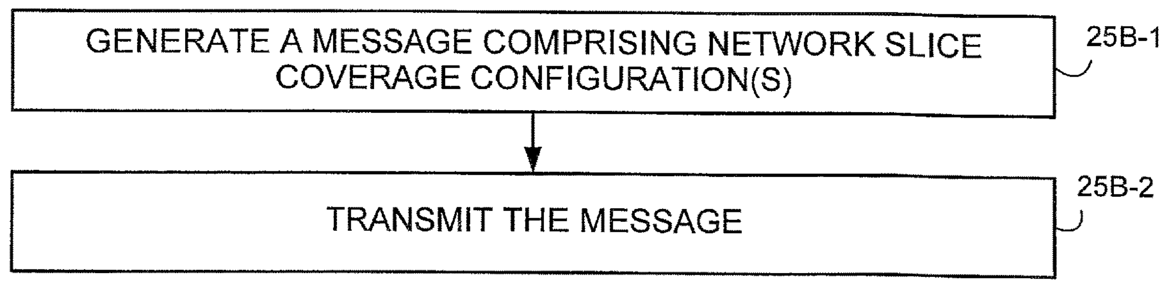
FIG. 25B is a flow chart showing example representative steps or acts performed by an access node of the example embodiment and mode of FIG. 23A.

FIG. 25B is a flow chart showing example representative steps or acts performed by an access node, e.g. gNB, of the example embodiment and mode of FIG. 23A, and thus of the example embodiments and modes of FIG. 23B-FIG. 23D. Act 25B-1 comprises generating a message comprising one or more network slice coverage area configurations. The message may be a system information message (e.g. SIB1/SIBx) or a dedicated RRC message. Each of the network slice coverage area configurations may indicate a coverage area of a corresponding network slice. In one configuration, the each of the network slice coverage area configurations may comprise a list of area identities, such as a list of tracking area codes and a list of cell identities, in which the corresponding network slice is supported/available. In another configuration, the each of the network slice coverage area configurations may comprise a network slice identifier supported/available in a cell that transmit/broadcast the message. In yet another example implementation, the each of the network slice coverage area configurations may comprise a network slice identifier unsupported/unavailable in a cell that transmit/broadcast the message. Act 25B-2 comprises transmitting the message.

Figure 25C:
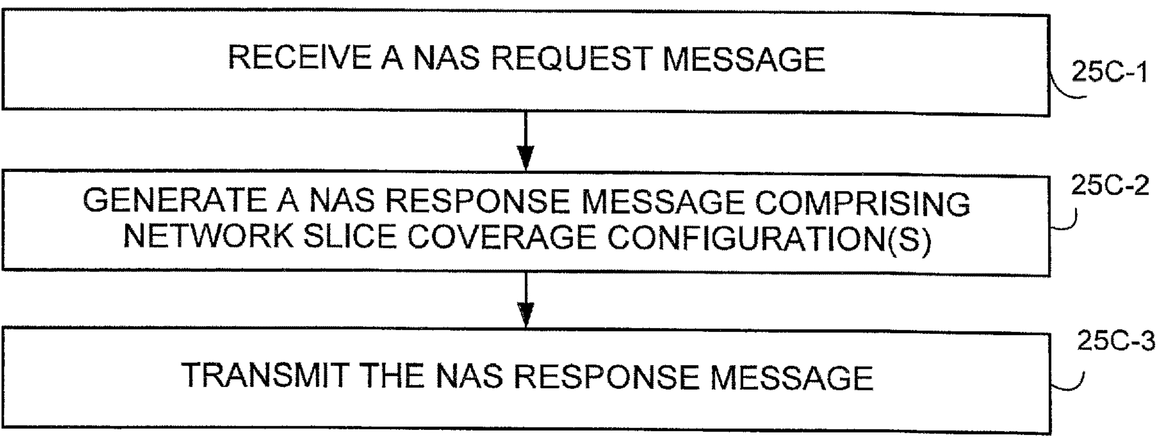
FIG. 25C is a flow chart showing example representative steps or acts performed by a management entity of the example embodiment and mode of FIG. 23A.

FIG. 25C is a flow chart showing example representative steps or acts performed by a management entity 26(23) of a core network e.g., of an AMF, of the example embodiment and mode of FIG. 23A, and thus of the example embodiments and modes of FIG. 23B-FIG. 23D). Act 25C-1 comprises receiving a non-access stratum (NAS) request message (e.g., Registration Request message) from a wireless terminal. Act 25C-2 comprises generating a NAS response message (e.g., Registration Accept message) comprising one or more network slice coverage area configurations. Each of the network slice coverage area configurations may indicate a coverage area of a corresponding network slice. Preferably, the each of the network slice coverage area configurations may comprise a list of area identities, such as a list of tracking area codes and a list of cell identities, in which the corresponding network slice is supported/available. Act 8C-3 comprises transmitting the NAS response message.

6.0 Further Considerations

Thus in one of its example aspects the technology disclosed herein involves methods for supporting network slicing in a radio access network (RAN), including but not limited to the following: The UE performs a cell selection/reselection procedure based on network slice band association information.

The network slice band association information comprises a list of network slice identifiers, where each of some of the network slice identifiers is associated with a corresponding radio band(s).

The network slice band association is pre-configured, or configured by RRC signaling and/or NAS signaling.

The UE receives, from a cell, network slice cell barring information that comprises a list of network slice identifiers (S-NSSAIs) for which the cell is barred.

The UE performs a registration procedure to a core network in a case that the UE does not know an S-NSSAI valid in a serving PLMN.

The network slice band association is associated with one or more area scope indications. Each of the one or more area scope indications indicates an area where an association of a radio band(s) with a network slice is effective/valid.

The network configures network slice coverage area configurations. Each of the network slice coverage area configuration indicates an area where a network slice is supported/available.

It should be understood that the various foregoing example embodiments and modes may be utilized in conjunction with one or more example embodiments and modes described herein.

Figure 26:
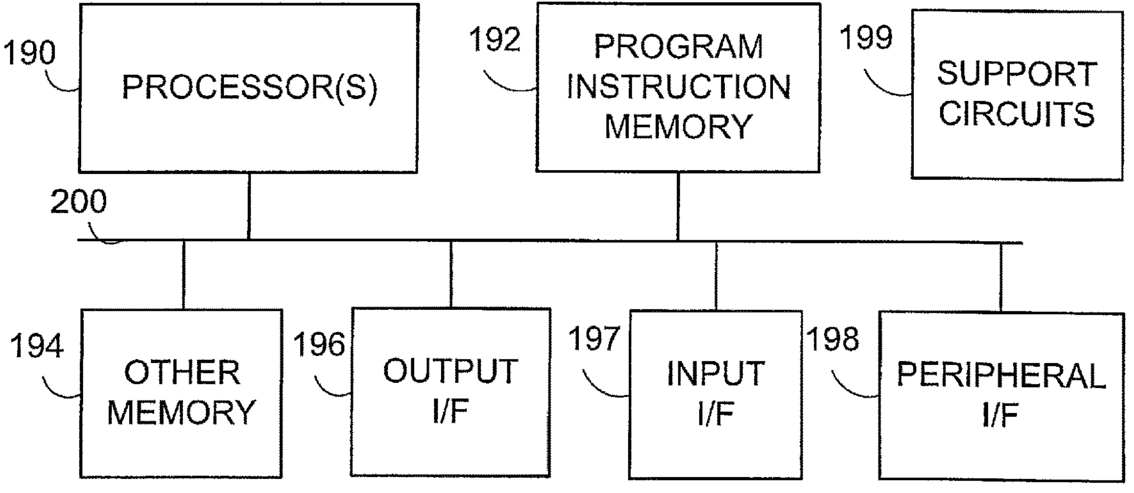
FIG. 26 is a diagrammatic view showing example elements comprising electronic machinery which may comprise a wireless terminal, a radio access node, and a core network node according to an example embodiment and mode.
Figure 27:
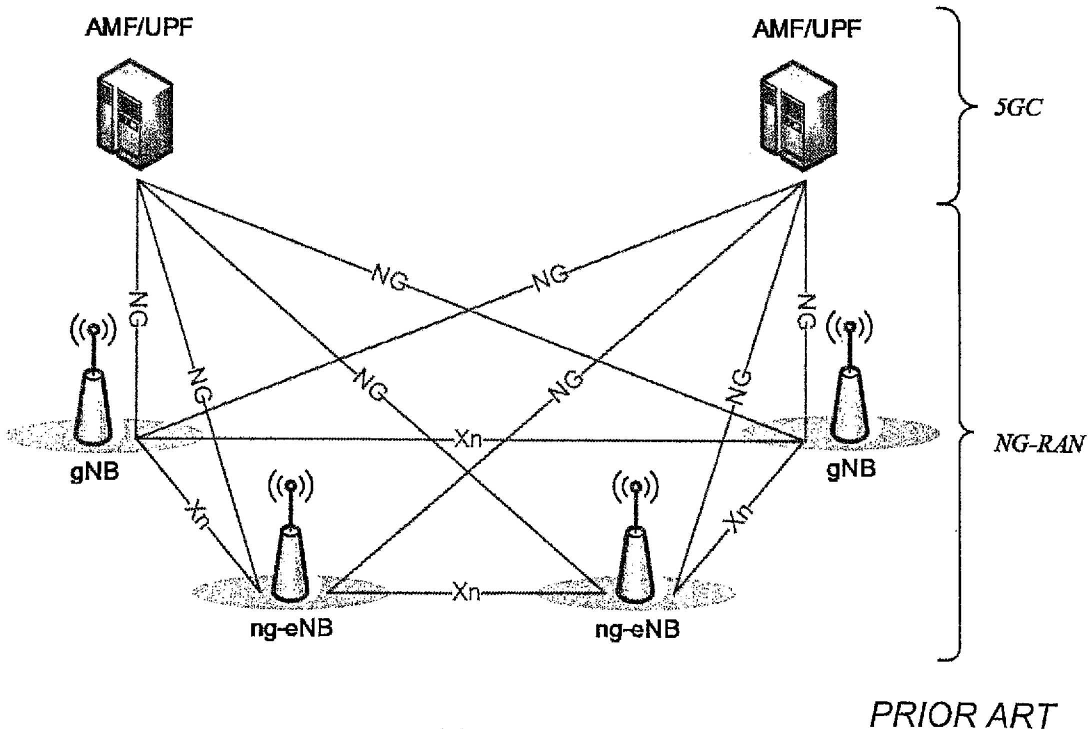
FIG. 27 is a diagrammatic view of overall architecture for a 5G New Radio system.

Certain units and functionalities of the systems 20 may be implemented by electronic machinery. For example, electronic machinery may refer to the processor circuitry described herein, such as terminal processor circuitry 50, node processor circuitry 70, and core network entity processor circuitry 80. Moreover, the term "processor circuitry" is not limited to mean one processor, but may include plural processors, with the plural processors operating at one or more sites. Moreover, as used herein the term "server" is not confined to one server unit, but may encompasses plural servers and/or other electronic equipment, and may be co-located at one site or distributed to different sites. With these understandings, FIG. 26 shows an example of electronic machinery, e.g., processor circuitry, as comprising one or more processors 190, program instruction memory 192; other memory 194 (e.g., RAM, cache, etc.); input/output interfaces 196 and 197, peripheral interfaces 198; support circuits 199; and busses 200 for communication between the aforementioned units. The processor(s) 390 may comprise the processor circuitries described herein, for example, terminal processor circuitry 50, node processor circuitry 70, and core network entity processor circuitry 80.

A memory or register described herein may be depicted by memory 394, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 199 are coupled to the processors 190 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as “computer”, “processor” or “controller”, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term “processor” or “controller” may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 30 and Integrated Access and Backhaul (IAB) nodes employed in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves resource selection and resource utilization in a communications system.

The technology disclosed herein encompasses one or more of the following non-limiting, non-exclusive example embodiments and modes:

Example Embodiment 1: A wireless terminal communicating with a management entity of a core network through an access node of a radio access network (RAN), the core network supporting one or more network slices, each of the network slices providing a designated service within a public land mobile network (PLMN), the wireless terminal comprising:

receiver circuitry configured to receive, from a first cell of the RAN, a message comprising network slice band association information, the network slice band association information further comprising one or more network slice identifiers, each of the one or more network slice identifiers identifying a network slice, each of the one or more network slice identifiers being associated with a radio band(s) and an area scope indication, the radio band(s) indicating a frequency domain interval(s) on which a network slice identified by the each of the one or more network slice identifiers is supported, the area scope indication indicating an area in which the network slices is supported on the radio band(s);

processor circuitry configured to:

select from the network slice band association information at least one network slice identifier of a serving PLMN;

store the network slice band association information;

upon the wireless terminal camping on a second cell of the RAN, initiate a reacquisition procedure to reacquire, from the second cell, the network slice band association information based on an area scope indication corresponding to the selected at least one network slice identifier, comprised in the stored network slice band association information.

Example Embodiment 2: The wireless terminal of Example Embodiment 1, the reacquisition procedure is initiated in a case that the second cell is not within an area indicated by the area scope indication corresponding to the selected at least one network slice identifier.

Example Embodiment 3: The wireless terminal of Example Embodiment 1, wherein the stored network slice band association information is used in the second cell to perform a cell (re)selection procedure, in a case that the second cell is within the area indicated by the area scope indication corresponding to the selected at least one network slice identifier.

Example Embodiment 4: The wireless terminal of Example Embodiment 3, wherein the cell (re)selection procedure comprises selecting a third cell operated in one of the radio band(s) in the stored network slice band association information, the radio band(s) corresponding to the selected at least one network slice identifier.

Example Embodiment 5: The wireless terminal of Example Embodiment 1, wherein the message is a system information message.

Example Embodiment 6: The wireless terminal of Example Embodiment 1, wherein the message is a non-access stratum (NAS) message.

Example Embodiment 7: The wireless terminal of Example Embodiment 1, wherein the message is a dedicated Radio Resource Control (RRC) message.

Example Embodiment 8: The wireless terminal of Example Embodiment 1, wherein the area indicated by the area scope indication is the serving PLMN.

Example Embodiment 9: The wireless terminal of Example Embodiment 1, wherein the area indicated by the area scope indication is a registration area.

Example Embodiment 10: The wireless terminal of Example Embodiment 1, wherein the area indicated by the area scope indication is a list of tracking area codes.

Example Embodiment 11: The wireless terminal of Example Embodiment 1, wherein the area indicated by the area scope indication is a list of cell identifiers.

Example Embodiment 12: An access node of a radio access network (RAN), the access node comprising:

- processor circuitry configured to generate a message comprising network slice band association information, and;
- transmitter circuitry configured to transmit, to the wireless terminal, the message in a cell;
- wherein the network slice band association information comprises one or more network slice identifiers, each of the one or more network slice identifiers identifying a network slice, each of the one or more network slice identifiers being associated with a radio band(s) and an area scope indication, the radio band(s) indicating a frequency domain interval(s) on which a network slice identified by the each of the one or more network slice identifiers is supported, the area scope indication indicating an area in which the network slices is supported on the radio band(s).

Example Embodiment 13: The access node of Example Embodiment 12, wherein the reacquisition procedure is initiated by the wireless terminal in a case that the cell is not within the area indicated by the area scope indication corresponding to at least one network slice identifier selected by the wireless terminal.

Example Embodiment 14: The access node of Example Embodiment 12, wherein the stored network slice band association information is used by the wireless terminal in the second cell to perform a cell (re)selection procedure, in a case that the cell is within the area indicated by the area scope indication corresponding to at least one network slice identifier selected by the wireless terminal.

Example Embodiment 15: The access node of Example Embodiment 14, wherein the cell (re)selection procedure comprises selecting a cell operated in one of the radio band(s) in the network slice band association information, the radio band(s) corresponding to at least one network slice identifier selected by the wireless terminal.

Example Embodiment 16: The access node of Example Embodiment 12, wherein the message is a system information message comprising at least one system information block (SIB).

Example Embodiment 17: The access node of Example Embodiment 12, wherein the message is a dedicated RRC message.

Example Embodiment 18: The access node of Example Embodiment 12, wherein the area indicated by the area scope indication is the serving PLMN, wherein the area indicated by the area scope indication is a registration area.

Example Embodiment 19: The access node of Example Embodiment 12, wherein the area indicated by the area scope indication is a registration area.

Example Embodiment 20: The access node of Example Embodiment 12, wherein the area indicated by the area scope indication is a list of tracking area codes.

Example Embodiment 21: The access node of Example Embodiment 12, wherein the area indicated by the area scope indication is a list of cell identifiers.

Example Embodiment 22: A management entity of a core network, the management entity communicating with a wireless terminal via a cell of a radio access network (RAN), the core network supporting one or more network slices, each of the network slices providing a designated service within a public land mobile network (PLMN), the management entity comprising:

- receiver circuitry configured to receive, from the wireless terminal, a non-access stratum (NAS) request message;
- processor circuitry configured to generate a NAS response message comprising network slice band association information;
- transmitter circuitry configured to transmit, to the wireless terminal, the NAS response message;
- wherein the network slice band association information comprises one or more network slice identifiers, each of the one or more network slice identifiers identifying a network slice, each of the one or more network slice identifiers being associated with a radio band(s) and an area scope indication, the radio band(s) indicating a frequency domain interval(s) on which a network slice identified by the each of the one or more network slice identifiers is supported, the area scope indication indicating an area in which the network slices is supported on the radio band(s).

Example Embodiment 23: The management entity of Example Embodiment 22, wherein the reacquisition procedure is initiated by the wireless terminal in a case that the cell is not within the area indicated by the area scope indication corresponding to at least one network slice identifier selected by the wireless terminal.

Example Embodiment 24: The management entity of Example Embodiment 22, wherein the stored network slice band association information is used by the wireless terminal in the second cell to perform a cell (re)selection procedure, in a case that the cell is within the area indicated by the area scope indication corresponding to at least one network slice identifier selected by the wireless terminal.

Example Embodiment 25: The management entity of Example Embodiment 24, wherein the cell (re)selection procedure comprises selecting a cell operated in one of the radio band(s) in the network slice band association information, the radio band(s) corresponding to at least one network slice identifier selected by the wireless terminal.

Example Embodiment 26: The management entity of Example Embodiment 22, wherein the area indicated by the area scope indication is the serving PLMN.

Example Embodiment 27: The management entity of Example Embodiment 22, wherein the area indicated by the area scope indication is a registration area.

Example Embodiment 28: The management entity of Example Embodiment 22, wherein the area indicated by the area scope indication is a list of tracking area codes.

Example Embodiment 29: The management entity of Example Embodiment 22, wherein the area indicated by the area scope indication is a list of cell identifiers.

Example Embodiment 30: A method for a wireless terminal communicating with a management entity of a core network through a radio access network (RAN), the core network supporting one or more network slices, each of the network slices providing a designated service within a public land mobile network (PLMN), the method comprising:

- receiving from a first cell of the RAN, a message comprising network slice band association information, the network slice band association information further comprising one or more network slice identifiers, each of the one or more network slice identifiers identifying a network slice, each of the one or more network slice identifiers being associated with a radio band(s) and an area scope indication, the radio band(s) indicating a frequency domain interval(s) on which a network slice identified by the each of the one or more network slice identifiers is supported, the area scope indication indicating an area in which the network slices is supported on the radio band(s);
- selecting at least one network slice identifier of a serving PLM from the network slice band association information;
- storing the network slice band association information;
- camping on a second cell of the RAN;
- initiating a reacquisition procedure to reacquire, from the second cell, the network slice band association information based on an area scope indication corresponding to the selected at least one network slice identifier, comprised in the stored network slice band association information.

Example Embodiment 31: The method of Example Embodiment 30, wherein the reacquisition procedure is initiated in a case that the second cell is not within the area indicated by the area scope indication corresponding to the selected at least one network slice identifier.

Example Embodiment 32: The method of Example Embodiment 30, wherein the stored network slice band association information is used in the second cell to perform a cell (re)selection procedure, in a case that the second cell is within the area indicated by the area scope indication corresponding to the selected at least one network slice identifier.

Example Embodiment 33: The method of Example Embodiment 32, wherein the cell (re)selection procedure comprises selecting a third cell operated in one of the radio band(s) in the stored network slice band association information, the radio band(s) corresponding to the selected at least one network slice identifier.

Example Embodiment 34: The method of Example Embodiment 30, wherein the message is a system information message.

Example Embodiment 35: The method of Example Embodiment 30, wherein the message is a non-access stratum (NAS) message.

Example Embodiment 36: The method of Example Embodiment 30, wherein the message is a dedicated Radio Resource Control (RRC) message.

Example Embodiment 37: The method of Example Embodiment 30, wherein the area indicated by the area scope indication is the serving PLMN.

Example Embodiment 38: The method of Example Embodiment 30, wherein the area indicated by the area scope indication is a registration area.

Example Embodiment 39: The method of Example Embodiment 30, wherein the area indicated by the area scope indication is a list of tracking area codes.

Example Embodiment 40: The method of Example Embodiment 30, wherein the area indicated by the area scope indication is a list of cell identifiers.

Example Embodiment 41: A method for an access node of a radio access network (RAN), the method comprising:

- generating a message comprising network slice band association information;
- transmitting, to a wireless terminal, the message in a cell;
- wherein the network slice band association information comprises one or more network slice identifiers, each of the one or more network slice identifiers identifying a network slice, each of the one or more network slice identifiers being associated with a radio band(s) and an area scope indication, the radio band(s) indicating a frequency domain interval(s) on which a network slice identified by the each of the one or more network slice identifiers is supported, the area scope indication indicating an area in which the network slices is supported on the radio band(s).

Example Embodiment 42: The method of Example Embodiment 41, wherein the reacquisition procedure is initiated by the wireless terminal in a case that the cell is not within the area indicated by the area scope indication corresponding to at least one network slice identifier selected by the wireless terminal.

Example Embodiment 43: The method of Example Embodiment 41, wherein the stored network slice band association information is used by the wireless terminal in the second cell to perform a cell (re)selection procedure, in a case that the cell is within the area indicated by the area scope indication corresponding to at least one network slice identifier selected by the wireless terminal.

Example Embodiment 44: The method of Example Embodiment 43, wherein the cell (re)selection procedure comprises selecting a cell operated in one of the radio band(s) in the network slice band association information, the radio band(s) corresponding to at least one network slice identifier selected by the wireless terminal.

Example Embodiment 45: The method of Example Embodiment 41, wherein the message is a system information message comprising at least one system information block (SIB).

Example Embodiment 46: The method of Example Embodiment 41, wherein the message is a dedicated RRC message.

Example Embodiment 47: The method of Example Embodiment 41, wherein the area indicated by the area scope indication is the serving PLMN.

Example Embodiment 48: The method of Example Embodiment 41, wherein the area indicated by the area scope indication is a registration area.

Example Embodiment 49: The method of Example Embodiment 41, wherein the area indicated by the area scope indication is a list of tracking area codes.

Example Embodiment 50: The method of Example Embodiment 41, wherein the area indicated by the area scope indication is a list of cell identifiers.

Example Embodiment 51: A method for a management entity of a core network, the management entity communicating with a wireless terminal via a cell of a radio access network (RAN), the core network supporting one or more network slices, each of the network slices providing a designated service within a public land mobile network (PLMN), the method comprising:

- receiving, from the wireless terminal, a non-access stratum (NAS) request message;
- generating a NAS response message comprising network slice band association information;
- transmitting, to the wireless terminal, a registration accept message;
- wherein the network slice band association information comprises one or more network slice identifiers, each of the one or more network slice identifiers identifying a network slice, each of the one or more network slice identifiers being associated with a radio band(s) and an area scope indication, the radio band(s) indicating a frequency domain interval(s) on which a network slice identified by the each of the one or more network slice identifiers is supported, the area scope indication indicating an area in which the network slices is supported on the radio band(s).

Example Embodiment 52: The method of Example Embodiment 51, wherein the reacquisition procedure is initiated by the wireless terminal in a case that the cell is not within the area indicated by the area scope indication corresponding to at least one network slice identifier selected by the wireless terminal.

Example Embodiment 53: The method of Example Embodiment 51, wherein the stored network slice band association information is used by the wireless terminal in the second cell to perform a cell (re)selection procedure, in a case that the cell is within the area indicated by the area scope indication corresponding to at least one network slice identifier selected by the wireless terminal.

Example Embodiment 54: The method of Example Embodiment 51, wherein the cell (re)selection procedure comprises selecting a cell operated in one of the radio band(s) in the network slice band association information, the radio band(s) corresponding to at least one network slice identifier selected by the wireless terminal.

Example Embodiment 55: The method of Example Embodiment 51, wherein the area indicated by the area scope indication is the serving PLMN.

Example Embodiment 56: The method of Example Embodiment 51, wherein the area indicated by the area scope indication is a registration area.

Example Embodiment 57: The method of Example Embodiment 51, wherein the area indicated by the area scope indication is a list of tracking area codes.

Example Embodiment 58: The method of Example Embodiment 51, wherein the area indicated by the area scope indication is a list of cell identifiers.

Example Embodiment 59: A wireless terminal communicating with a management entity of a core network through an access node of a radio access network (RAN), the core network supporting one or more network slices, each of the network slices providing a designated service within a public land mobile network (PLMN), the wireless terminal comprising:

- receiver circuitry configured to receive a message comprising one or more network slice coverage area configurations, each of the one or more network slice coverage configurations indicating a coverage area of a corresponding network slice; processor circuitry configured to:
- select at least one network slice of a serving PLMN;
- camp on a serving cell of the RAN, and;
- determine, based the one or more network slice coverage area configurations, whether or not the at least one network slice is available in the serving cell.

Example Embodiment 60: The wireless terminal of Example Embodiment 59, wherein the at least one network slice is available in the serving cell in a case that a network slice coverage area configuration corresponding to the at least one network slice indicates that the serving cell is within a coverage area of the at least one network slice.

Example Embodiment 61: The wireless terminal of Example Embodiment 59, wherein the at least one network slice is unavailable in the cell in a case that a network slice coverage area configuration corresponding to the at least one network slice indicates that the serving cell is not within a coverage area of the at least one network slice.

Example Embodiment 62: The wireless terminal of Example Embodiment 59, wherein in a case that the at least one network slice is available in the serving cell, a protocol data unit (PDU) session establishment request procedure is initiated to establish a PDU session for the at least one network slice.

Example Embodiment 63: The wireless terminal of Example Embodiment 59, wherein in a case that the at least one network slice is unavailable in the serving cell, the wireless terminal refrains from initiating a protocol data unit (PDU) session establishment request procedure for the at least one network slice.

Example Embodiment 64: The wireless terminal of Example Embodiment 59, wherein each of the one or more coverage area configurations further comprises a list of area identities, each of the area identities specifying an area in which the corresponding network slice is available.

Example Embodiment 65: The wireless terminal of Example Embodiment 64, wherein each of the area identities comprises a cell identity.

Example Embodiment 66: The wireless terminal of Example Embodiment 64, wherein each of the area identities comprises a tracking area code.

Example Embodiment 67: The wireless terminal of Example Embodiment 59, wherein each of the one or more coverage area configurations comprises an identity of a network slice available in a cell that transmits the message.

Example Embodiment 68: The wireless terminal of Example Embodiment 59, wherein each of the one or more coverage area configurations comprises an identity of a network slice not available in a cell that transmits the message.

Example Embodiment 69: The wireless terminal of Example Embodiment 59, wherein the message is a system information message.

Example Embodiment 70: The wireless terminal of Example Embodiment 59, wherein the message is a non-access stratum (NAS) message.

Example Embodiment 71: The wireless terminal of Example Embodiment 59, wherein the message is a dedicated radio resource control (RRC) message.

Example Embodiment 72: An access node of a radio access network (RAN), the access node comprising:

processor circuitry to generate a message comprising one or more network slice coverage area configurations, each of the one or more network slice coverage configurations indicating a coverage area of a corresponding network slice, and;

transmitter circuitry configured to transmit, to a wireless terminal, the message in a cell served by the access node;

wherein the one or more network slice coverage area configurations are used by the wireless terminal to determine whether or not a network slice is available in a serving cell that the wireless terminal camps on.

Example Embodiment 73: The access node of Example Embodiment 72, wherein the network slice is available in the serving cell in a case that a network slice coverage area configuration corresponding to the network slice indicates that the serving cell is within a coverage area of the network slice.

Example Embodiment 74: The access node of Example Embodiment 72, wherein the network slice is unavailable in the serving cell in a case that a network slice coverage area configuration corresponding to the network slice indicates that the serving cell is not within a coverage area of the network slice.

Example Embodiment 75: The access node of Example Embodiment 72, wherein in a case that the network slice is available in the serving cell, a protocol data unit (PDU) session establishment request procedure is initiated by the wireless terminal to establish a PDU session for the network slice.

Example Embodiment 76: The access node of Example Embodiment 72, wherein in a case that the network slice is unavailable in the serving cell, a protocol data unit (PDU) session establishment request procedure for the network slice is not initiated by the wireless terminal.

Example Embodiment 77: The access node of Example Embodiment 72, wherein each of the one or more coverage area configurations further comprises a list of area identities, each of the area identities specifying an area in which the corresponding network slice is available.

Example Embodiment 78: The access node of Example Embodiment 77, wherein each of the area identities comprises a cell identity.

Example Embodiment 79: The access node of Example Embodiment 77, wherein each of the area identities comprises a tracking area code.

Example Embodiment 80: The access node of Example Embodiment 72, wherein each of the one or more coverage area configurations comprises an identity of a network slice available in the cell served by the access node.

Example Embodiment 81: The access node of Example Embodiment 72, wherein each of the one or more coverage area configurations comprises an identity of a network slice not available in the cell served by the access node.

Example Embodiment 82: The access node of Example Embodiment 72, wherein the message is a system information message.

Example Embodiment 83: The access node of Example Embodiment 72, wherein the message is a dedicated radio resource control (RRC) message.

Example Embodiment 84: A management entity of a core network, the management entity communicating with a wireless terminal via a cell of a radio access network (RAN), the core network supporting one or more network slices, each of the network slices providing a designated service within a public land mobile network (PLMN), the management entity comprising:

receiver circuitry configured to receive, from the wireless terminal, a non-access stratum (NAS) request message;

processor circuitry configured to generate a NAS response message comprising one or more network slice coverage area configurations;

transmitter circuitry configured to transmit, to the wireless terminal, the NAS response message;

wherein the one or more network slice coverage area configurations are used by the wireless terminal to determine whether or not a network slice is available in a serving cell that the wireless terminal camps on.

Example Embodiment 85: The management entity of Example Embodiment 84, wherein the network slice is available in the serving cell in a case that a network slice coverage area configuration corresponding to the network slice indicates that the serving cell is within a coverage area of the network slice.

Example Embodiment 86: The management entity of Example Embodiment 84, wherein the network slice is unavailable in the serving cell in a case that a network slice coverage area configuration corresponding to the network slice indicates that the serving cell is not within a coverage area of the network slice.

Example Embodiment 87: The management entity of Example Embodiment 84, wherein in a case that the network slice is available in the serving cell, a protocol data unit (PDU) session establishment request procedure is initiated by the wireless terminal to establish a PDU session for the network slice.

Example Embodiment 88: The management entity of Example Embodiment 84, wherein in a case that the network slice is unavailable in the serving cell, a protocol data unit (PDU) session establishment request procedure for the network slice is not initiated by the wireless terminal.

Example Embodiment 89: The management entity of Example Embodiment 84, wherein each of the one or more coverage area configurations further comprises a list of area identities, each of the area identities specifying an area in which the corresponding network slice is available.

Example Embodiment 90: The management entity of Example Embodiment 89, wherein each of the area identities comprises a cell identity.

Example Embodiment 91: The management entity of Example Embodiment 89, wherein each of the area identities comprises a tracking area code.

Example Embodiment 92: A method for a wireless terminal communicating with a management entity of a core network through a radio access network (RAN), the core network supporting one or more network slices, each of the network slices providing a designated service within a public land mobile network (PLMN), the method comprising:

selecting at least one network slice of a serving PLMN;

receiving a message comprising one or more network slice coverage area configurations, each of the one or more network slice coverage configurations indicating a coverage area of a corresponding network slice;

receiving a message comprising one or more network slice coverage area configurations, each of the one or more network slice coverage configurations indicating a coverage area of a corresponding network slice;

camping on a serving cell of the RAN, and;

determining, based the one or more network slice coverage area configurations, whether or not the at least one network slice is available in the serving cell.

Example Embodiment 93: The method of Example Embodiment 92, wherein the at least one network slice is available in the serving cell in a case that a network slice coverage area configuration corresponding to the at least one network slice indicates that the serving cell is within a coverage area of the at least one network slice.

Example Embodiment 94: The method of Example Embodiment 92, wherein the at least one network slice is unavailable in the cell in a case that a network slice coverage area configuration corresponding to the at least one network slice indicates that the serving cell is not within a coverage area of the at least one network slice.

Example Embodiment 95: The method of Example Embodiment 92, wherein in a case that the at least one network slice is available in the serving cell, a protocol data unit (PDU) session establishment request procedure is initiated to establish a PDU session for the at least one network slice.

Example Embodiment 96: The method of Example Embodiment 92, wherein in a case that the at least one network slice is unavailable in the serving cell, the wireless terminal refrains from initiating a protocol data unit (PDU) session establishment request procedure for the at least one network slice.

Example Embodiment 97: The method of Example Embodiment 92, wherein each of the one or more coverage area configurations further comprises a list of area identities, each of the area identities specifying an area in which the corresponding network slice is available.

Example Embodiment 98: The method of Example Embodiment 97, wherein each of the area identities comprises a cell identity.

Example Embodiment 99: The method of Example Embodiment 97, wherein each of the area identities comprises a tracking area code.

Example Embodiment 100: The method of Example Embodiment 92, wherein each of the one or more coverage area configurations comprises an identity of a network slice available in a cell that transmits the message.

Example Embodiment 101: The method of Example Embodiment 92, wherein each of the one or more coverage area configurations comprises an identity of a network slice not available in a cell that transmits the message.

Example Embodiment 102: The method of Example Embodiment 92, wherein the message is a system information message.

Example Embodiment 103: The method of Example Embodiment 92, wherein the message is a non-access stratum (NAS) message.

Example Embodiment 104: The method of Example Embodiment 92, wherein the message is a dedicated radio resource control (RRC) message.

Example Embodiment 105: A method for an access node of a radio access network (RAN), the method comprising:

generating a message comprising one or more network slice coverage area configurations, each of the one or more network slice coverage configurations indicating a coverage area of a corresponding network slice, and;

transmitting, to a wireless terminal, the message in a cell served by the access node; wherein the one or more network slice coverage area configurations are used by the wireless terminal to determine whether or not a network slice is available in a serving cell that the wireless terminal camps on.

Example Embodiment 106: The method of Example Embodiment 105, wherein the network slice is available in the serving cell in a case that a network slice coverage area configuration corresponding to the network slice indicates that the serving cell is within a coverage area of the network slice.

Example Embodiment 107: The method of Example Embodiment 105, wherein the network slice is unavailable in the serving cell in a case that a network slice coverage area configuration corresponding to the network slice indicates that the serving cell is not within a coverage area of the network slice.

Example Embodiment 108: The method of Example Embodiment 105, wherein in a case that the network slice is available in the serving cell, a protocol data unit (PDU) session establishment request procedure is initiated by the wireless terminal to establish a PDU session for the network slice.

Example Embodiment 109: The method of Example Embodiment 105, wherein in a case that the network slice is unavailable in the serving cell, a protocol data unit (PDU) session establishment request procedure for the network slice is not initiated by the wireless terminal.

Example Embodiment 110: The method of Example Embodiment 105, wherein each of the one or more coverage area configurations further comprises a list of area identities, each of the area identities specifying an area in which the corresponding network slice is available.

Example Embodiment 111: The method of Example Embodiment 110, wherein each of the area identities comprises a cell identity.

Example Embodiment 112: The method of Example Embodiment 110, wherein each of the area identities comprises a tracking area code.

Example Embodiment 113: The method of Example Embodiment 105, wherein each of the one or more coverage area configurations comprises an identity of a network slice available in the cell served by the access node.

Example Embodiment 114: The method of Example Embodiment 105, wherein each of the one or more coverage area configurations comprises an identity of a network slice not available in the cell served by the access node.

Example Embodiment 115: The method of Example Embodiment 105, wherein the message is a system information message.

Example Embodiment 116: The method of Example Embodiment 105, wherein the message is a dedicated radio resource control (RRC) message.

Example Embodiment 117: A method for a management entity of a core network, the management entity communicating with a wireless terminal via a cell of a radio access network (RAN), the core network supporting one or more network slices, each of the network slices providing a designated service within a public land mobile network (PLMN), the method comprising:

receiving, from the wireless terminal, a non-access stratum (NAS) request message;

generating a NAS response message comprising one or more network slice coverage area configurations;

transmitting, to the wireless terminal, the NAS response message;

wherein the network slice band association information comprises one or more network slice identifiers, the one or more network slice coverage area configurations are used by the wireless terminal to determine whether or not a network slice is available in a serving cell that the wireless terminal camps on.

Example Embodiment 118: The method of Example Embodiment 117, wherein the network slice is available in the serving cell in a case that a network slice coverage area configuration corresponding to the network slice indicates that the serving cell is within a coverage area of the network slice.

Example Embodiment 119: The method of Example Embodiment 117, wherein the network slice is unavailable in the serving cell in a case that a network slice coverage area configuration corresponding to the network slice indicates that the serving cell is not within a coverage area of the network slice.

Example Embodiment 120: The method of Example Embodiment 117, wherein in a case that the network slice is available in the serving cell, a protocol data unit (PDU) session establishment request procedure is initiated by the wireless terminal to establish a PDU session for the network slice.

Example Embodiment 121: The method of Example Embodiment 117, wherein in a case that the network slice is unavailable in the serving cell, a protocol data unit (PDU) session establishment request procedure for the network slice is not initiated by the wireless terminal.

Example Embodiment 122: The method of Example Embodiment 117, wherein each of the one or more coverage area configurations further comprises a list of area identities, each of the area identities specifying an area in which the corresponding network slice is available.

Example Embodiment 123: The method of Example Embodiment 122, wherein each of the area identities comprises a cell identity.

Example Embodiment 124: The method of Example Embodiment 122, wherein each of the area identities comprises a tracking area code.

Example Embodiment 125: A wireless terminal of a radio access network (RAN), the RAN supporting one or more network slices, each of the network slices providing a designated service within a public land mobile network (PLMN), the wireless terminal comprising:

receiver circuitry configured to receive, from a first cell, network slice band association information comprising one or more network slice identities, each of the one or more network slice identities identifying a network slice, each of the one or more network slice identities being associated with a radio band(s) and an area scope indication, the radio band(s) indicating a frequency domain interval(s) on which a network slice identified by the each of the one or more network slice identities is supported, the area scope indication indicating an area in which the network slices identified by the each of the one or more network slice identities is supported on the radio band(s);

processor circuitry configured to:

select at least one network slice identity of a serving PLMN;

determine, upon the wireless terminal camping on a second cell, based on an area scope indication associated with the at least one network slice identity, whether or not to reacquire the network slice band association information from the second cell, wherein;

the network slice band association information is used by the wireless terminal to perform a cell (re)selection procedure.

Example Embodiment 126: The wireless terminal of Example Embodiment 125, wherein the network slice band association information is reacquired from the second cell in a case that the second cell is not within an area indicated by the area scope indication associated with the at least one network slice identity.

Example Embodiment 127: The wireless terminal of Example Embodiment 125, wherein the network slice band association information is used in the second cell, in a case that the second cell is within the area indicated by the area scope indication associated with the at least one network slice identity.

Example Embodiment 128: The wireless terminal of Example Embodiment 125, wherein the area indicated by the area scope indication is a list of identities of tracking areas.

Example Embodiment 129: The wireless terminal of Example Embodiment 125, wherein the area indicated by the area scope indication is a list of cell identities.

Example Embodiment 130: An access node of a radio access network (RAN), the RAN supporting one or more network slices, each of the network slices providing a designated service within a public land mobile network (PLMN), the access node comprising:

processor circuitry configured to generate network slice band association information comprising one or more network slice identities, each of the one or more network slice identities identifying a network slice, each of the one or more network slice identities being associated with a radio band(s) and an area scope indication, the radio band(s) indicating a frequency domain interval(s) on which a network slice identified by the each of the one or more network slice identities is supported, the area scope indication indicating an area in which the each of the one or more network slice identities is supported on the radio band(s), and;

transmitter circuitry configured to transmit, to the wireless terminal, the network slice band association information via a first cell, wherein;

the network slice band association information is used by the wireless terminal to perform a cell (re)selection procedure, and;

the area scope indication is used by the wireless terminal to determine whether or not to reacquire the network slice band association information upon camping on a second cell.

Example Embodiment 131: The access node of Example Embodiment 130, wherein the network slice band association information is reacquired by the wireless terminal from the second cell, in a case that the second cell is not within the area indicated by the area scope indication associated with a network slice identity selected by the wireless terminal.

Example Embodiment 132: The access node of Example Embodiment 130, wherein the network slice band association information is used by the wireless terminal in the second cell, in a case that the second cell is within the area indicated by the area scope indication associated with a network slice identity selected by the wireless terminal.

Example Embodiment 133: The access node of Example Embodiment 130, wherein the area indicated by the area scope indication is a list of identities of tracking areas.

Example Embodiment 134: The access node of Example Embodiment 130, wherein the area indicated by the area scope indication is a list of cell identities.

Example Embodiment 135: A method for a wireless terminal of a radio access network (RAN), the RAN supporting one or more network slices, each of the network slices providing a designated service within a public land mobile network (PLMN), the method comprising:

receiving from a first cell of the RAN, network slice band association information comprising one or more network slice identities, each of the one or more network slice identities identifying a network slice, each of the one or more network slice identities being associated with a radio band(s) and an area scope indication, the radio band(s) indicating a frequency domain interval(s) on which a network slice identified by the each of the one or more network slice identities is supported, the area scope indication indicating an area in which the network slices is supported on the radio band(s);

selecting at least one network slice identity of a serving PLMN;

determining, upon camping on a second cell, based on an area scope indication associated with the at least one network slice identity, whether or not to reacquire the network slice band association information from the second cell, wherein; the network slice band association information is used for a cell (re)selection procedure.

Example Embodiment 136: The method of Example Embodiment 135, wherein the network slice band association information is reacquired from the second cell in a case that the second cell is not within the area indicated by the area scope indication associated with the at least one network slice identity.

Example Embodiment 137: The method of Example Embodiment 135, wherein the network slice band association information is used in the second cell, in a case that the second cell is within the area indicated by the area scope indication associated with the at least one network slice identity.

Example Embodiment 138: The method of Example Embodiment 135, wherein the area indicated by the area scope indication is a list of identities of tracking areas.

Example Embodiment 139: The method of Example Embodiment 135, wherein the area indicated by the area scope indication is a list of cell identities.

Example Embodiment 140: A method for an access node of a radio access network (RAN), the RAN supporting one or more network slices, each of the network slices providing a designated service within a public land mobile network (PLMN), the method comprising:

generating comprising network slice band association information comprising one or more network slice identities, each of the one or more network slice identities identifying a network slice, each of the one or more network slice identities being associated with a radio band(s) and an area scope indication, the radio band(s) indicating a frequency domain interval(s) on which a network slice identified by the each of the one or more network slice identities is supported, the area scope indication indicating an area in which the network slices is supported on the radio band(s), and;

transmitting, to a wireless terminal, the network slice band association information via a first cell, wherein;

the network slice band association information is used by the wireless terminal to perform a cell (re)selection procedure, and;

the area scope indication is used by the wireless terminal to determine whether or not to reacquire the network slice band association information upon camping on a second cell.

Example Embodiment 141: The method of Example Embodiment 140, wherein the network slice band association information is reacquired by the wireless terminal, in a case that the second cell is not within the area indicated by the area scope indication associated with a network slice identity selected by the wireless terminal.

Example Embodiment 142: The method of Example Embodiment 140, wherein the network slice band association information is used by the wireless terminal in the second cell, in a case that the cell is within the area indicated by the area scope indication associated with a network slice identity selected by the wireless terminal.

Example Embodiment 143: The method of Example Embodiment 140, wherein the area indicated by the area scope indication is a list of identities of tracking areas.

Example Embodiment 144: The method of Example Embodiment 140, wherein the area indicated by the area scope indication is a list of cell identities.

Example Embodiment 145: A wireless terminal of a radio access network (RAN), the RAN supporting one or more network slices, each of the network slices providing a designated service within a public land mobile network (PLMN), the wireless terminal comprising:

receiver circuitry configured to receive at least one message comprising one or more network slice identities, each of the one or more network slice identities being associated with a network slice coverage area configuration, the network slice coverage area configuration indicating a coverage area;

processor circuitry configured to:

select at least one network slice;

camp on a serving cell, and;

determine, based on a network slice coverage area configuration associating a network slice identity of the at least one network slice, whether or not the at least one network slice is available in the serving cell.

Example Embodiment 146: The wireless terminal of Example Embodiment 145, wherein the at least one network slice is available in the serving cell in a case that the serving cell is within the coverage area included in the network slice coverage area configuration, the network slice coverage area configuration associating the network slice identity of the at least one network slice.

Example Embodiment 147: The wireless terminal of Example Embodiment 145, wherein the at least one network slice is unavailable in the cell in a case that the serving cell is not within the coverage area included in the network slice coverage area configuration, the network slice coverage area configuration associating the network slice identity of the at least one network slice.

Example Embodiment 148: The wireless terminal of Example Embodiment 145, wherein the coverage area is indicated by a list of cell identities.

Example Embodiment 149: The wireless terminal of Example Embodiment 145, wherein the coverage area is indicated by a list of identities of tracking areas.

Example Embodiment 150: An access node of a radio access network (RAN), the RAN supporting one or more network slices, each of the network slices providing a designated service within a public land mobile network (PLMN), the access node comprising:

processor circuitry to generate at least one message comprising one or more network slice identities, each of the one or more network slice identities being associated with a network slice coverage area configuration, the network slice coverage configuration indicating a coverage area of a network slice identified by the each of the one or more network slice identities, and;

transmitter circuitry configured to transmit, to a wireless terminal, the at least one message in a cell served by the access node;

wherein a network slice coverage area configuration associating a network slice identity is used by the wireless terminal to determine whether or not a network slice, identified by the network slice identity, is available in a serving cell that the wireless terminal camps on.

Example Embodiment 151: The access node of Example Embodiment 150, wherein the network slice, identified by the network slice identity, is available in the serving cell in a case that the serving cell is within the coverage area included in the network slice coverage area configuration.

Example Embodiment 152: The access node of Example Embodiment 150, wherein the network slice is unavailable in the serving cell in a case that the serving cell is not within the coverage area included in the network slice coverage area configuration.

Example Embodiment 153: The access node of Example Embodiment 150, wherein the coverage area is indicated by a list of cell identities.

Example Embodiment 154: The access node of Example Embodiment 150, wherein the coverage area is indicated by a list of identities of tracking areas.

Example Embodiment 155: A method for a wireless terminal of a radio access network (RAN), the RAN supporting one or more network slices, each of the network slices providing a designated service within a public land mobile network (PLMN), the method comprising:

receiving at least one message comprising one or more network slice identities, each of the one or more network slice identities being associated with a network slice coverage area configuration, the network slice coverage area configuration indicating a coverage area;

selecting at least one network slice;

camping on a serving cell, and;

determining, based on a network slice coverage area configuration associating a network slice identity of the at least one network slice, whether or not the at least one network slice is available in the serving cell.

Example Embodiment 156: The method of Example Embodiment 155, wherein the at least one network slice is available in the serving cell in a case that the serving cell is within the coverage area included in the network slice coverage area configuration, the network slice coverage area configuration associating the network slice identity of the at least one network slice.

Example Embodiment 157: The method of Example Embodiment 155, wherein the at least one network slice is unavailable in the cell in a case that the serving cell is not within the coverage area included in the network slice coverage area configuration, the network slice coverage area configuration associating the network slice identity of the at least one network slice.

Example Embodiment 158: The method of Example Embodiment 155, wherein the coverage area is indicated by a list of cell identities.

Example Embodiment 159: The method of Example Embodiment 155, wherein the coverage area is indicated by a list of identities of tracking areas.

Example Embodiment 160: A method for an access node of a radio access network (RAN), the RAN supporting one or more network slices, each of the network slices providing a designated service within a public land mobile network (PLMN), the method comprising:

generating at least one message comprising one or more network slice identities, each of the one or more network slice identities being associated with a network slice coverage area configuration, the network slice coverage configuration indicating a coverage area of a network slice identified by the each of the one or more network slice identities, and;

transmitting, to a wireless terminal, the at least one message in a cell served by the access node;

wherein a network slice coverage area configuration associating a network slice identity is used by the wireless terminal to determine whether or not a network slice, identified by the network slice identity, is available in a serving cell that the wireless terminal camps on.

Example Embodiment 161: The method of Example Embodiment 160, wherein the network slice, identified by the network slice identity, is available in the serving cell in a case that the serving cell is within the coverage area included in the network slice coverage area configuration.

Example Embodiment 162: The method of Example Embodiment 160, wherein the network slice is unavailable in the serving cell in a case that the serving cell is not within the coverage area included in the network slice coverage area configuration.

Example Embodiment 163: The method of Example Embodiment 160, wherein the coverage area is indicated by a list of cell identities.

Example Embodiment 164: The method of Example Embodiment 160, wherein the coverage area is indicated by a list of identities of tracking areas.

One or more of the following documents may be pertinent to the technology disclosed herein (all of which are incorporated herein by reference in their entirety):

3GPP TS 38.300 v16.1.0
3GPP TS 38.331 v16.0.0
3GPP TS 23.501 v16.4.0
3GPP TS 24,501 v16.4.1
GSMA NG, 116 Generic Network Slice Template v2.0
3GPP RP-193254 Study on enhancement of RAN Slicing
3GPP S1-202209 Feasibility Study on Enhanced Access to and Support of Network Slice
3GPP S2-2001726 LS on GSMA NG.116 Attribute Area of service and impact on PLMN selection
3GPP S1-202026 LS on 5GC assisted cell selection for accessing network slice
3GPP S2-2001467 Key Issue on 5GC assisted cell selection to access network slice
3GPP S1-202264 LS on 5GC assisted cell selection for accessing network slice Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean “one and only one” unless explicitly so stated, but rather “one or more.” The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

In one example, a wireless terminal communicating with a management entity of a core network through an access node of a radio access network (RAN), the core network supporting one or more network slices, each of the network slices providing a designated service within a public land mobile network (PLMN), the wireless terminal comprising: receiver circuitry configured to receive a message comprising one or more network slice coverage area configurations, each of the one or more network slice coverage configurations indicating a coverage area of a corresponding network slice; processor circuitry configured to: select at least one network slice of a serving PLMN; camp on a serving cell of the RAN, and; determine, based the one or more network slice coverage area configurations, whether or not the at least one network slice is available in the serving cell.

In one example, the wireless terminal, wherein the at least one network slice is available in the serving cell in a case that a network slice coverage area configuration corresponding to the at least one network slice indicates that the serving cell is within a coverage area of the at least one network slice.

In one example, the wireless terminal, wherein the at least one network slice is unavailable in the cell in a case that a network slice coverage area configuration corresponding to the at least one network slice indicates that the serving cell is not within a coverage area of the at least one network slice.

In one example, the wireless terminal, wherein in a case that the at least one network slice is available in the serving cell, a protocol data unit (PDU) session establishment request procedure is initiated to establish a PDU session for the at least one network slice.

In one example, the wireless terminal, wherein in a case that the at least one network slice is unavailable in the serving cell, the wireless terminal refrains from initiating a protocol data unit (PDU) session establishment request procedure for the at least one network slice.

In one example, the wireless terminal, wherein each of the one or more coverage area configurations further comprises a list of area identities, each of the area identities specifying an area in which the corresponding network slice is available.

In one example, the wireless terminal, wherein each of the area identities comprises a cell identity.

In one example, the wireless terminal, wherein each of the area identities comprises a tracking area code.

In one example, the wireless terminal, wherein each of the one or more coverage area configurations comprises an identity of a network slice available in a cell that transmits the message.

In one example, the wireless terminal, wherein each of the one or more coverage area configurations comprises an identity of a network slice not available in a cell that transmits the message.

In one example, the wireless terminal, wherein the message is a system information message.

In one example, the wireless terminal, wherein the message is a non-access stratum (NAS) message.

In one example, the wireless terminal, wherein the message is a dedicated radio resource control (RRC) message.

In one example, an access node of a radio access network (RAN), the access node comprising: processor circuitry to generate a message comprising one or more network slice coverage area configurations, each of the one or more network slice coverage configurations indicating a coverage area of a corresponding network slice, and; transmitter circuitry configured to transmit, to a wireless terminal, the message in a cell served by the access node; wherein the one or more network slice coverage area configurations are used by the wireless terminal to determine whether or not a network slice is available in a serving cell that the wireless terminal camps on.

In one example, the access node, wherein the network slice is available in the serving cell in a case that a network slice coverage area configuration corresponding to the network slice indicates that the serving cell is within a coverage area of the network slice.

In one example, the access node, wherein the network slice is unavailable in the serving cell in a case that a network slice coverage area configuration corresponding to the network slice indicates that the serving cell is not within a coverage area of the network slice.

In one example, the access node, wherein in a case that the network slice is available in the serving cell, a protocol data unit (PDU) session establishment request procedure is initiated by the wireless terminal to establish a PDU session for the network slice.

In one example, the access node, wherein in a case that the network slice is unavailable in the serving cell, a protocol data unit (PDU) session establishment request procedure for the network slice is not initiated by the wireless terminal.

In one example, the access node, wherein each of the one or more coverage area configurations further comprises a list of area identities, each of the area identities specifying an area in which the corresponding network slice is available.

In one example, the access node, wherein each of the area identities comprises a cell identity.

In one example, the access node, wherein each of the area identities comprises a tracking area code.

In one example, the access node, wherein each of the one or more coverage area configurations comprises an identity of a network slice available in the cell served by the access node.

In one example, the access node, wherein each of the one or more coverage area configurations comprises an identity of a network slice not available in the cell served by the access node.

In one example, the access node, wherein the message is a system information message.

In one example, the access node, wherein the message is a dedicated radio resource control (RRC) message.

In one example, a management entity of a core network, the management entity communicating with a wireless terminal via a cell of a radio access network (RAN), the core network supporting one or more network slices, each of the network slices providing a designated service within a public land mobile network (PLMN), the management entity comprising: receiver circuitry configured to receive, from the wireless terminal, a non-access stratum (NAS) request message; processor circuitry configured to generate a NAS response message comprising one or more network slice coverage area configurations; transmitter circuitry configured to transmit, to the wireless terminal, the NAS response message; wherein the one or more network slice coverage area configurations are used by the wireless terminal to determine whether or not a network slice is available in a serving cell that the wireless terminal camps on.

In one example, the management entity, wherein the network slice is available in the serving cell in a case that a network slice coverage area configuration corresponding to the network slice indicates that the serving cell is within a coverage area of the network slice.

In one example, the management entity, wherein the network slice is unavailable in the serving cell in a case that a network slice coverage area configuration corresponding to the network slice indicates that the serving cell is not within a coverage area of the network slice.

In one example, the management entity, wherein in a case that the network slice is available in the serving cell, a protocol data unit (PDU) session establishment request procedure is initiated by the wireless terminal to establish a PDU session for the network slice.

In one example, the management entity, wherein in a case that the network slice is unavailable in the serving cell, a protocol data unit (PDU) session establishment request procedure for the network slice is not initiated by the wireless terminal.

In one example, the management entity, wherein each of the one or more coverage area configurations further comprises a list of area identities, each of the area identities specifying an area in which the corresponding network slice is available.

In one example, the management entity, wherein each of the area identities comprises a cell identity.

In one example, the management entity, wherein each of the area identities comprises a tracking area code.

In one example, a method for a wireless terminal communicating with a management entity of a core network through a radio access network (RAN), the core network supporting one or more network slices, each of the network slices providing a designated service within a public land mobile network (PLMN), the method comprising: selecting at least one network slice of a serving PLMN; receiving a message comprising one or more network slice coverage area configurations, each of the one or more network slice coverage configurations indicating a coverage area of a corresponding network slice; receiving a message comprising one or more network slice coverage area configurations, each of the one or more network slice coverage configurations indicating a coverage area of a corresponding network slice; camping on a serving cell of the RAN, and; determining, based the one or more network slice coverage area configurations, whether or not the at least one network slice is available in the serving cell.

In one example, the method, wherein the at least one network slice is available in the serving cell in a case that a network slice coverage area configuration corresponding to the at least one network slice indicates that the serving cell is within a coverage area of the at least one network slice.

In one example, the method, wherein the at least one network slice is unavailable in the cell in a case that a network slice coverage area configuration corresponding to the at least one network slice indicates that the serving cell is not within a coverage area of the at least one network slice.

In one example, the method, wherein in a case that the at least one network slice is available in the serving cell, a protocol data unit (PDU) session establishment request procedure is initiated to establish a PDU session for the at least one network slice.

In one example, the method, wherein in a case that the at least one network slice is unavailable in the serving cell, the wireless terminal refrains from initiating a protocol data unit (PDU) session establishment request procedure for the at least one network slice.

In one example, the method, wherein each of the one or more coverage area configurations further comprises a list of area identities, each of the area identities specifying an area in which the corresponding network slice is available.

In one example, the method, wherein each of the area identities comprises a cell identity.

In one example, the method, wherein each of the area identities comprises a tracking area code.

In one example, the method, wherein each of the one or more coverage area configurations comprises an identity of a network slice available in a cell that transmits the message.

In one example, the method, wherein each of the one or more coverage area configurations comprises an identity of a network slice not available in a cell that transmits the message.

In one example, the method, wherein the message is a system information message.

In one example, the method, wherein the message is a non-access stratum (NAS) message.

In one example, the method, wherein the message is a dedicated radio resource control (RRC) message.

In one example, a method for an access node of a radio access network (RAN), the method comprising: generating a message comprising one or more network slice coverage area configurations, each of the one or more network slice coverage configurations indicating a coverage area of a corresponding network slice, and; transmitting, to a wireless terminal, the message in a cell served by the access node; wherein the one or more network slice coverage area configurations are used by the wireless terminal to determine whether or not a network slice is available in a serving cell that the wireless terminal camps on.

In one example, the method, wherein the network slice is available in the serving cell in a case that a network slice coverage area configuration corresponding to the network slice indicates that the serving cell is within a coverage area of the network slice.

In one example, the method, wherein the network slice is unavailable in the serving cell in a case that a network slice coverage area configuration corresponding to the network slice indicates that the serving cell is not within a coverage area of the network slice.

In one example, the method, wherein in a case that the network slice is available in the serving cell, a protocol data unit (PDU) session establishment request procedure is initiated by the wireless terminal to establish a PDU session for the network slice.

In one example, the method, wherein in a case that the network slice is unavailable in the serving cell, a protocol data unit (PDU) session establishment request procedure for the network slice is not initiated by the wireless terminal.

In one example, the method, wherein each of the one or more coverage area configurations further comprises a list of area identities, each of the area identities specifying an area in which the corresponding network slice is available.

In one example, the method, wherein each of the area identities comprises a cell identity.

In one example, the method, wherein each of the area identities comprises a tracking area code.

In one example, the method, wherein each of the one or more coverage area configurations comprises an identity of a network slice available in the cell served by the access node.

In one example, the method, wherein each of the one or more coverage area configurations comprises an identity of a network slice not available in the cell served by the access node.

In one example, the method, wherein the message is a system information message.

In one example, the method, wherein the message is a dedicated radio resource control (RRC) message.

In one example, a method for a management entity of a core network, the management entity communicating with a wireless terminal via a cell of a radio access network (RAN), the core network supporting one or more network slices, each of the network slices providing a designated service within a public land mobile network (PLMN), the method comprising: receiving, from the wireless terminal, a non-access stratum (NAS) request message; generating a NAS response message comprising one or more network slice coverage area configurations; transmitting, to the wireless terminal, the NAS response message; wherein the network slice band association information comprises one or more network slice identifiers, the one or more network slice coverage area configurations are used by the wireless terminal to determine whether or not a network slice is available in a serving cell that the wireless terminal camps on.

In one example, the method, wherein the network slice is available in the serving cell in a case that a network slice coverage area configuration corresponding to the network slice indicates that the serving cell is within a coverage area of the network slice.

In one example, the method, wherein the network slice is unavailable in the serving cell in a case that a network slice coverage area configuration corresponding to the network slice indicates that the serving cell is not within a coverage area of the network slice.

In one example, the method, wherein in a case that the network slice is available in the serving cell, a protocol data unit (PDU) session establishment request procedure is initiated by the wireless terminal to establish a PDU session for the network slice.

In one example, the method, wherein in a case that the network slice is unavailable in the serving cell, a protocol data unit (PDU) session establishment request procedure for the network slice is not initiated by the wireless terminal.

In one example, the method, wherein each of the one or more coverage area configurations further comprises a list of area identities, each of the area identities specifying an area in which the corresponding network slice is available.

In one example, the method, wherein each of the area identities comprises a cell identity.

In one example, the method, wherein each of the area identities comprises a tracking area code.

What is claimed is:

1. A wireless terminal of a radio access network (RAN), the RAN supporting one or more network slices, each of the one or more network slices providing a designated service within a public land mobile network (PLMN), the wireless terminal comprising:

receiver circuitry configured to:

receive, from a core network, a first list of one or more network slice identities, each of the one or more network slice identities of the first list being associated with an optional network slice coverage area configuration, the optional network slice coverage area configuration indicating a coverage area, and receive, from a serving cell that the wireless terminal camps on, a second list of one or more network slice identities, the second list indicating one or more second network slices not supported in the serving cell; and processor circuitry configured to:

select at least one network slice, and determine, based on the first list and the second list, whether the at least one network slice is available in the serving cell, wherein in a case that the optional network slice coverage area configuration is not present, a current registration area is used as the coverage area.

2. The wireless terminal of claim 1, wherein the at least one network slice is available in the serving cell in a case that the at least one network slice is included in the first list but not included in the second list.

3. The wireless terminal of claim 1, wherein the at least one network slice is unavailable in the serving cell in a case that the at least one network slice is included in the first list and included in the second list.

4. A method performed by a wireless terminal of a radio access network (RAN), the RAN supporting one or more network slices, each of the one or more network slices providing a designated service within a public land mobile network (PLMN), the method comprising:

receiving, from a core network, a first list of one or more network slice identities, each of the one or more network slice identities of the first list being associated with an optional network slice coverage area configuration, the optional network slice coverage area configuration indicating a coverage area;

receiving, from a serving cell that the wireless terminal camps on, a second list of one or more network slice identities, the second list indicating one or more second network slices not supported in the serving cell;

selecting at least one network slice; and determining, based on the first list and the second list, whether the at least one network slice is available in the serving cell, wherein in a case that the optional network slice coverage area configuration is not present, a current registration area is used as the coverage area.

* * * * *